(12) United States Patent
Sanderson et al.

(10) Patent No.: US 11,853,825 B2
(45) Date of Patent: *Dec. 26, 2023

(54) VIDEO/ANIMATED QR CODES—PRIVACY

(71) Applicant: PayPal, Inc., San Jose, CA (US)

(72) Inventors: Oscar Charles Edward Sanderson, Singapore (SG); Patrick Babcock, Sturbridge, MA (US); Laura Clark, Charlotte, NC (US); Rajvijay Govindaraju, Singapore (SG)

(73) Assignee: PayPal, Inc., San Jose, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/521,423

(22) Filed: Nov. 8, 2021

(65) Prior Publication Data
US 2023/0143357 A1     May 11, 2023

(51) Int. Cl.
*G06K 19/06*     (2006.01)
*G06Q 20/20*     (2012.01)

(52) U.S. Cl.
CPC ..... *G06K 19/06037* (2013.01); *G06Q 20/208* (2013.01)

(58) Field of Classification Search
CPC ....... G06K 19/06037; G06K 19/06046; G06K 19/06112; G06Q 20/3274; G06T 13/80; H02M 5/44; H02M 5/4585; H02M 7/53873
See application file for complete search history.

(56) References Cited

U.S. PATENT DOCUMENTS

| | | |
|---|---|---|
| 8,798,380 B1 | 8/2014 | Windmueller et al. |
| 8,807,434 B1 | 8/2014 | Windmueller et al. |
| 9,652,758 B2 * | 5/2017 | Zhou .................. H04M 1/2755 |
| 9,760,871 B1 * | 9/2017 | Pourfallah ............. G06Q 10/10 |
| 11,544,513 B1 * | 1/2023 | Sanderson .............. G06T 13/80 |
| 2012/0330845 A1 * | 12/2012 | Kang ................. G06Q 20/3274 235/494 |

(Continued)

OTHER PUBLICATIONS

ISA/US, Inter'l Search Report and Written Opinion issued in PCT/US22/49295, dated Feb. 16, 2023, 14 pgs.

(Continued)

*Primary Examiner* — Thien M Le
(74) *Attorney, Agent, or Firm* — Greenberg Traurig, LLP

(57) ABSTRACT

Systems/techniques that can facilitate video/animated QR codes are provided. In various aspects, a processor can identify a QR code. In various instances, the processor can decompose the QR code into a static fragment and a plurality of dynamic fragments. The static fragment can be a portion of the QR code that contains sufficient information to facilitate an online transaction, whereas the plurality of dynamic fragments can be a plurality of portions of the QR code that collectively contain sufficient information to facilitate an offline transaction. In various instances, the processor can sequentially render a plurality of frames on an electronic display, where each frame depicts the static fragment and a corresponding one of the plurality of dynamic fragments. Accordingly, a point-of-sale device can facilitate an online transaction by scanning one frame rendered by the processor, and/or can facilitate an offline transaction by scanning all frames rendered by the processor.

20 Claims, 29 Drawing Sheets

(56) References Cited

U.S. PATENT DOCUMENTS

| | | | | |
|---|---|---|---|---|
| 2018/0096325 A1* | 4/2018 | Panzo | ................ | G06Q 20/3278 |
| 2018/0260671 A1* | 9/2018 | Chen | ................ | G06K 19/06037 |
| 2018/0290874 A1* | 10/2018 | Roberts | ................ | G07F 9/001 |
| 2019/0244198 A1* | 8/2019 | Waters | ................ | G06F 21/602 |
| 2020/0151702 A1* | 5/2020 | Sinha | ................ | G06Q 20/3224 |
| 2021/0142296 A1 | 5/2021 | Kang | | |
| 2022/0101304 A1* | 3/2022 | Kang | ................ | G07G 1/0045 |

OTHER PUBLICATIONS

Mishra, "Region Identification and Decoding Of Security Markers Using Image Processing Tools", Dissertation Report, CSIR-CSIO, 2016. Retrieved on Jan. 23, 2023. Retrieved from <URL: https://www.researchgate.net/profile/Amol-Bhondekar/ publication/ 301788314_Region_Identificion_and_Decoding_Of_Security_ Markers_Using_Image_Proccssing_Tools/links/ 5728576b08ae586b21e2a314/Region-Identification-and-Decoding-Of-Security-Markcrs-Using-Image-Process.

Ono et al. "Animated Two-Dimensional Barcode Generation Using Optimization Algorithms". SCIS & ISIS, 2008. Retrieved on Jan. 23, 2023. Retrieved from <URL: https://www.jstage.jst.go.jp/article/softscis/2008/0/2008_0_1232/_pdf> entire document.

* cited by examiner

VIDEO/ANIMATED QR CODES—PRIVACY

TECHNICAL FIELD

The subject disclosure relates generally to quick response (QR) codes, and more specifically to video/animated QR codes.

BACKGROUND

There exist two types of electronic financial transactions that utilize quick response (QR) codes: online transactions and offline transactions. In an online transaction, a QR code can contain a smaller amount of information, meaning that the QR code is easier to scan. On the other hand, in an offline transaction, a QR code typically needs to include a larger amount of information, thus causing the QR code to be more difficult to scan. A transaction in which a client device presents a QR code to a merchant device is inherently unidirectional, meaning that the merchant device does not have an opportunity to inform the client device whether it will perform an online transaction or an offline transaction. Accordingly, the client device does not know which type of QR code to present to the merchant device: a smaller and easily-scanned QR code for online transactions, or a more substantive and harder-to-scan QR code for offline transactions. If the client device presents the smaller and easily-scanned QR code when the merchant device is expecting to perform an offline transaction, the merchant device cannot establish trust with the client device. Similarly, if the client device presents the more substantive and harder-to-scan QR code when the merchant device is expecting to perform an online transaction, the merchant device can experience technical difficulties and/or otherwise be unable to properly scan the presented QR code.

Systems and/or techniques that can ameliorate one or more of these technical issues are desirable.

DETAILED DESCRIPTION

Figure 1:
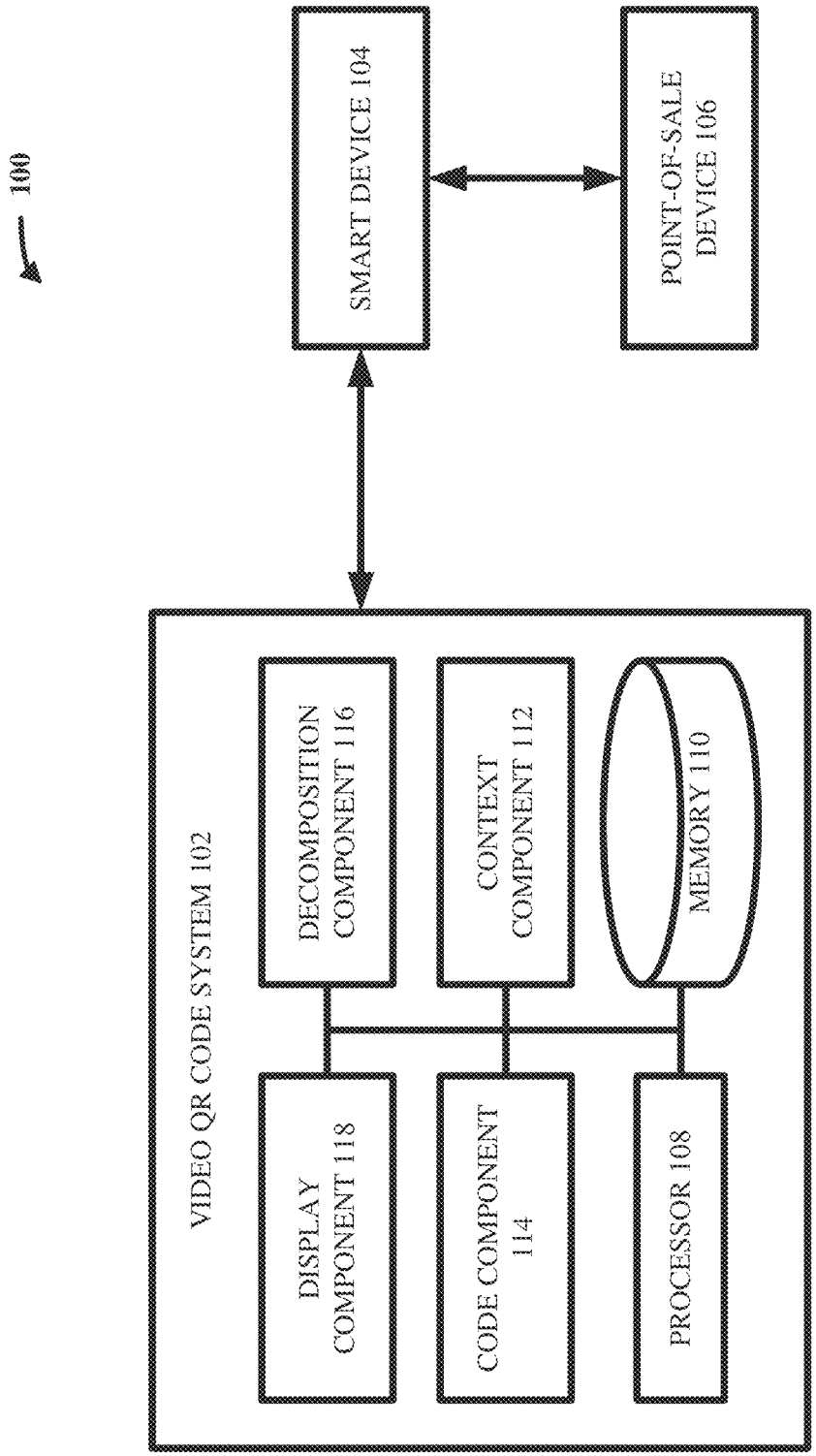
FIG. 1 illustrates a high-level block diagram of an example, non-limiting system that facilitates video/animated QR codes in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

There exist two types of electronic financial transactions that utilize quick response (QR) codes: online transactions and offline transactions.

In an online transaction, a client device can render a QR code on an electronic display, a merchant device can capture the QR code by optically scanning the electronic display of the client device, and the merchant device can have access (e.g., via the Internet) to one or more electronic databases that contain verification data corresponding to the QR code. In such case, the verification data can be a large and/or voluminous quantity of information that enables the merchant device to determine whether it can trust the client device, and the QR code itself can contain and/or convey a small and/or bare quantity of information (e.g., the QR code can contain 12-18 characters) that points to and/or otherwise acts as an identifier for the verification data. Thus, in an online transaction, the merchant device can scan the QR code that is presented by the client device, the merchant device can use the QR code to identify the verification data stored in the one or more electronic databases, and the merchant device can utilize the verification data to determine whether or not to trust the client device. If the merchant device concludes that it can trust the client device, the merchant device can proceed with the transaction. Conversely, if the merchant device concludes that it cannot trust the client device, the merchant device can refrain from proceeding with the transaction.

On the other hand, in an offline transaction, the client device can render a QR code on the electronic display, the merchant device can capture the QR code by optically scanning the electronic display of the client device, and the merchant device can lack access to one or more electronic databases that contain verification data corresponding to the QR code. In such case, the QR code itself can contain and/or convey a large and/or voluminous quantity of information (e.g., 400 characters) that enables the merchant device to determine whether it can trust the client device. That is, in an offline transaction, the merchant device can scan the QR code that is presented by the client device, and the merchant device can determine whether or not to trust the client device based only on the information that is conveyed by the QR code itself.

Therefore, an online transaction can be facilitated by a QR code that is below any suitable threshold size, and such a QR code can be referred to as an online QR code. As a non-limiting example, an online QR code can have 10 to 20 characters that collectively represent an identifier, where such identifier can be used to query one or more electronic databases for particular verification data, and where such particular verification data can be used to establish trust for a transaction (e.g., this transaction can be referred to as "online" since the particular verification data stored in the one or more electronic databases can be obtained via online (e.g., Internet) connectivity). Due to such low character count, an online QR code can be considered as not being information-dense but as being easily and/or readily scannable by many available barcode scanners.

In contrast, an offline transaction can be facilitated by a QR code that is above any suitable threshold size, and such a QR code can be referred to as an offline QR code. As a non-limiting example, an offline QR code can have 300 to 500 characters that collectively represent verification data, where such verification data can be used to establish trust for a transaction (e.g., this transaction can be referred to as "offline" since the verification data is conveyed by the QR code itself and is not obtained by querying one or more electronic databases via online (e.g., Internet) connectivity). Due to such high character count, an offline QR code can be considered as being information-dense but as also being difficult to scan by many available barcode scanners. In some cases, an offline QR code can contain the same 10-20 characters that a corresponding online QR code would contain (e.g., so as to be able to establish trust in an online context) and can further contain hundreds of additional characters that the corresponding online QR code lacks (e.g., so as to be able to establish trust in an offline context).

As mentioned above, a transaction that involves a QR code, whether the transaction is online or offline, can often be conducted as a unilateral and/or unidirectional transfer of information. In other words, the client device can transmit information, in the form of electronic rendition of the QR code, to the merchant device, and the merchant device can refrain from transmitting information back to the client device. Due to such unilaterality and/or unidirectionality, the merchant device can expect a particular type of transaction (e.g., online vs. offline), but the client device can be unaware of which type of transaction the merchant device expects. Accordingly, the client device can fail to know which type of QR code (e.g., small and easily-scannable online QR code vs. large but difficult-to-scan offline QR code) to present to the merchant device.

If the client device presents a type of QR code that does not match the expectations of the merchant device, the transaction between the merchant device and the client device can be negatively affected. For example, if the client device presents an online QR code to the merchant device when the merchant device is expecting to perform an offline transaction, the merchant device can fail to establish trust with the client device (e.g., the merchant device can successfully scan the online QR code, but the online QR code can fail to contain and/or convey sufficient information to establish trust with the client device), which can impede the transaction. On the other hand, if the client device presents an offline QR code to the merchant device when the merchant device is expecting to perform an online transaction, the merchant device can fail to properly scan the offline QR code (e.g., notwithstanding that an offline QR code can contain more than enough information to facilitate an online transaction, the merchant device can experience significant technical difficulty in attempting to scan an offline QR code that has hundreds of characters when the merchant device is instead designed to scan an online QR code that has only a dozen or so characters), which can likewise impede the transaction.

Thus, systems and/or techniques that can address one or more of these technical problems can be desirable.

Various embodiments described herein can address one or more of these technical problems. More specifically, one or more embodiments described herein include systems, computer-implemented methods, apparatus, and/or computer program products that can facilitate electronic generation of video/animated QR codes. In other words, various embodiments described herein can include a computerized tool (e.g., any suitable combination of computer-executable hardware and/or computer-executable software) that can electronically generate and/or create video/animated QR codes, where a video/animated QR code can be a specially-structured type of QR code that can be used to facilitate both online transactions and offline transactions without causing concomitant scanning difficulties. Thus, when a client device presents a video/animated QR code as described herein, there is no need for the client device to know beforehand which type of transaction (e.g., online vs. offline) the merchant device is designed to perform, and the merchant device can avoid experiencing technical scanning difficulties regardless of which type of transaction (e.g., online vs. offline) the merchant is designed to perform.

In various embodiments, a computerized tool as described herein can comprise a context component, a code component, a decomposition component, and/or a display component.

In various embodiments, there can be a client device and a merchant device. In various aspects, the client device can be any suitable computing device that is owned by, operated by, controlled by, and/or otherwise associated with a client/customer (e.g., the client device can be a laptop computer, a desktop computer, a smart phone, a smart tablet, and/or a smart watch). Similarly, the merchant device can be any suitable computing device that is owned by, operated by, controlled by, and/or otherwise associated with a merchant/vendor (e.g., the merchant device can be a point-of-sale device). In various instances, the client device can include an electronic display/screen, and the merchant device can include an optical scanner. In various cases, it can be desired for the client device to render on its electronic display/screen a QR code and for the merchant device to capture via its optical scanner the rendered QR code so as to facilitate a transaction.

In various aspects, the merchant device can be designed to facilitate the transaction in an online fashion or instead in an offline fashion. However, the client device can fail to know whether the merchant device is designed to facilitate the transaction in an online fashion or instead in an offline fashion. Accordingly, the client device can fail to know which type of QR code to render on its electronic display/screen: an online QR code or instead an offline QR code. In various instances, the computerized tool described herein can be electronically integrated with (e.g., installed on, in communication with) the client device and can cause the client device to render a video/animated QR code, where such video/animated QR code can facilitate both an online transaction and an offline transaction without causing corresponding scanning difficulties for the merchant device. In other words, when the computerized tool described herein is implemented, the transaction between the client device and the merchant device can be facilitated, notwithstanding that the client device fails to know which type of transaction (e.g., online vs. offline) that the merchant device is configured to perform.

In various embodiments, the context component of the computerized tool can electronically receive and/or otherwise electronically access context data that is captured and/or provided by the client device. In various aspects, the context data can be any suitable information that describes, characterizes, defines, and/or is otherwise associated with an environmental context of the client device. As some non-limiting examples, the context data can indicate: a geolocation of the client device (e.g., the client device can determine its current location based on a global positioning sensor of the client device); a timestamp captured by the client device (e.g., the client device can determine the current time/date based on an electronic clock/calendar of the client device); an identity of the merchant that owns/operates the merchant device (e.g., the client device can become apprised of an identifier associated with the merchant based on information transmitted by an electronic beacon of the merchant device); an identity of a product/service involved in the transaction (e.g., the client device can become apprised of a serial number of the product/service that the client is attempting to procure from the merchant based on information transmitted by an electronic beacon of the merchant device); and/or a monetary amount involved in the transaction (e.g., the client device can become apprised of how much money the client is required to pay to the merchant based on information transmitted by an electronic beacon of the merchant device). In any case, the client device can generate the context data, and the context component can electronically retrieve, obtain, and/or otherwise access the context data from the client device, so that other components of the computerized tool can electronically interact with (e.g., read, write, edit, analyze) the context data.

In various embodiments, the code component of the computerized tool can electronically store, maintain, control, and/or otherwise access a QR code bank. In various aspects, the QR code bank can be any suitable data structure (e.g., graph data structure, relational data structure, hybrid data structure) that correlates, links, and/or otherwise maps a set of QR codes with a set of contexts. In various instances, the set of QR codes can include any suitable number of different and/or unique QR codes, the set of contexts can include any suitable number of different and/or unique contexts (e.g., different and/or unique geolocations, timestamps, merchant identities, product/service identities, monetary amounts), and the set of QR codes can respectively correspond (e.g., in one-to-one fashion) to the set of contexts. In various cases, the code component can electronically identify, within the set of contexts, a particular context that matches and/or is otherwise consistent with the context data that is accessed/obtained by the context component. Based on identifying the particular context, the code component can then electronically identify, within the set of QR codes, a particular QR code that corresponds to the particular context (e.g., that corresponds to the context data accessed/obtained by the context component). In various cases, the particular QR code can represent financial instrument information of the client/customer that owns/operates the client device, and/or can represent any other suitable information as desired.

In various aspects, the particular QR code can be large in size (e.g., can contain 300 to 500 characters) and/or can otherwise contain sufficient information so as to facilitate an offline transaction (e.g., can contain sufficient information to allow the merchant device to establish trust with the client device in the absence of electronic access to one or more electronic databases containing verification data). Moreover, in various cases, the particular QR code can also contain sufficient information to facilitate an online transaction (e.g., can contain sufficient information to allow the merchant device to establish trust with the client device in the presence of electronic access to one or more electronic databases containing verification data). For example, the particular QR code can contain a total of 300 to 500 characters, where 10 to 20 of such characters collectively represent an identifier/token that is sufficient to facilitate an online transaction, and where the remaining hundreds of characters collectively represent verification data that is sufficient to facilitate an offline transaction.

In various embodiments, the decomposition component of the computerized tool can electronically decompose, deconstruct, cut up, fracture, and/or otherwise break apart the particular QR code into a static fragment and a set of dynamic fragments.

In various aspects, the static fragment can be any suitable portion and/or part of the particular QR code (e.g., can be any suitable subset of characters of the particular QR code) that contains sufficient information to facilitate an online transaction. For example, the static fragment can be the 10 to 20 characters of the particular QR code that collectively represent an identifier/token that can be used by the merchant device to process an online transaction.

In various instances, the set of dynamic fragments can be a set of portions and/or parts of the particular QR code (e.g., can be any suitable subsets of characters of the particular QR code) that collectively contain sufficient information to facilitate an offline transaction. For example, the set of dynamic fragments can include the hundreds of characters in the particular QR code that are not the 10 to 20 characters that make up the static fragment and that collectively represent verification data that can be used by the merchant device to process an offline transaction. In other words, the set of dynamic fragments can be considered as those characters in the particular QR code that would remain if the static fragment were removed, deleted, and/or erased from the particular QR code.

In any case, the static fragment can be any suitably-sized subset of characters of the particular QR code (e.g., 10-20 characters) and each dynamic fragment can be any suitably-sized subset of characters of the particular QR code (e.g., 10-50 characters), where the total sum and/or aggregation of the static fragment and the set of dynamic fragments can be equivalent to the whole and/or entirety of the particular QR code.

As a non-limiting and illustrative example, suppose that the particular QR code includes 200 characters, where 15 of such 200 characters represent an identifier/token that can facilitate an online transaction, and where the remaining 185 of such 200 characters represent verification data that can facilitate an offline transaction. In this non-limiting and illustrative example, the decomposition component can break up and/or divide the particular QR code into eight fragments: a first fragment made up of the 15 characters that can facilitate an online transaction; a second fragment made up of 25 characters from the remaining 185 characters (e.g., 200−15=185); a third fragment made up of 31 characters from the remaining 160 characters (e.g., 185−25=160); a fourth fragment made up of 29 characters from the remaining 129 characters (e.g., 160−31=129); a fifth fragment made up of 27 characters from the remaining 100 characters (e.g., 129−29=100); a sixth fragment made up of 23 characters from the remaining 73 characters (e.g., 100−27=73); a seventh fragment made up of 18 characters from the remaining 50 characters (e.g., 73−23=50); and an eighth fragment made up the remaining 32 characters (e.g., 50−18=32). In this non-limiting example, the first fragment can be considered as the static fragment (e.g., can contain the 15 characters sufficient for facilitating an online transaction). Moreover, in this non-limiting example, each of the second through eighth fragments can be considered as a separate dynamic fragment, with the second through eighth fragments together being considered as the set of dynamic fragments (e.g., collectively containing the 185 characters for facilitating an offline transaction).

Although the set of dynamic fragments in this non-limiting example are non-overlapping, this is a non-limiting illustration and for ease of explanation. Those having ordinary skill in the art will appreciate that, in various aspects, two or more dynamic fragments in the set of dynamic fragments can be overlapping with each other. In such cases, the overall sum and/or aggregation of the static fragment and the set of dynamic fragments can still be equivalent to the whole and/or entirety of the particular QR code, when double-counting of overlapped regions is avoided.

Those having ordinary skill in the art will further appreciate that the numerical values in the above example are non-limiting and for purposes of illustration.

In any case, the decomposition component can electronically segment and/or cut up the particular QR code, thereby yielding the static fragment and the set of dynamic fragments, where the static fragment and the set of dynamic fragments can fit together like pieces of a puzzle to form the whole and/or entirety of the particular QR code.

In various embodiments, the display component of the computerized tool can electronically generate a set of video frames based on the static fragment and the set of dynamic fragments. More specifically, if the set of dynamic fragments includes x dynamic fragments, for any suitable positive integer x, then the set of video frames can include x video frames, with each video frame depicting the static fragment and a respectively corresponding one of the set of dynamic fragments. In various instances, the display component can electronically cause the client device to render on its electronic display/screen the set of video frames in looped sequence. Such sequential rendition of the set of video frames on the electronic display/screen of the client device can create a visual effect that appears to be and/or resembles a rapidly changing QR code. This rapidly changing QR code can be referred to as a video QR code and/or as an animated QR code.

In various cases, the video/animated QR code that is rendered by the client device can contain the same total information as the particular QR code identified by the code component. However, the structure of the video/animated QR code can allow the merchant device to selectively scan it without difficulty, regardless of whether the merchant device is designed to facilitate an online transaction or is instead designed to facilitate an offline transaction. More specifically, because each video frame of the video/animated QR code can depict both the static fragment and one dynamic fragment, each video frame can contain on the order of tens or dozens of barcode characters, whereas the particular QR code itself can contain a total of hundreds of barcode characters. Thus, if the merchant device is designed to perform an online transaction, the optical scanner of the merchant device can be able to properly capture/scan tens or dozens of barcode characters at a time, and thus the merchant device can capture/scan any one of the video frames of the video/animated QR code without struggle. In contrast, if the merchant device is instead designed to perform an offline transaction, the optical scanner of the merchant device can be able to properly capture/scan hundreds of barcode characters at a time, and thus the merchant device can capture/scan all of the video frames of the video/animated QR code without struggle.

For example, suppose that the merchant device is designed to facilitate an online transaction. In such case, the optical scanner of the merchant device can be able to properly capture/scan tens or dozens of barcode characters in a given time period but can be unable to properly capture/scan hundreds of barcode characters in the given time period. In various aspects, the display component can cause the client device to render the video/animated QR code on its electronic display/screen, and the merchant device can capture, via its optical scanner, any single frame of the video/animated QR code. Because each of the set of video frames can depict both the static fragment and a respectively corresponding one of the set of dynamic fragments, the single video frame that is captured/scanned by the merchant device can include on the order of tens or dozens of barcode characters (e.g., the static fragment can comprise 10 to 20 characters, and the dynamic fragment can comprise 10 to 50 characters). Thus, the optical scanner of the merchant device can capture/scan any one of the video frames without technical difficulty. Because each video frame can depict the static fragment, the merchant device can obtain the static fragment from the captured/scanned video frame, no matter which particular video frame is captured/scanned. The merchant device can then utilize the static fragment to facilitate the online transaction. For instance, the static fragment can enable the merchant device to identify verification data stored in one or more electronic databases, and the merchant device can leverage such verification data to determine whether the client device can be trusted so as to proceed with the transaction.

On the other hand, suppose that the merchant device is instead designed to facilitate an offline transaction. In such case, the optical scanner of the merchant device can be able to properly capture/scan hundreds of barcode characters in a given time period. In various aspects, the display component can cause the client device to render the video/animated QR code on its electronic display/screen, and the merchant device can capture, via its optical scanner, all frames of the video/animated QR code. Although the set of video frames can depict hundreds of barcode characters in total, the optical scanner of the merchant device in this scenario can handle scanning hundreds of characters without struggling, and thus the merchant device can capture/scan all of the video frames without technical difficulty. Because each video frame can depict a corresponding dynamic fragment, the merchant device can obtain the entire set of dynamic fragments from the captured/scanned video frames. The merchant device can then utilize the set of dynamic fragments to facilitate the offline transaction. For instance, the merchant device can reconstruct the particular QR code (e.g., can piece together the set of dynamic fragments) by superimposing all of the captured/scanned video frames on top of each other, and the particular QR code represent and/or convey enough verification data to allow the merchant device to determine whether the client device can be trusted so as to proceed with the transaction.

In other words, the video/animated QR code can contain both sufficient information to facilitate an online transaction (e.g., the static fragment) and sufficient information to facilitate an offline transaction (e.g., the set of dynamic fragments). No matter what type of transaction the merchant device is designed to perform (e.g., online vs. offline), the client device can render on its electronic display the video/animated QR code (e.g., can sequentially render in looped succession the set of video frames), and the merchant device can selectively capture/scan, without struggle, the information that it requires to facilitate the transaction. If the merchant device is designed to scan only tens or dozens of barcode characters at once (e.g., designed to facilitate an online transaction), the merchant device can capture/scan any single frame of the video/animated QR code without struggle. The merchant device can then extract the static fragment from the captured/scanned frame and can proceed accordingly (e.g., can facilitate an online transaction based on the static fragment). On the other hand, if the merchant device is designed to scan hundreds of barcode characters at once (e.g., designed to facilitate an offline transaction), the merchant device can capture/scan all of the frames of the video/animated QR code without struggle. The merchant device can then extract the set of dynamic fragments from the captured/scanned frames and can proceed accordingly (e.g., can facilitate an offline transaction based on the set of dynamic fragments).

In any case, the computerized tool described herein can facilitate the electronic generation and/or rendition of video/animated QR codes, where a video/animated QR code can be used for processing both online and offline transactions between a client device and a merchant device without causing corresponding scanning difficulties in the merchant device.

Various embodiments described herein can be employed to use hardware and/or software to solve problems that are highly technical in nature (e.g., to facilitate electronic generation of video/animated QR codes), that are not abstract and that cannot be performed as a set of mental acts by a human. Further, some of the processes performed can be performed by a specialized computer (e.g., electronic display/screen, QR code optical scanner) for carrying out defined tasks related to electronic generation of video/animated QR codes.

For example, some defined tasks of various embodiments described herein can include: electronically identifying a QR code; electronically decomposing the QR code into a static fragment and a set of dynamic fragments, where the static fragment contains and/or represents sufficient information to facilitate an online transaction, and where the set of dynamic fragments collectively contain and/or represent sufficient information to facilitate an offline transaction; electronically generating a set of video frames, where each frame depicts both the static fragment and a respectively corresponding dynamic fragment; and electronically rendering, on an electronic display/screen, the set of video frames in looped sequence, such that a merchant device can facilitate an online transaction by scanning/capturing any one of the set of video frames, and such that the merchant device can facilitate an offline transaction by scanning/capturing all of the set of video frames.

Such defined tasks are not performed manually by humans. Indeed, neither the human mind nor a human with pen and paper can electronically obtain a QR code, can electronically segment and/or fracture the QR code into a static fragment and a set of dynamic fragments, can electronically generate a set of video frames based on the static fragment and the set of dynamic fragments, and/or electronically render the set of video frames on an electronic screen/monitor. Instead, various embodiments described herein are inherently and inextricably tied to computer technology and cannot be implemented outside of a computing environment (e.g., QR codes are inherently computerized objects that cannot be generated, rendered, and/or scanned in any sensible, reasonable, and/or practical way without computers; likewise, a computerized tool that facilitates the generation of video/animated QR codes that can enable both online and offline processing of transactions without technical scanning difficulties cannot be implemented in any sensible, reasonable, or practical way without computers).

In various instances, embodiments described herein can integrate into a practical application the disclosed teachings regarding electronic generation of video/animated QR codes. As explained above, transactions involving QR codes can be processed in either an online fashion or instead in an offline fashion. During an online transaction, a client device can render a small but easily-scanned QR code, a merchant device can capture the small but easily-scanned QR code, the merchant device can leverage the small but easily-scanned QR code to identify verification data stored in various databases, and the merchant device can determine whether the client device can be trusted based on the verification data. In contrast, during an offline transaction, a client device can render a large but hard-to-scan QR code, a merchant device can capture the large but hard-to-scan QR code, and the merchant device can determine whether to trust the client device based only on the information contained within the large but hard-to-scan QR code. A technical problem that arises is that the client device can often not know which type of transaction (e.g., online vs. offline) that the merchant device is designed to facilitate. If the client device presents a small but easily-scanned QR code when the merchant device is designed to perform an offline transaction, the merchant device can scan the QR code but can be unable to determine whether the client device is trustworthy (e.g., the small but easily-scanned QR code does not contain sufficient information by itself to establish trust). On the other hand, if the client device presents a large but hard-to-scan QR code when the merchant device is designed to perform an online transaction, the merchant device can fail to scan the QR code at all (e.g., the large but hard-to-scan QR code contains sufficient information to establish trust, but the merchant device can be unable to properly read/scan it).

Accordingly, the inventors of various embodiments described herein devised a technical solution to this technical problem. Specifically, the computerized tool described herein can facilitate the generation of a video/animated QR code. In particular, the computerized tool can identify a QR code, where the QR code contains both some characters that are sufficient to facilitate an online transaction and other characters that are sufficient to facilitate an offline transaction. In various instances, the computerized tool can decompose, fracture, and/or segment the QR code into various pieces/fragments: specifically, a static fragment and a set of dynamic fragments. In various cases, the static fragment can be any suitable subset of characters of the QR code, which subset of characters are sufficient to facilitate an online transaction. Similarly, each dynamic fragment can be any suitable subset of characters of the QR code, such that the set of dynamic fragments collectively contain sufficient characters to facilitate an offline transaction. In various aspects, the computerized tool can generate a set of video frames, where each video frame depicts both the static fragment and a respectively corresponding one of the set of dynamic fragments. In various instances, the computerized tool can cause the client device to sequentially render the set of video frames on its electronic screen/monitor. If the merchant device is designed to facilitate an online transaction (e.g., is designed to scan no more than tens or dozens of characters at a time), the merchant device can scan/capture any single video frame, can extract the static fragment from the video frame, and can facilitate the online transaction based on the static fragment. On the other hand, if the merchant device is designed to facilitate an offline transaction (e.g., is designed to scan hundreds of characters at a time), the merchant device can scan/capture all of the video frames, can extract the set of dynamic fragments from the video frames, and can facilitate the offline transaction based on the set of dynamic fragments. In this way, the merchant device can process the transaction without experiencing technical scanning difficulties, notwithstanding that the client device does not know which type of transaction (e.g., online vs. offline) that the merchant device is configured to perform. Because the computerized tool can eliminate scanning difficulties that are usually encountered by the merchant device when the client device does not know which type (e.g., online vs. offline) of QR code to present, such a computerized tool constitutes a concrete and tangible technical improvement in the field of QR codes and is thus certainly a useful and practical application of computers.

Moreover, in various aspects, embodiments described herein can control real-world and/or tangible devices based on the disclosed teachings. For example, a computerized tool as described herein can electronically generate and/or render real-world video/animated QR codes on real-world screens/monitors so as to be scanned/captured by real-world optical scanners.

It should be appreciated that the figures described herein are non-limiting examples of various embodiments.

FIG. 1 illustrates a high-level block diagram of an example, non-limiting system 100 that can facilitate video/animated QR codes in accordance with one or more embodiments described herein. As shown, a video QR code system 102 can be electronically integrated, via any suitable wired and/or wireless electronic connection, with a smart device 104.

In various embodiments, the smart device 104 can be any suitable computing device that is owned by, operated by, controlled by, and/or otherwise associated with a customer (e.g., human and/or otherwise). For example, the smart device 104 can be a laptop computer and/or a desktop computer. As another example, the smart device 104 can be a smart phone and/or a smart tablet. As yet another example, the smart device 104 can be a smart watch. In any case, the smart device 104 can have an electronic screen/monitor on which the smart device 104 can visually render and/or illustrate images.

In various aspects, there can be a point-of-sale device 106. In various instances, the point-of-sale device 106 can be any suitable computing device that is owned by, operated by, controlled by, and/or otherwise associated with a merchant (e.g., human and/or otherwise). For example, the point-of-sale device 106 can be a computerized checkout kiosk. As another example, the point-of-sale device 106 can be a computerized cash register. In any case, the point-of-sale device 106 can have an optical scanner (e.g., barcode scanner).

In various cases, the customer that owns/operates the smart device 104 can desire to participate in a QR-based transaction with the merchant that owns/operates the point-of-sale device 106. To facilitate such a transaction, the smart device 104 can electronically render a QR code on its electronic screen/monitor, and the point-of-sale device 106 can capture/read the QR code by scanning the electronic screen/monitor via its optical scanner. In various instances, the point-of-sale device 106 can be configured and/or otherwise designed to perform either an online QR-based transaction or an offline QR-based transaction. As explained above, an online QR-based transaction can be facilitated by a small but easily-scanned QR code (e.g., an online QR code), whereas an offline QR-based transaction can be facilitated by a large but difficult-to-scan QR code (e.g., an offline QR code). In various cases, the smart device 104 can fail to know which type of transaction the point-of-sale device 106 is configured/designed to perform. Thus, if existing techniques are implemented, there is the risk that the smart device 104 will present/render the incorrect type of QR code to the point-of-sale device 106 (e.g., the smart device 104 might present an online QR code when the point-of-sale device 106 is expecting an offline QR code; or the smart device 104 might present an offline QR code when the point-of-sale device 106 is expecting an online QR code). In various aspects, as explained herein, the video QR code system 102 can address this technical problem.

In various embodiments, the video QR code system 102 can comprise a processor 108 (e.g., computer processing unit, microprocessor) and a computer-readable memory 110 that is operably coupled to the processor 108. The memory 110 can store computer-executable instructions which, upon execution by the processor 108, can cause the processor 108 and/or other components of the video QR code system 102 (e.g., context component 112, code component 114, decomposition component 116, display component 118) to perform one or more acts. In various embodiments, the memory 110 can store computer-executable components (e.g., context component 112, code component 114, decomposition component 116, display component 118), and the processor 108 can execute the computer-executable components.

In various embodiments, the video QR code system 102 can comprise a context component 112. In various aspects, the context component 112 can electronically receive and/or otherwise access context data that is captured, recorded, and/or otherwise generated by the smart device 104. In various instances, the context data can specify and/or indicate any suitable information relating to the transaction that is desired to be facilitated between the smart device 104 and the point-of-sale device 106 (e.g., current location of the smart device 104, current time/date, identity of the merchant that owns/operates the point-of-sale device 106, identity of a product/service that is to be provided by the merchant that owns/operates the point-of-sale device 106, amount of money to be paid to the merchant that owns/operates the point-of-sale device 106). In some cases, the context component 112 can electronically retrieve the context data from the smart device 104. In other cases, the smart device 104 can electronically transmit the context data to any other suitable computing device (not shown), and the context component 112 can electronically retrieve the context data from such computing device.

In various embodiments, the video QR code system 102 can comprise a code component 114. In various aspects, the code component 114 can electronically select and/or identify a particular QR code that corresponds to the context data. More specifically, the code component 114 can, in various embodiments, electronically store, maintain, and/or otherwise access a QR code bank. In various instances, the QR code bank can correlate and/or map a set of QR codes to a set of contexts. In various cases, the code component can query the set of contexts for the context data that is received/retrieved by the context component 112. Once the code component 114 has found the context data within the set of contexts, the code component 114 can identify, within the set of QR codes, the particular QR code that corresponds to the context data. In various instances, the particular QR code can contain various barcode characters that are sufficient to facilitate an online transaction, and the particular QR code can also contain various other barcode characters that are sufficient for facilitate an offline transaction.

In various embodiments, the video QR code system 102 can comprise a decomposition component 116. In various aspects, the decomposition component 116 can electronically decompose, deconstruct, divide, and/or otherwise segment the particular QR code into a static QR fragment and a set of dynamic QR fragments. In various instances, the static QR fragment can be the various barcode characters of the particular QR code that are sufficient to facilitate an online transaction. In contrast, the set of dynamic QR fragments can collectively be the various other barcode characters of the particular QR code that are sufficient to facilitate an offline transaction. In various cases, the static QR fragment can exhibit any suitable size (e.g., can comprise any suitable number of characters). For example, the static QR fragment can, in some embodiments, comprise on the order of tens or dozens of characters (e.g., 10 to 20 characters). Similarly, each dynamic QR fragment can exhibit any suitable size (e.g., can comprise any suitable number of characters). For example, each dynamic QR fragment can comprise on the order of tens or dozens of characters (e.g., 10 to 50 characters).

In various embodiments, the video QR code system 102 can comprise a display component 118. In various aspects, the display component 118 can electronically generate a set of frames (e.g., video frames) based on the static QR fragment and the set of dynamic QR fragments. More specifically, each frame can depict and/or illustrate both the static QR fragment and a respectively corresponding one of the set of dynamic QR fragments. In various cases, the display component 118 can then electronically cause and/or instruct the smart device 104 to render, on its electronic screen/monitor, the set of frames in looped sequence. This can create a visual effect the resembles a rapidly changing QR code, and such rapidly changing QR code can be referred to as a video QR code and/or as an animated QR code.

Note that, because the static QR fragment can include tens or dozens of characters, and because each dynamic QR fragment can also include tens or dozens of characters, each frame can depict and/or illustrate on the order of tens or dozens of characters. Stated differently, it can be the case that no frame depicts and/or illustrates on the order of hundreds of characters. Thus, if the optical scanner of the point-of-sale device 106 is configured/designed to scan/read only tens or dozens of characters at a time (e.g., configured/designed to facilitate an online transaction), the point-of-sale device 106 can successfully scan any one frame of the set of frames that are rendered on the electronic screen/monitor of the smart device 104. Accordingly, the point-of-sale device 106 can extract the static QR fragment from the scanned frame (e.g., each frame depicts the static QR fragment) and can facilitate an online transaction based on the static QR fragment. On the other hand, if the optical scanner of the point-of-sale device 106 is configured/designed to scan/read hundreds of characters at a time (e.g., configured/designed to facilitate an offline transaction), the point-of-sale device 106 can successfully scan all of the set of frames that are rendered on the electronic screen/monitor of the smart device 104. Accordingly, the point-of-sale device 106 can extract the set of dynamic QR fragments from the scanned frames (e.g., if all frames are scanned, all of the set of dynamic QR fragments can be obtained) and can facilitate an offline transaction based on the set of dynamic QR fragments. In either case, the smart device 104 can fail to know which type of transaction (e.g., online vs. offline) that the point-of-sale device 106 is configured/designed to perform. Nevertheless, the smart device 104 can render the video/animated QR code, and the point-of-sale device 106 can selectively scan/read the video/animated QR code without struggle, thereby allowing the point-of-sale device 106 to facilitate the transaction.

Figure 2:
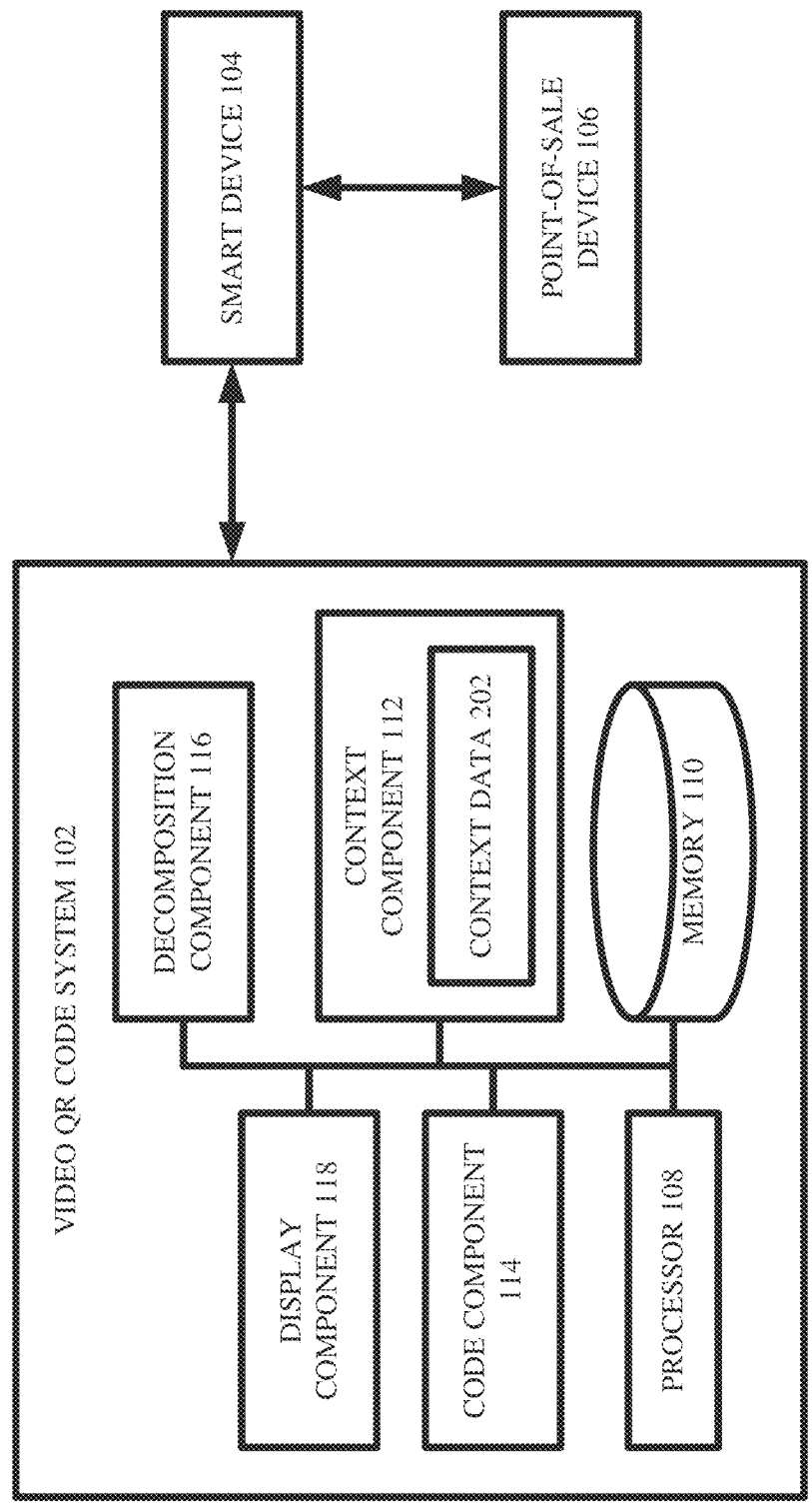
FIG. 2 illustrates a high-level block diagram of an example, non-limiting system including context data that facilitates video/animated QR codes in accordance with one or more embodiments described herein.

FIG. 2 illustrates a high-level block diagram of an example, non-limiting system 200 including context data that can facilitate video/animated QR codes in accordance with one or more embodiments described herein. As shown, the system 200 can, in some cases, comprise the same components as the system 100, and can further comprise context data 202.

In various embodiments, the context component 112 can electronically receive and/or otherwise electronically access the context data 202. In various aspects, the smart device 104 can electronically generate and/or capture the context data 202, and the context component 112 can electronically retrieve the context data 202 from the smart device 104. In various other aspects, the smart device 104 can electronically generate and/or capture the context data 202, the smart device 104 can electronically transmit the context data 202 to any other suitable computing device (not shown), and the context component 112 can electronically retrieve the context data 202 from such computing device. In any case, the context component 112 can access and/or obtain the context data 202, such that other components of the video QR code system 102 can electronically interact with and/or manipulate the context data 202.

In various aspects, the context data 202 can be any suitable data that describes a current context of the smart device 104 and/or that otherwise describes the transaction that is desired to be facilitated between the smart device 104 and the point-of-sale device 106.

As an example, the context data 202 can indicate a current geolocation of the smart device 104 (e.g., the context data 202 can specify where the smart device 104 is currently located in its attempt to transact with the point-of-sale device 106). In various cases, the smart device 104 can determine the geolocation via any suitable technique. For instance, in some cases, the smart device 104 can include one or more global positioning sensors, and the smart device 104 can use such one or more global positioning sensors to identify the geolocation. In other cases, the smart device 104 can determine the geolocation by electronically communicating with one or more geolocation beacons that are within any suitable proximity of the smart device 104. In various instances, the context data 202 can recite the geolocation at any suitable level of granularity (e.g., can specify a continent, country, state, city, address, latitude, longitude, and/or elevation).

As another example, the context data 202 can indicate a timestamp that is captured by the smart device 104 (e.g., the context data 202 can specify a current time and/or date at which the smart device 104 is attempting to transact with the point-of-sale device 106). In various cases, the smart device 104 can determine the timestamp via any suitable technique. For instance, in some cases, the smart device 104 can include one or more electronic clocks and/or calendars, and the smart device 104 can use such one or more electronic clocks and/or calendars to determine the timestamp. In various instances, the context data 202 can recite the timestamp at any suitable level of granularity (e.g., the timestamp can indicate the current year, month, day, hour, minute, second, and/or fraction of a second).

As yet another example, the context data 202 can indicate an identity of the merchant that owns/operates the point-of-sale device 106 (e.g., the context data 202 can specify a name and/or other identifier related to the merchant). In various cases, the smart device 104 can determine the merchant identity via any suitable technique. For instance, in some cases, the smart device 104 can infer the merchant identity based on the current geolocation and/or timestamp of the smart device 104. In other cases, the smart device 104 can capture (e.g., via a camera integrated into the smart device 104) an image associated with the merchant and can infer the merchant identity by applying pattern recognition to the image. In still other cases, the smart device 104 can determine the merchant identity by electronically communicating with an electronic beacon associated with the point-of-sale device 106.

As still another example, the context data 202 can indicate an identity of a product/service that the customer that owns/operates the smart device 104 is attempting to procure from the merchant that owns/operates the point-of-sale device 106 (e.g., the context data 202 can specify a serial number of the product/service). In various cases, the smart device 104 can determine the product/service identity via any suitable technique. For instance, in some cases, the smart device 104 can capture an image associated with the product/service and can infer the product/service identity by applying pattern recognition to the image. In other cases, the smart device 104 can determine the product/service identity by electronically communicating with an electronic beacon associated with the point-of-sale device 106.

As even another example, the context data 202 can indicate a monetary amount that is involved in the transaction between the smart device 104 and the point-of-sale device 106 (e.g., the context data 202 can specify one or more prices that the customer that owns/operates the smart device 104 is expected to pay to the merchant that owns/operates the point-of-sale device 106). In various cases, the smart device 104 can determine the monetary amount via any suitable technique. For instance, the smart device 104 can determine the monetary amount by electronically communicating with an electronic beacon associated with the point-of-sale device 106.

Figure 3:
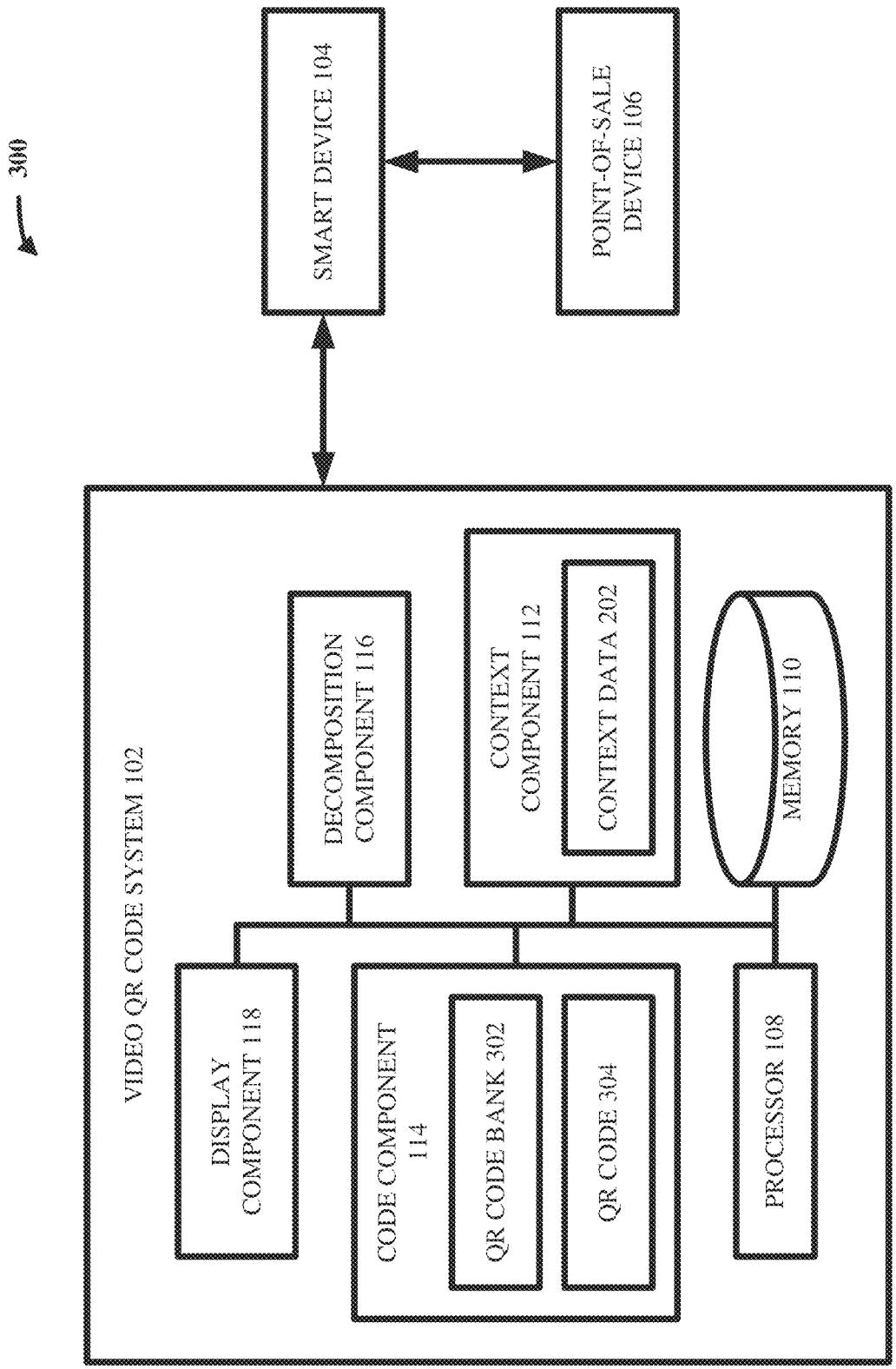
FIG. 3 illustrates a high-level block diagram of an example, non-limiting system including a QR code bank that facilitates video/animated QR codes in accordance with one or more embodiments described herein.

FIG. 3 illustrates a high-level block diagram of an example, non-limiting system 300 including a QR code bank that can facilitate video/animated QR codes in accordance with one or more embodiments described herein. As shown, the system 300 can, in some cases, comprise the same components as the system 200, and can further comprise a QR code bank 302 and/or a QR code 304.

In various embodiments, the code component 114 can electronically store, electronically maintain, electronically control, and/or otherwise electronically access the QR code bank 302. In various aspects, the QR code bank 302 can be any suitable data structure that correlates, maps, and/or otherwise links a set of QR codes with a set of contexts. In various instances, the code component 114 can identify the QR code 304 in the QR code bank 302, based on the context data 202. More specifically, the code component 114 can electronically iterate and/or query through the set of contexts that are stored in the QR code bank 302, in search for the context data 202. After the code component 114 has found the context data 202 within the set of contexts, the code component 114 can identify which QR code in the set of QR codes that are stored in the QR code bank 302 corresponds to the context data 202. In various cases, the QR code that corresponds to the context data 202 can be considered as the QR code 304. This is further described with respect to FIG. 4.

Figure 4:
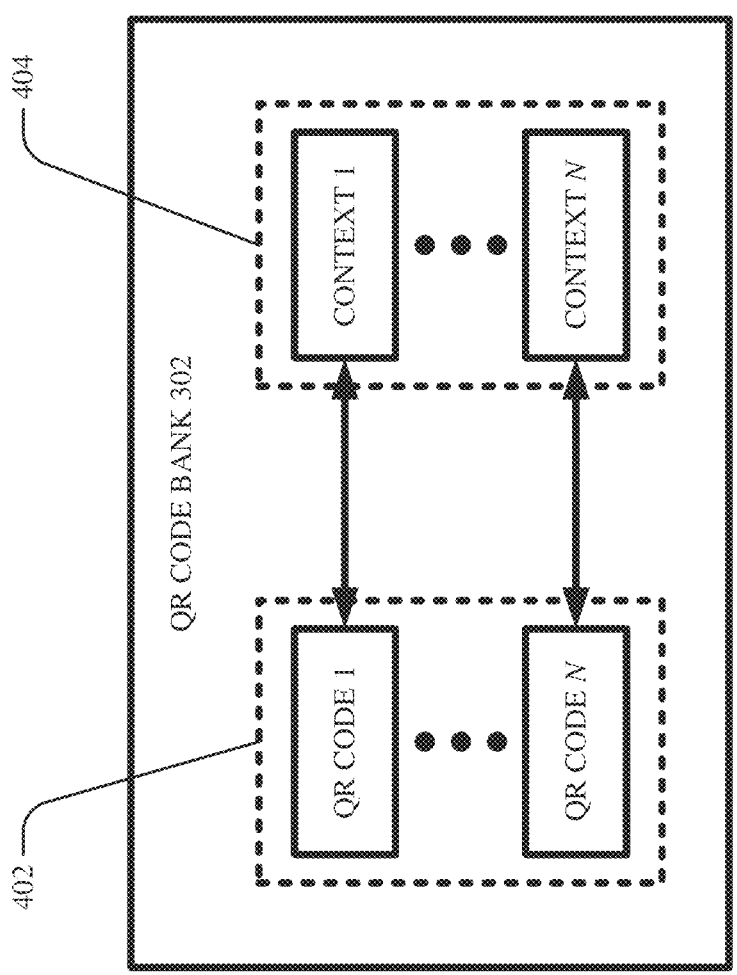
FIG. 4 illustrates a high-level block diagram of an example, non-limiting QR code bank in accordance with one or more embodiments described herein.

FIG. 4 illustrates a high-level block diagram of an example, non-limiting QR code bank in accordance with one or more embodiments described herein. In other words, FIG. 4 shows a non-limiting example embodiment of the QR code bank 302.

As shown, in various aspects, the QR code bank 302 can electronically store a set of QR codes 402. In various cases, the set of QR codes 402 can comprise any suitable number of different and/or unique QR codes. For example, the set of QR codes 402 can include n different and/or unique QR codes, for any suitable positive integer n: a QR code 1 to a QR code n. As also shown, the QR code bank 302 can further electronically store a set of contexts 404. In various instances, the set of contexts 404 can respectively correspond to the set of QR codes 402. That is, the set of contexts 404 can include n different and/or unique contexts: a context 1 to a context n. In various cases, as shown, the QR code 1 can correspond to the context 1. In other words, the context 1 can represent one or more geolocations, one or more timestamps, one or more merchant identities, one or more product/service identities, and/or one or more monetary amounts, and the QR code 1 can be any suitable QR code that is permitted and/or required to be used in a transaction that is taking place at such one or more geolocations, that is taking place during such one or more timestamps, that involves such one or more merchant identities, that involves such one or more product/service identities, and/or that involves such one or more monetary amounts. Similarly, the QR code n can correspond to the context n. That is, the context n can represent one or more geolocations, one or more timestamps, one or more merchant identities, one or more product/service identities, and/or one or more monetary amounts, and the QR code n can be any suitable QR code that is permitted and/or required to be used in a transaction that is taking place at such one or more geolocations, that is taking place during such one or more timestamps, that involves such one or more merchant identities, that involves such one or more product/service identities, and/or that involves such one or more monetary amounts.

Although FIG. 4 illustrates the set of QR codes 402 and the set of contexts 404 as respectively corresponding in a one-to-one fashion, this is a mere non-limiting example. Those having ordinary skill in the art will appreciate that non-one-to-one correspondence can be implemented in various embodiments. For example, in some cases, two or more QR codes in the set of QR codes 402 can correspond to the same context in the set of contexts 404, and/or two or more contexts in the set of contexts 404 can correspond to the same QR code in the set of QR codes 402.

In some cases, the code component 114 can electronically store and/or maintain the QR code bank 302. In other cases, however, the QR code bank 302 can be maintained by any suitable third-party computing device (e.g., a payment processor and/or payment server, not shown), and the code component 114 can electronically and/or remotely access the QR code bank 302 by interacting with and/or receiving permission from the third-party computing device.

In various cases, once the context component 112 has received and/or accessed the context data 202, the code component 114 can electronically search for the context data 202 in the set of contexts 404. After finding the context data 202 in the set of contexts 404, the code component 114 can electronically identify which of the set of QR codes 402 corresponds to the context data 202. In various cases, such QR code can be considered as the QR code 304.

In various aspects, the QR code 304 can represent and/or correspond to financial instrument information of the customer that owns/operates the smart device 104. For example, the QR code 304 can represent and/or correspond to a credit card number of the customer. As another example, the QR code 304 can represent and/or correspond to a bank account number of the customer.

In any case, the QR code 304 can be considered as a total set of barcode characters, where some subset of such barcode characters contains and/or represents sufficient information to facilitate an online transaction, and where a remainder of such barcode characters contains and/or represents sufficient information to facilitate an offline transaction. As a non-limiting example, the QR code 304 can contain hundreds (e.g., 300 to 500) of characters in total. In various cases, a small amount of such hundreds of total characters (e.g., 12 to 18 characters) can represent and/or otherwise serve as an identifier and/or a token, where such identifier and/or token can be used to locate transaction verification data that is stored in one or more electronic databases (not shown), and where such transaction verification data can be used by the point-of-sale device 106 to determine whether to trust the smart device 104. In various instances, the remainder of such hundreds of total characters can directly represent and/or otherwise convey such transaction verification data. Accordingly, the QR code 304 can be considered as containing enough information to facilitate both and/or either of an online transaction and an offline transaction.

Figure 5:
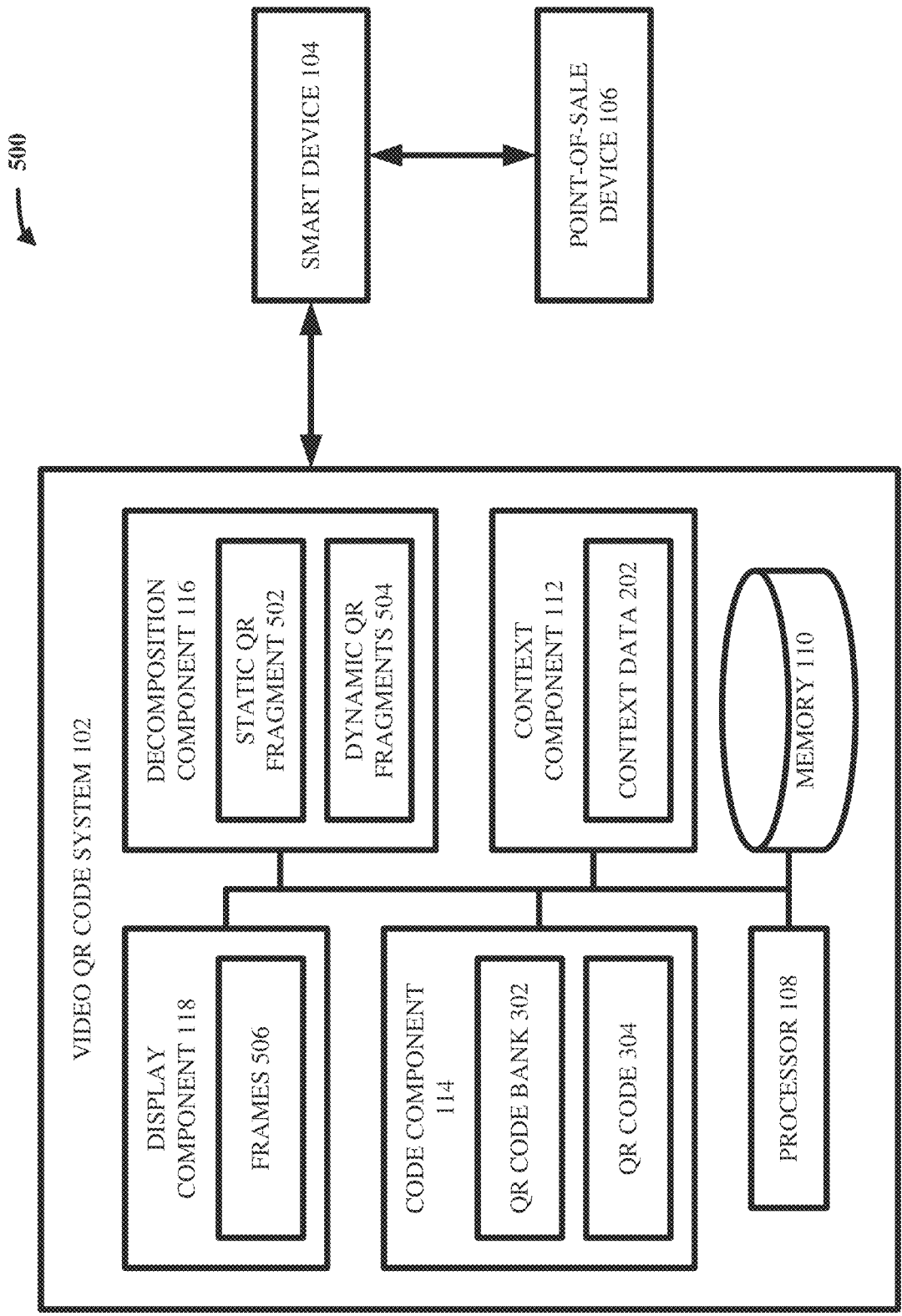
FIG. 5 illustrates a high-level block diagram of an example, non-limiting system including a static QR fragment, a set of dynamic QR fragments, and a set of frames that facilitates video/animated QR codes in accordance with one or more embodiments described herein.

FIG. 5 illustrates a high-level block diagram of an example, non-limiting system 500 including a static QR fragment, a set of dynamic QR fragments, and a set of frames that can facilitate video/animated QR codes in accordance with one or more embodiments described herein. As shown, the system 500 can, in some cases, comprise the same components as the system 400, and can further comprise a static QR fragment 502, a set of dynamic QR fragments 504, and/or a set of frames 506.

In various embodiments, the decomposition component 116 can electronically decompose, deconstruct, divide, segment, and/or otherwise fracture the QR code 304 into the static QR fragment 502 and the set of dynamic QR fragments 504. In various aspects, the static QR fragment 502 can be the subset of barcode characters of the QR code 304 that contains and/or represents sufficient information to facilitate an online transaction. In contrast, the set of dynamic QR fragments 504 can be the remaining barcode characters of the QR code 304 that collectively contain and/or represent sufficient information to facilitate an offline transaction. For example, if the QR code 304 contains hundreds of characters, the static QR fragment 502 can be the 10-20 of those hundreds of characters that can serve as an identifier and/or token for locating transaction verification data in one or more remote databases, whereas the set of dynamic QR fragments 504 can be the remainder of those hundreds of characters that can directly represent/convey the transaction verification data.

In various embodiments, the display component 118 can electronically generate the set of frames 506, based on the static QR fragment 502 and the set of dynamic QR fragments 504. More specifically, each frame of the set of frames 506 can visually depict and/or illustrate the static QR fragment 502 and a respectively corresponding one of the set of dynamic QR fragments 504.

Various of these details are shown more clearly with respect to FIGS. 6-16.

Figure 6:
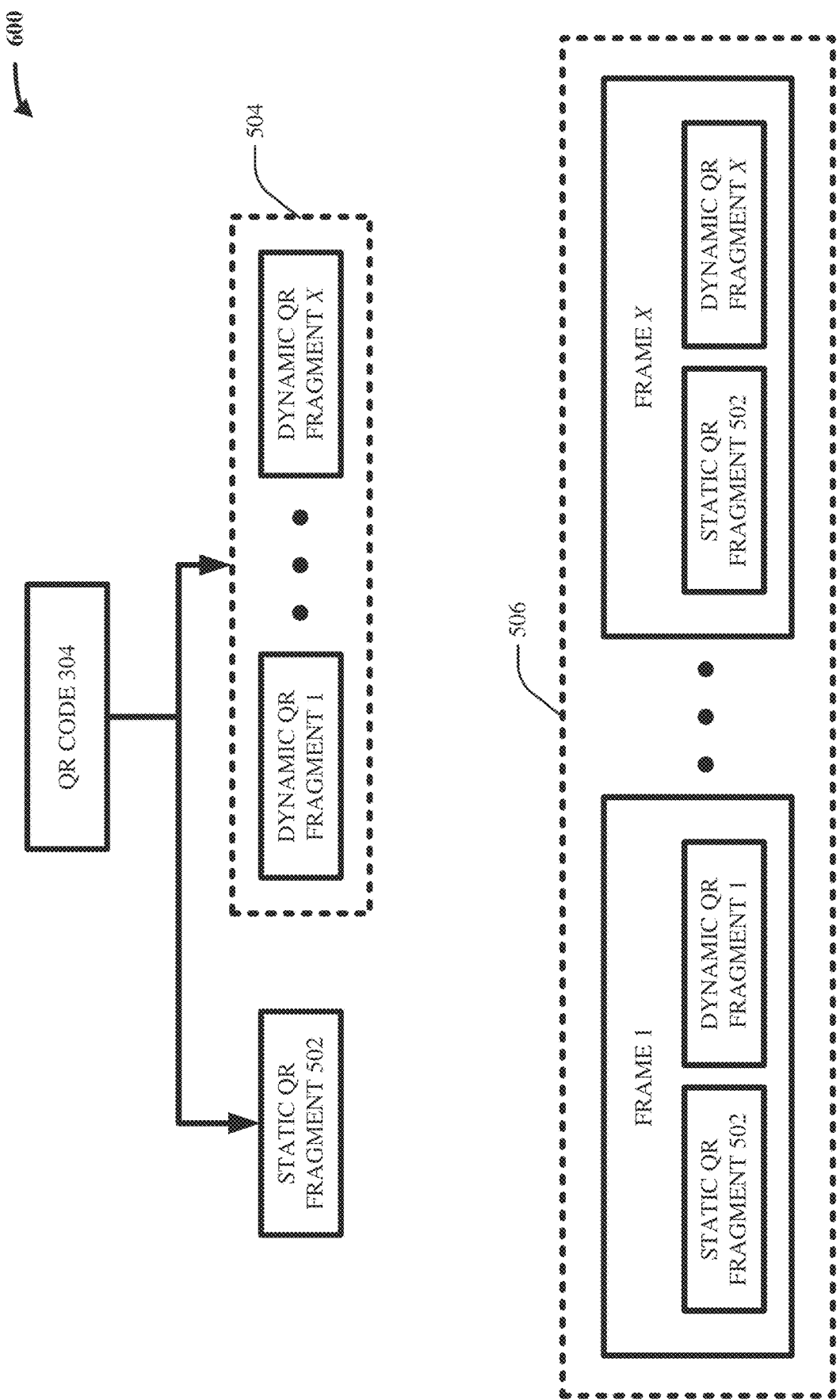
FIG. 6 illustrates an example, non-limiting block diagram showing how a static QR fragment and a set of dynamic QR fragments can be obtained from a QR code and showing how a set of frames can be generated based on the static QR fragment and the set of dynamic QR fragments in accordance with one or more embodiments described herein.

FIG. 6 illustrates an example, non-limiting block diagram 600 showing how the static QR fragment 502 and the set of dynamic QR fragments 504 can be obtained from the QR code 304, and also showing how the set of frames 506 can be generated based on the static QR fragment 502 and the set of dynamic QR fragments 504 in accordance with one or more embodiments described herein.

In various aspects, as shown, the decomposition component 116 can divide the QR code 304 into the static QR fragment 502 and the set of dynamic QR fragments 504, where the set of dynamic QR fragments 504 include x fragments, for any suitable positive integer x: a dynamic QR fragment 1 to a dynamic QR fragment x. In other words, the decomposition component 116 can physically break the QR code 304 into x+1 different, unique, and/or distinct pieces, where such x+1 different, unique, and/or distinct pieces can fit together, like the pieces of a puzzle, to form the QR code 304. As mentioned above, the static QR fragment 502 can be the subset of barcode characters of the QR code 304 that represent and/or convey sufficient information to facilitate an online transaction. In contrast, the set of dynamic QR fragments 504 can collectively be the remaining barcode characters of the QR code 304 that, in the aggregate, represent and/or convey sufficient information to facilitate an offline transaction. In practice, the QR code 304 can have hundreds of characters (e.g., 300 to 500 characters), and the static QR fragment 502 can have tens or dozens of characters (e.g., 12 to 18 characters). Thus, in practice, the set of dynamic QR fragments 504 can have hundreds of characters (e.g., 300 to 500 characters minus 12 to 18 characters). Accordingly, the decomposition component 116 can break the set of dynamic QR fragments 504 up into x smaller pieces (e.g., each individual dynamic QR fragment can have tens or dozens of characters (e.g., 10 to 50 characters)).

Once the decomposition component 116 has created the static QR fragment 502 and the set of dynamic QR fragments 504, the display component 118 can generate the set of frames 506. As shown, because the set of dynamic QR fragments 504 can contain x fragments, the set of frames 506 can contain x frames (e.g., a frame 1 to a frame x), with each frame depicting and/or illustrating the static QR fragment 502 and a respectively corresponding one of the set of dynamic QR fragments 504. For instance, as shown, the frame 1 can depict/illustrate both the static QR fragment 502 and the dynamic QR fragment 1. Similarly, the frame x can depict/illustrate both the static QR fragment 502 and the dynamic QR fragment x. In various cases, the display component 118 can electronically instruct the smart device 104 to render on its electronic screen/monitor the set of frames 506 in looped sequence. Such rendition can create a visual effect that resembles and/or otherwise visually looks like a rapidly changing QR code. Such rapidly changing QR code can be referred to as a video/animated QR code.

To help clarify various of the above discussion, consider FIG. 7-16.

Figure 7:
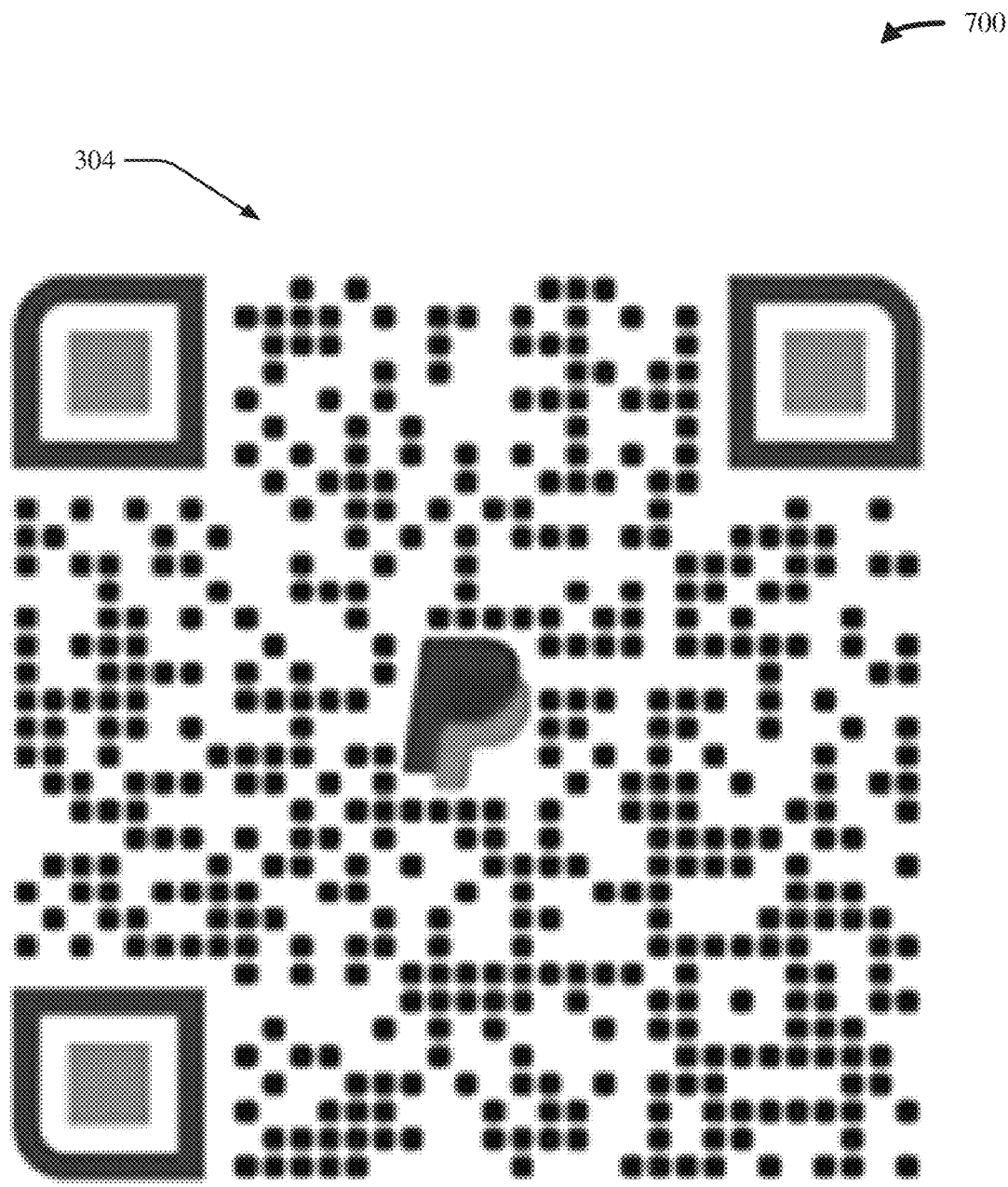
FIG. 7 illustrates an example, non-limiting QR code in accordance with one or more embodiments described herein.

FIG. 7 illustrates an example, non-limiting view 700 of a QR code in accordance with one or more embodiments described herein. In other words, FIG. 7 depicts a non-limiting example of the QR code 304. As shown, the QR code 304 can be a two-dimensional barcode that exhibits any suitable arrangement of any suitable number of barcode characters. In this particular example, the QR code 304 can contain hundreds of barcode characters (e.g., about 400 barcode characters).

Figure 8:
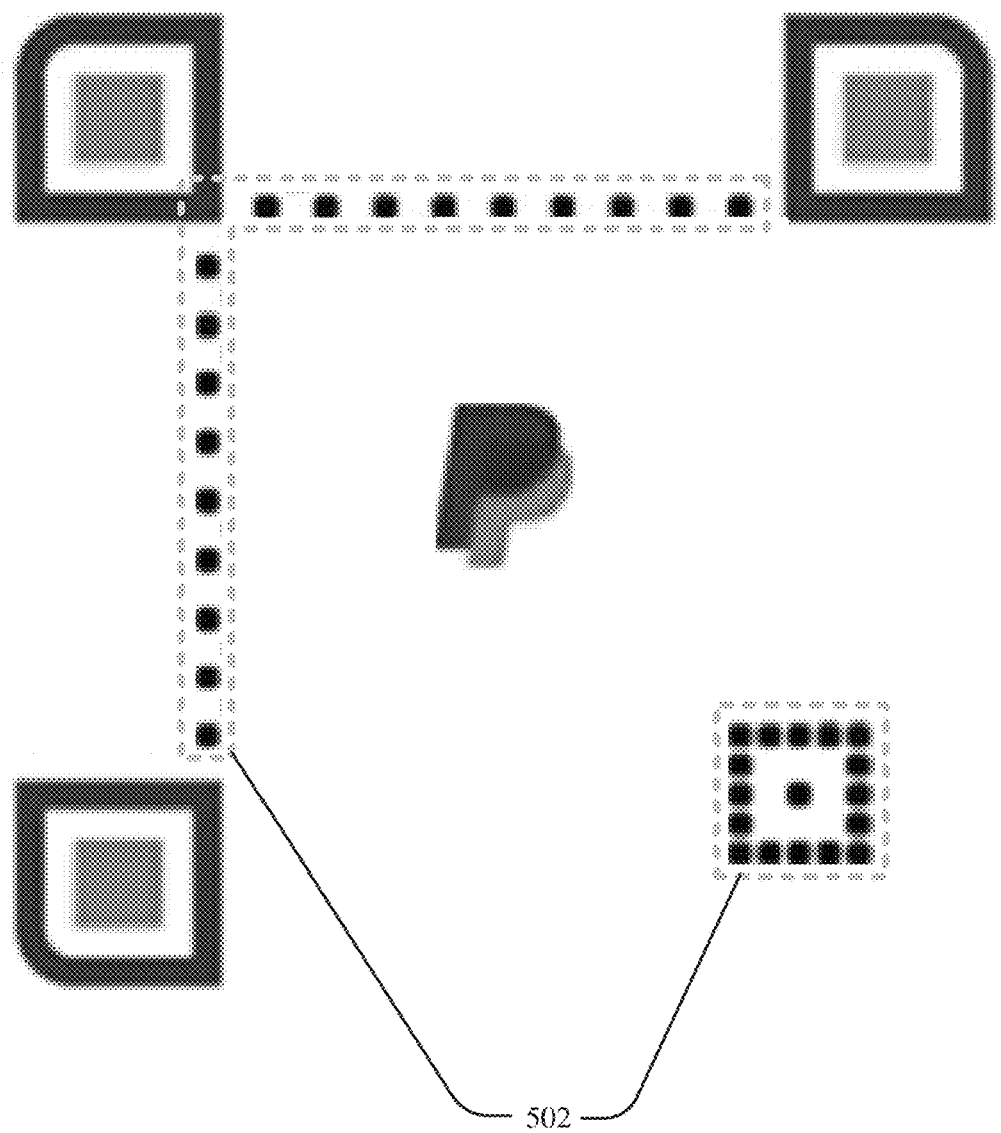
FIG. 8 illustrates an example, non-limiting static QR fragment in accordance with one or more embodiments described herein.

FIG. 8 illustrates an example, non-limiting view 800 of the static QR fragment in accordance with one or more embodiments described herein. That is, FIG. 8 depicts a non-limiting example of the static QR fragment 502. As shown, the static QR fragment 502 can, in various cases, be a subset of the barcode characters that make up the QR code 304. In various aspects, the static QR fragment 502 can exhibit any suitable arrangement of any suitable number of barcode characters. In this particular non-limiting example, the static QR fragment 502 can include a square arrangement of barcode characters from the lower-right portion of the QR code 304, a linearly vertical arrangement of barcode characters from the left half of the QR code 304, and/or a linearly horizontal arrangement of barcode characters from the top half of the QR code 304. Accordingly, as shown, the static QR fragment 502 can contain on the order of tens or dozens of barcode characters, which can be considered as small in comparison to the total size of the QR code 304 (e.g., the QR code 304 can contain hundreds of barcode characters in total). As mentioned above, the static QR fragment 502 can represent and/or otherwise convey sufficient information so as to facilitate an online transaction. For example, the barcode characters of the static QR fragment 502 can represent and/or serve as a token, which token can be used to locate transaction verification data in one or more remote databases.

Figure 9:
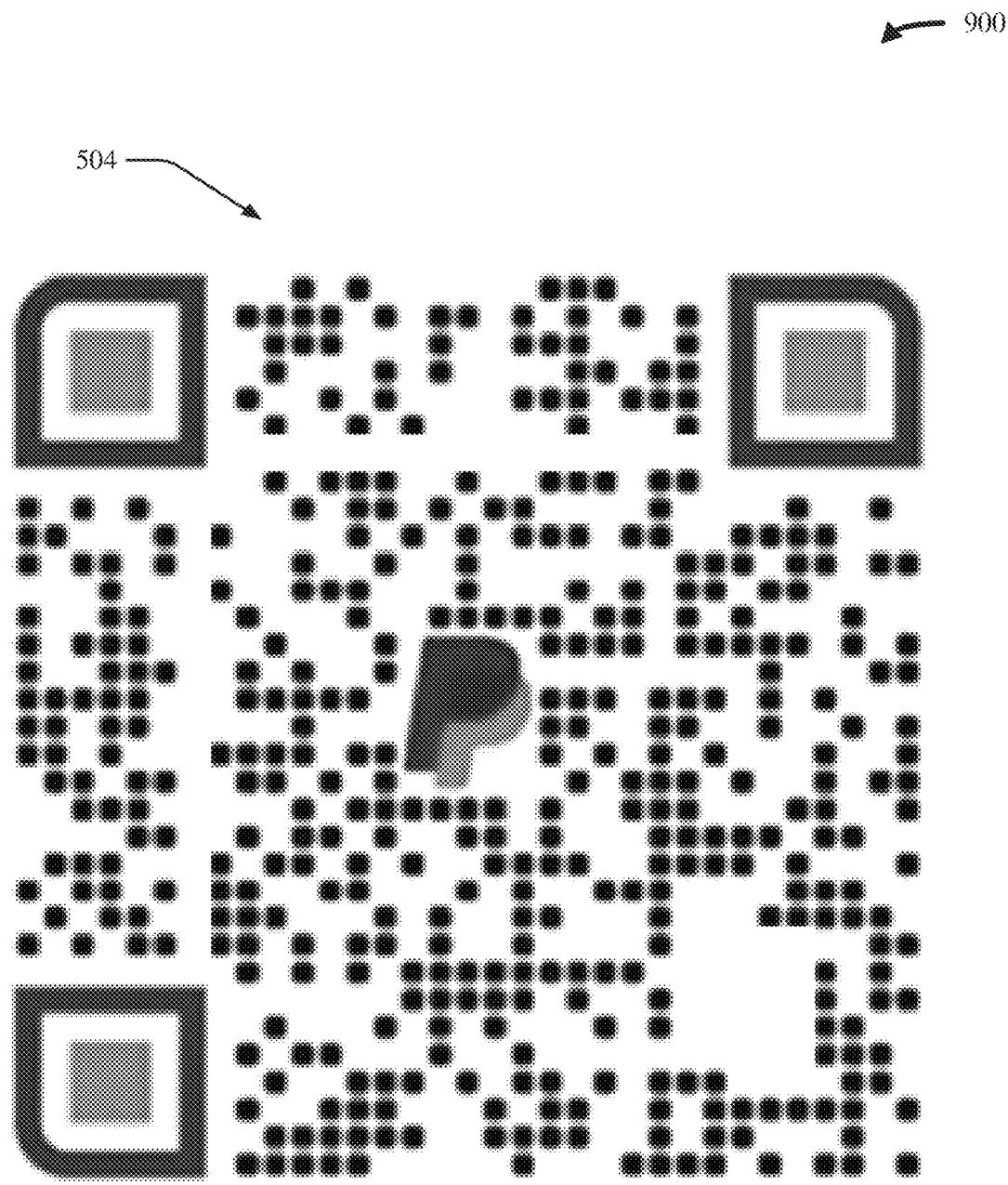
FIGS. 9-10 illustrate an example, non-limiting set of dynamic QR fragments in accordance with one or more embodiments described herein.
Figure 10:
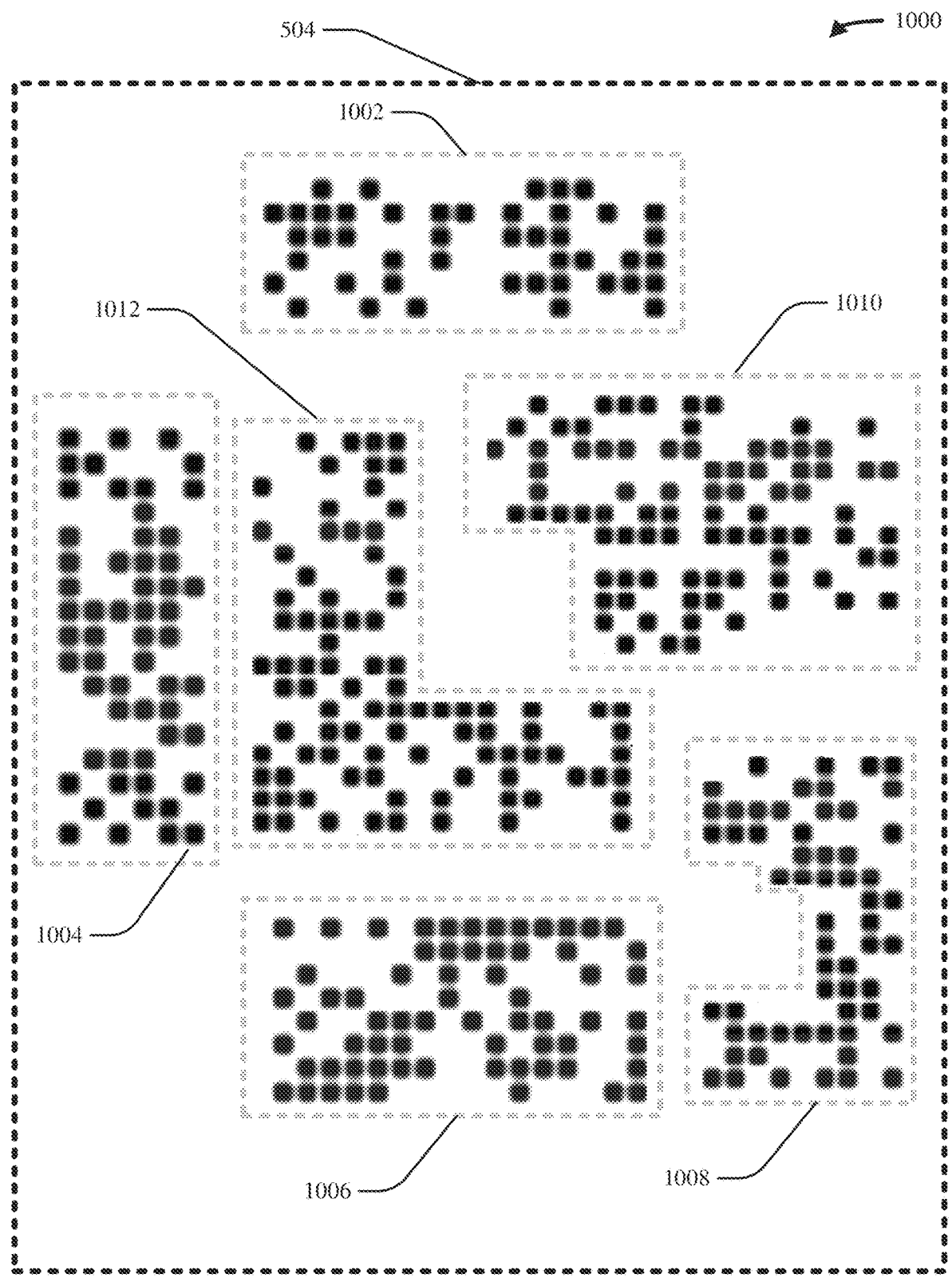

FIGS. 9-10 illustrate an example, non-limiting views 900-1000 of a set of dynamic QR fragments in accordance with one or more embodiments described herein. That is, FIGS. 9-10 depict a non-limiting example of the set of dynamic QR fragments 504. As shown in FIG. 9, the set of dynamic QR fragments 504 can be considered as the barcode characters of the QR code 304 that would remain if the static QR fragment 502 were deleted, erased, and/or otherwise removed from the QR code 304 (e.g., the static QR fragment 502 is not depicted in FIG. 9). In various cases, the set of dynamic QR fragments 504 can exhibit any suitable arrangement of any suitable number of barcode characters. In this particular non-limiting example, as shown, the set of dynamic QR fragments 504 can contain on the order of hundreds of barcode characters, which can be considered as large in relation to the total size of the QR code 304 (e.g., the QR code 304 can contain hundreds of barcode characters in total, and the static QR fragment 502 can contain tens or dozens of barcode characters, which leaves on the order of hundreds of barcode characters to be considered as the set of dynamic QR fragments 504).

In various cases, as shown in FIG. 10, the decomposition component 116 can break up the set of dynamic QR fragments 504 into any suitable number of smaller dynamic QR fragments, such that each dynamic QR fragment contains on the order of tens or dozens of barcode characters (e.g., such that each dynamic QR fragment is about of comparable size as the static QR fragment 502). In this particular example, the set of dynamic QR fragments 504 can be broken up into six different dynamic QR fragments: a dynamic QR fragment 1002, a dynamic QR fragment 1004, a dynamic QR fragment 1006, a dynamic QR fragment 1008, a dynamic QR fragment 1010, and/or a dynamic QR fragment 1012. As mentioned above, the set of dynamic QR fragments 504 can collectively represent and/or otherwise convey sufficient information so as to facilitate an offline transaction. For example, the barcode characters of the set of dynamic QR fragments 504 can, all together, directly represent and/or serve as transaction verification data. Note that it can be the case that no dynamic QR fragment individually contains sufficient information to facilitate the offline transaction (e.g., any one of the dynamic QR fragments 1002-1012 can, by itself, not contain enough information to establish trust in an offline transaction).

Although FIGS. 9-10 illustrate each of the set of dynamic QR fragments 504 as being non-overlapping with each other, this is a mere non-limiting example and is for ease of illustration. Those having ordinary skill in the art will appreciate that the any of the set of dynamic QR fragments 504 can be overlapping with each other (e.g., two or more dynamic QR fragments can share one or more barcode characters with each other; stated differently, a barcode character of the QR code 304 can belong to two or more dynamic QR fragments at once).

Moreover, although FIGS. 9-10 illustrate each of the set of dynamic QR fragments 504 as being shaped in a compact and/or contiguous arrangement, this is a mere non-limiting example and for ease of illustration. Those having ordinary skill in the art will appreciate that any given dynamic QR fragment can exhibit any suitable arrangement as desired (e.g., a single dynamic QR fragment can comprise barcode characters that are laid out in a non-compact, dis-contiguous, and/or distributed arrangement).

As can be seen from FIGS. 8-10, the static QR fragment 502 and the set of dynamic QR fragments 504 can be considered as puzzle pieces that can be physically fit together to form the QR code 304. As mentioned above, the display component 118 can generate the set of frames 506 based on such puzzle pieces.

FIGS. 11-16 illustrate example, non-limiting frames, each depicting a static QR fragment and a dynamic QR fragment, in accordance with one or more embodiments described herein. That is, FIGS. 11-16 depict non-limiting examples of the set of frames 506, which can be created based on the static QR fragment 502 and the set of dynamic QR fragments 504. More specifically, each frame can visually depict and/or illustrate the static QR fragment 502 and a respectively corresponding one of the set of dynamic QR fragments 504. Because the set of dynamic QR fragments 504 can include six fragments in this non-limiting example, the set of frames 506 can include six frames: a frame 1100, a frame 1200, a frame 1300, a frame 1400, a frame 1500, and/or a frame 1600.

Figure 11:
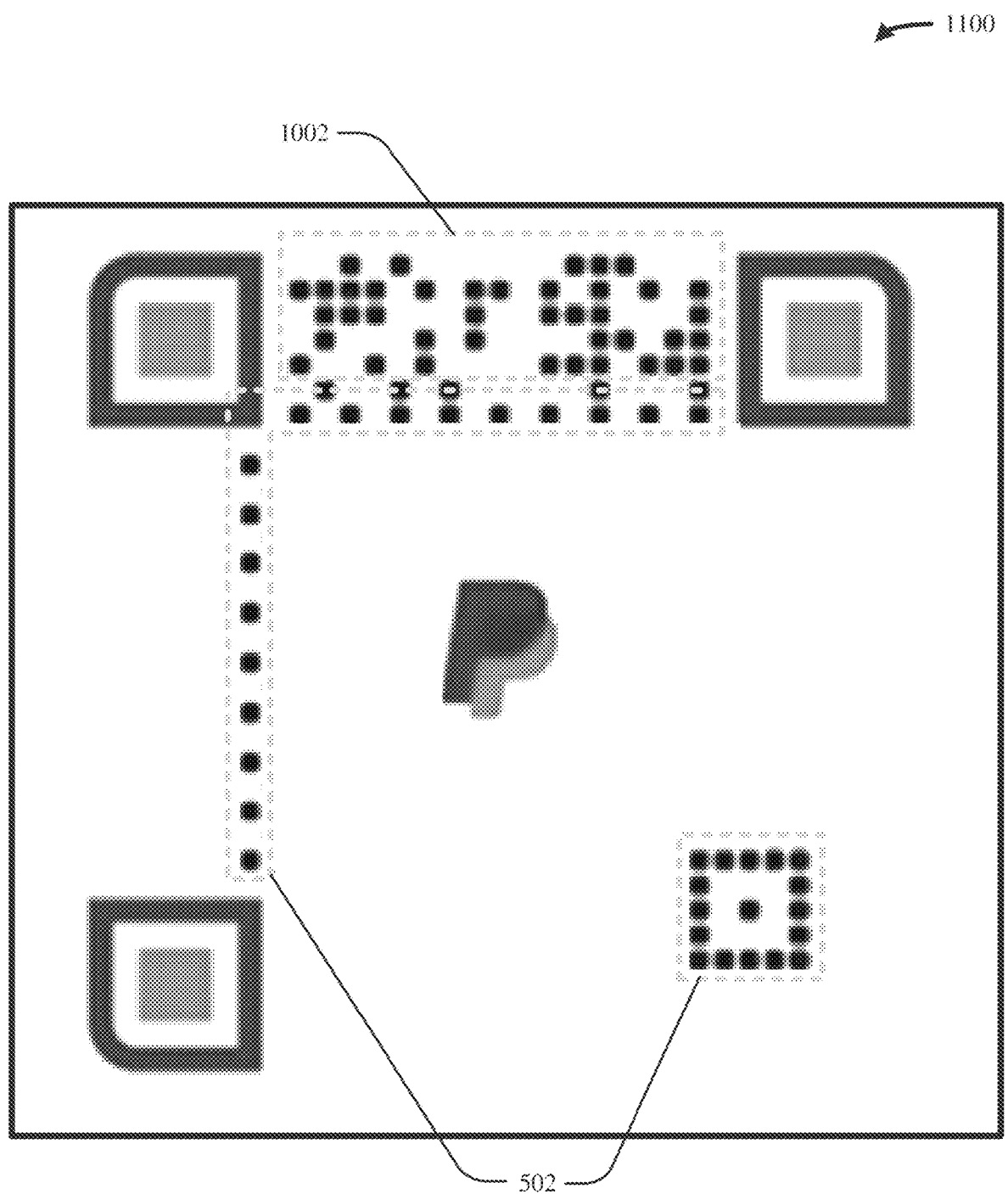
FIGS. 11-16 illustrate example, non-limiting frames, each depicting a static QR fragment and a dynamic QR fragment, in accordance with one or more embodiments described herein.

In various aspects, FIG. 11 shows the frame 1100. As shown, the frame 1100 can illustrate/depict the static QR fragment 502 in the position and/or orientation that it would have in the QR code 304. As also shown, the frame 1100 can additionally illustrate/depict the dynamic QR fragment 1002, which is one of the set of dynamic QR fragments 504, in the position and/or orientation that it would have in the QR code 304. As can be seen, the frame 1100 can avoid depicting/illustrating any of the remaining fragments in the set of dynamic QR fragments 504 (e.g., the frame 1100 can lack the dynamic QR fragment 1004, the dynamic QR fragment 1006, the dynamic QR fragment 1008, the dynamic QR fragment 1010, and the dynamic QR fragment 1012). Accordingly, as shown, the frame 1100 can contain on the order of tens or dozens of barcode characters, instead of the hundreds of characters that are included in the QR code 304 as a whole.

Figure 12:
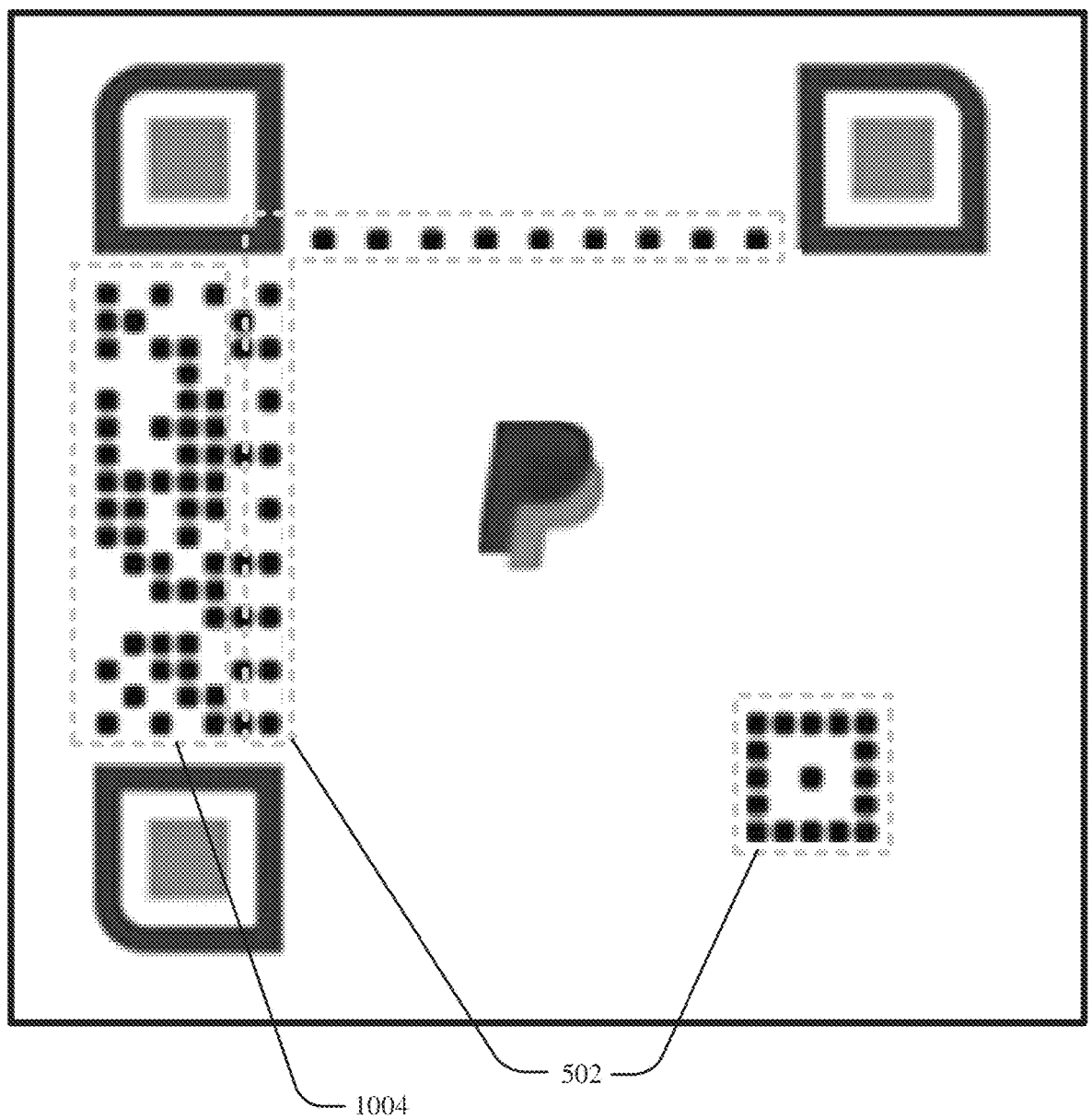

In various aspects, FIG. 12 shows the frame 1200. As shown, the frame 1200 can illustrate/depict the static QR fragment 502 in the position and/or orientation that it would have in the QR code 304. As also shown, the frame 1200 can further illustrate/depict the dynamic QR fragment 1004, which is one of the set of dynamic QR fragments 504, in the position and/or orientation that it would have in the QR code 304. As can be seen, the frame 1200 can avoid depicting/illustrating any of the remaining fragments in the set of dynamic QR fragments 504 (e.g., the frame 1200 can lack the dynamic QR fragment 1002, the dynamic QR fragment 1006, the dynamic QR fragment 1008, the dynamic QR fragment 1010, and the dynamic QR fragment 1012). Accordingly, as shown, the frame 1200 can contain on the order of tens or dozens of barcode characters, instead of the hundreds of characters that are included in the QR code 304 as a whole.

Figure 13:
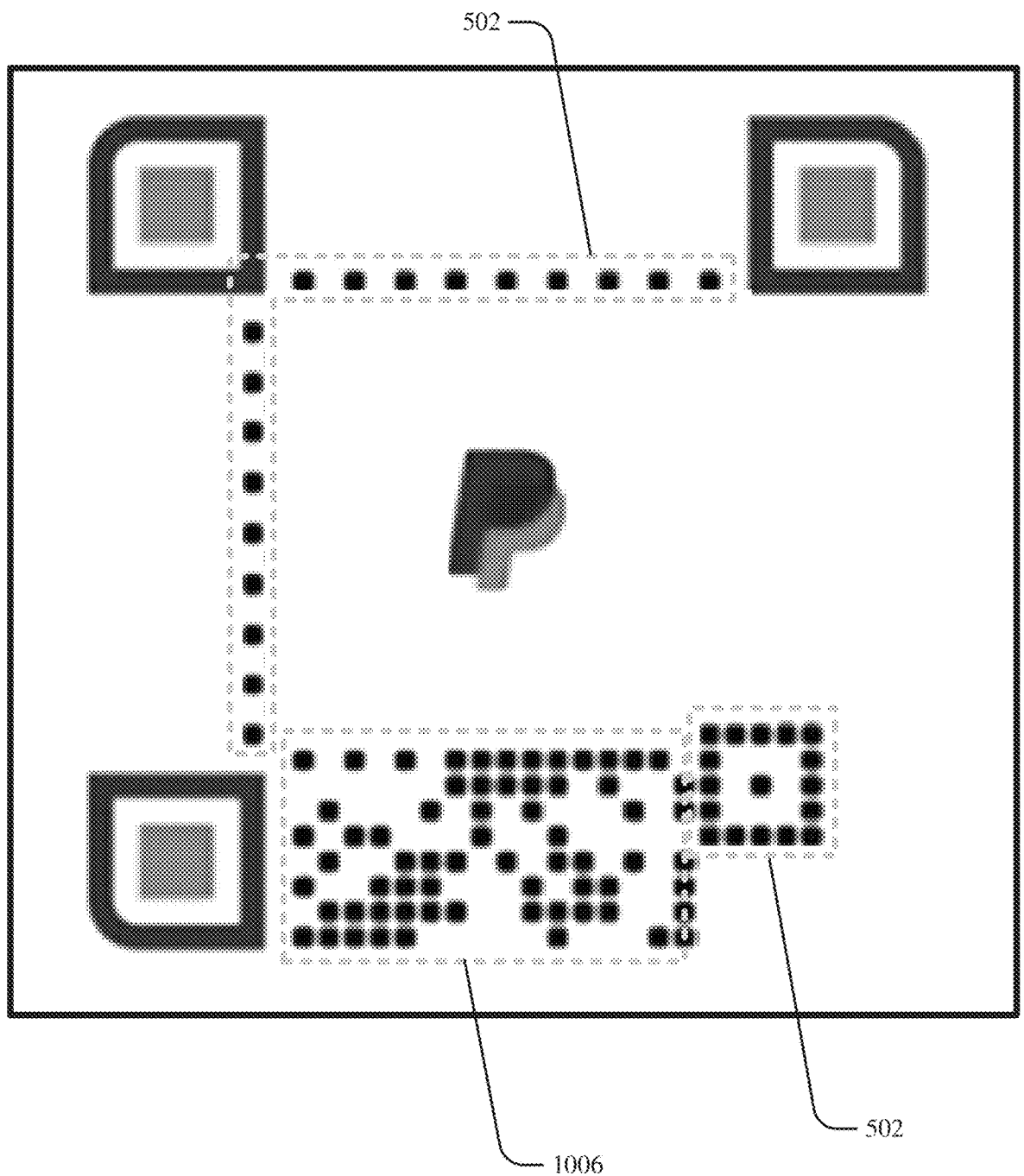

In various cases, FIG. 13 shows the frame 1300. As shown, the frame 1300 can illustrate/depict the static QR fragment 502 in the position and/or orientation that it would have in the QR code 304. As also shown, the frame 1300 can additionally illustrate/depict the dynamic QR fragment 1006, which is one of the set of dynamic QR fragments 504, in the position and/or orientation that it would have in the QR code 304. As can be seen, the frame 1300 can avoid depicting/illustrating any of the remaining fragments in the set of dynamic QR fragments 504 (e.g., the frame 1300 can lack the dynamic QR fragment 1002, the dynamic QR fragment 1004, the dynamic QR fragment 1008, the dynamic QR fragment 1010, and the dynamic QR fragment 1012). Accordingly, as shown, the frame 1300 can contain on the order of tens or dozens of barcode characters, instead of the hundreds of characters that are included in the QR code 304 as a whole.

Figure 14:
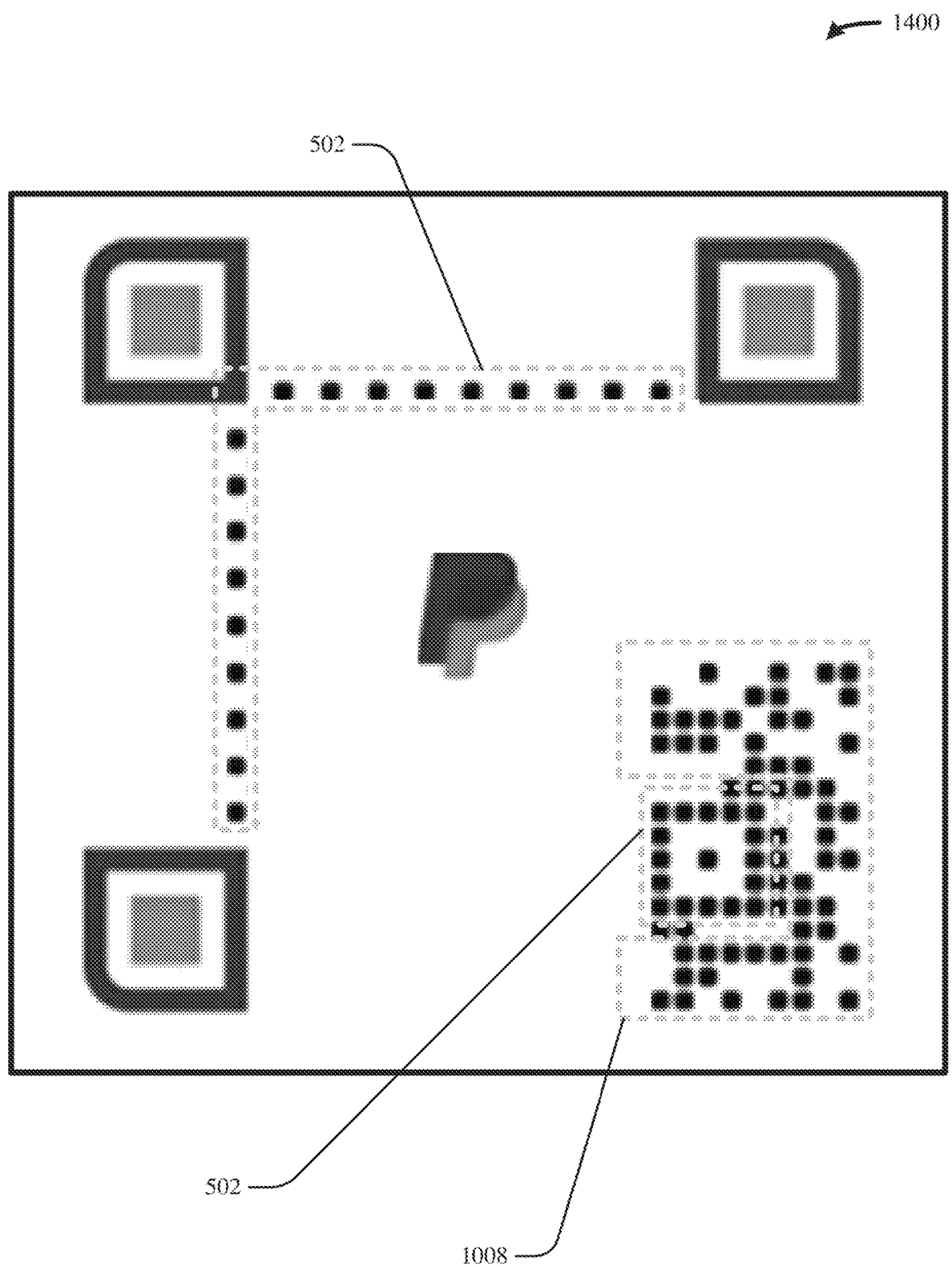

In various aspects, FIG. 14 shows the frame 1400. As shown, the frame 1400 can illustrate/depict the static QR fragment 502 in the position and/or orientation that it would have in the QR code 304. As also shown, the frame 1400 can further illustrate/depict the dynamic QR fragment 1008, which is one of the set of dynamic QR fragments 504, in the position and/or orientation that it would have in the QR code 304. As can be seen, the frame 1400 can avoid depicting/illustrating any of the remaining fragments in the set of dynamic QR fragments 504 (e.g., the frame 1400 can lack the dynamic QR fragment 1002, the dynamic QR fragment 1004, the dynamic QR fragment 1006, the dynamic QR fragment 1010, and the dynamic QR fragment 1012). Accordingly, as shown, the frame 1400 can contain on the order of tens or dozens of barcode characters, instead of the hundreds of characters that are included in the QR code 304 as a whole.

Figure 15:
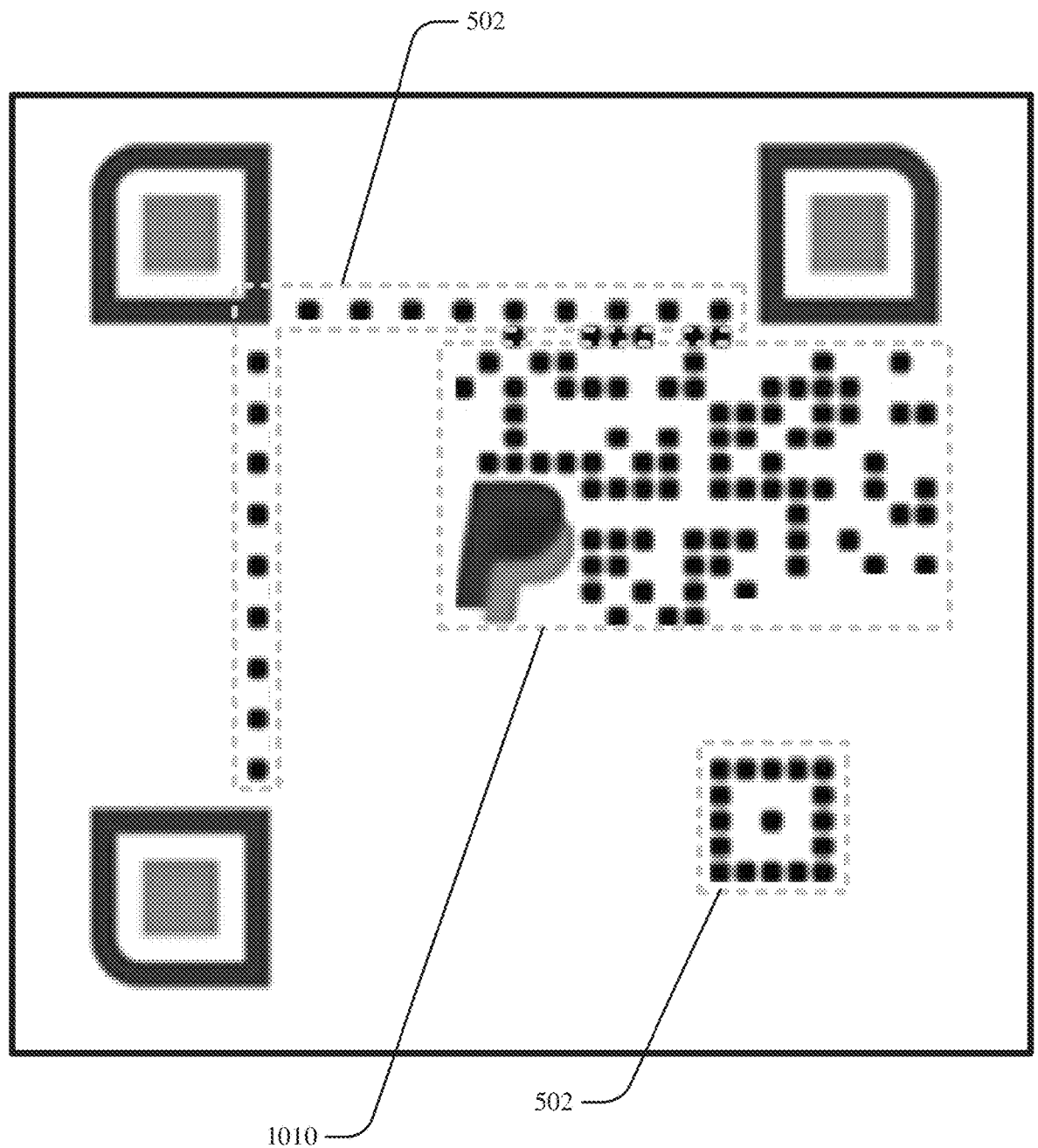

In various instances, FIG. 15 shows the frame 1500. As shown, the frame 1500 can illustrate/depict the static QR fragment 502 in the position and/or orientation that it would have in the QR code 304. As also shown, the frame 1500 can additionally illustrate/depict the dynamic QR fragment 1010, which is one of the set of dynamic QR fragments 504, in the position and/or orientation that it would have in the QR code 304. As can be seen, the frame 1500 can avoid depicting/illustrating any of the remaining fragments in the set of dynamic QR fragments 504 (e.g., the frame 1500 can lack the dynamic QR fragment 1002, the dynamic QR fragment 1004, the dynamic QR fragment 1006, the dynamic QR fragment 1008, and the dynamic QR fragment 1012). Accordingly, as shown, the frame 1500 can contain on the order of tens or dozens of barcode characters, instead of the hundreds of characters that are included in the QR code 304 as a whole.

Figure 16:
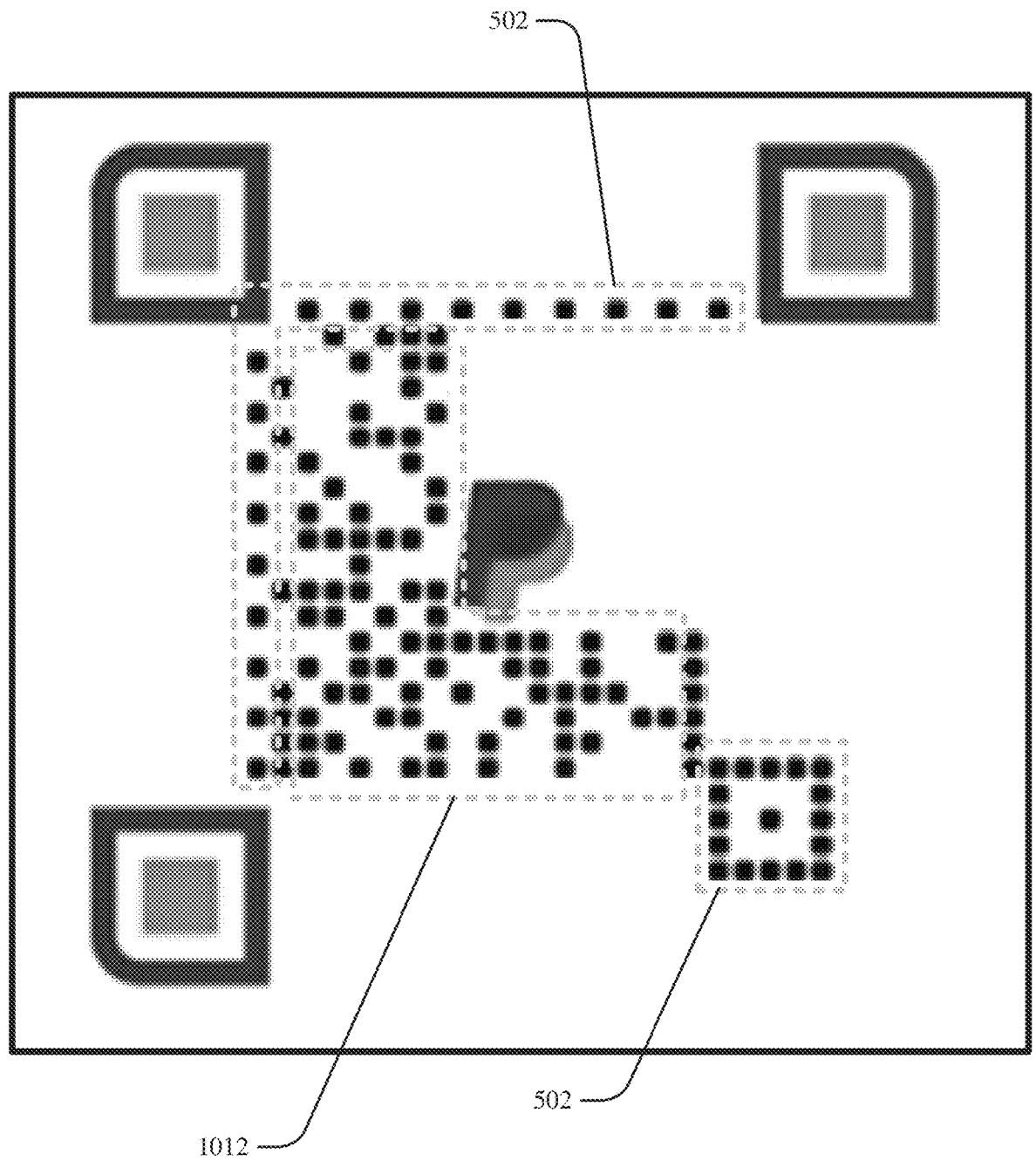

In various cases, FIG. 16 shows the frame 1600. As shown, the frame 1600 can illustrate/depict the static QR fragment 502 in the position and/or orientation that it would have in the QR code 304. As also shown, the frame 1600 can further illustrate/depict the dynamic QR fragment 1012, which is one of the set of dynamic QR fragments 504, in the position and/or orientation that it would have in the QR code 304. As can be seen, the frame 1600 can avoid depicting/illustrating any of the remaining fragments in the set of dynamic QR fragments 504 (e.g., the frame 1600 can lack the dynamic QR fragment 1002, the dynamic QR fragment 1004, the dynamic QR fragment 1006, the dynamic QR fragment 1008, and the dynamic QR fragment 1010). Accordingly, as shown, the frame 1600 can contain on the order of tens or dozens of barcode characters, instead of the hundreds of characters that are included in the QR code 304 as a whole.

Those having ordinary skill in the art will appreciate that FIGS. 7-16 are non-limiting and for purposes of illustration. Thus, in various embodiments, the QR code 304 can be implemented with different sizes, different shapes, and/or different numbers of barcode characters than pictured in the FIGS. 7-16. Similarly, in various aspects, the static QR fragment 502 can be implemented with different sizes, different shapes, and/or different numbers of barcode characters than pictured in the FIGS. 7-16. Likewise, in various instances, the set of dynamic QR fragments 504 can be implemented with different sizes, different shapes, and/or different numbers of barcode characters than pictured in the FIGS. 7-16.

In various aspects, the display component 118 can electronically instruct and/or otherwise electronically cause the smart device 104 to sequentially render, in any suitable order, the frames 1100-1600 on its electronic display. As can be seen by FIGS. 11-16, sequentially rendering the frames 1100-1600 can create a visual effect that resembles a rapidly changing and/or flickering QR code. As mentioned above, such a rapidly changing/flickering QR code can be referred to as a video/animated QR code. In various aspects, since the static QR fragment 502 can be depicted/illustrated in each of the set of frames 506 (e.g., in each of the frames 1100-1600), the static QR fragment 502 can appear on the electronic screen/monitor of the smart device 104 to be unchanging over time (e.g., hence "static") in the video/animated QR code. In contrast, since a different/unique dynamic QR fragment can be depicted/illustrated in each of the set of frames 506 (e.g., in each of the frames 1100-1600), the dynamic QR fragment can appear on the electronic screen/monitor of the smart device 104 to be changing over time (e.g., hence "dynamic") in the video/animated QR code.

In various instances, while the smart device 104 is sequentially rendering the video/animated QR code, the point-of-sale device 106 can electronically read and/or capture, via its optical scanner, the information contained within the video/animated QR code, so as to facilitate the transaction without experiencing technical scanning difficulties, and without informing the smart device 104 of the type of transaction that will be facilitated (e.g., online vs. offline).

For example, suppose that the point-of-sale device 106 is configured to facilitate an online transaction. In such case, the optical scanner of the point-of-sale device 106 can be able to successfully scan/read only tens or dozens of barcode characters at a time. In various instances, the display component 118 can cause the smart device 104 to sequentially render the set of frames 506 (e.g., to render the video/animated QR code). Because the optical scanner of the point-of-sale device 106 can be able to successfully scan/read only tens or dozens of barcode characters at a time, the point-of-sale device 106 can be unable to scan/read all of the set of frames 506 (e.g., as mentioned above, the QR code 304, and thus the set of frames 506, can include hundreds of barcode characters in total). However, the point-of-sale device 106 can successfully scan/read any single one of the set of frames 506 without technical difficulty, since each individual frame can contain on the order of tens or dozens of barcode characters rather than hundreds of barcode characters. So, the point-of-sale device 106 can scan any one of the set of frames 506. Since each of the set of frames 506 includes the static QR fragment 502, the point-of-sale device 106 can extract and/or otherwise detect the static QR fragment 502 in the scanned frame. Accordingly, the point-of-sale device 106 can facilitate the transaction in an online fashion based on the static QR fragment 502.

On the other hand, suppose that the point-of-sale device 106 is configured to facilitate an offline transaction. In such case, the optical scanner of the point-of-sale device 106 can be able to successfully scan/read hundreds of barcode characters at a time. In various instances, the display component 118 can cause the smart device 104 to sequentially render the set of frames 506 (e.g., to render the video/animated QR code). Because the optical scanner of the point-of-sale device 106 can be able to successfully scan/read hundreds of barcode characters at a time, the point-of-sale device 106 can scan/read all of the set of frames 506 (e.g., as mentioned above, the QR code 304, and thus the set of frames 506, can include hundreds of barcode characters in total). Since each of the set of frames 506 includes a respectively corresponding one of the set of dynamic QR fragments 504, the point-of-sale device 106 can extract and/or otherwise detect the entire set of dynamic QR fragments 504 in the scanned frames. Accordingly, the point-of-sale device 106 can facilitate the transaction in an offline fashion based on the set of dynamic QR fragments 504. As an example, the point-of-sale device 106 can reconstruct the QR code 304 (e.g., can piece together the set of dynamic QR fragments 504) by superimposing each of the set of frames 506 on top of each other, and the point-of-sale device 106 can complete the transaction accordingly. In other cases, the point-of-sale device 106 can piece the set of dynamic QR fragments 504 together via any other suitable technique, so as to obtain the QR code 304, and the point-of-sale device 106 can proceed with the transaction accordingly.

Those having ordinary skill in the art will appreciate that duplicative scanning of one or more frames in the set of frames 506 by the point-of-sale device 106 can fail to impede the ability of the point-of-sale device 106 from processing the transaction (e.g., double-scanned barcode characters can be disregarded). In order to ensure that each of the set of frames 506 is scanned/read at least once, those having ordinary skill in the art will appreciate that the point-of-sale device 106 can, in such embodiments, scan/read the electronic display of the smart device 104 for any suitable threshold duration of time.

In this way, the transaction between the smart device 104 and the point-of-sale device 106 can be facilitated, notwithstanding that the smart device 104 does not know which type of transaction (e.g., online vs. offline) that the point-of-sale device 106 is configured to perform. Instead, the smart device 104 can sequentially render the set of frames 506 no matter the type of transaction that the point-of-sale device 106 is configured to perform, and the point-of-sale device 106 can selectively scan/read the set of frames 506 based on its own capabilities (e.g., if the point-of-sale device 106 can only scan tens or dozens of barcode characters at once, the point-of-sale device 106 can scan/read a single frame from the set of frames 506 to get the static QR fragment 502; in contrast, if the point-of-sale device 106 can scan hundreds of barcode characters at once, the point-of-sale device 106 can scan/read every frame from the set of frames 506 to get the entire set of dynamic QR fragments 504).

Figure 17:
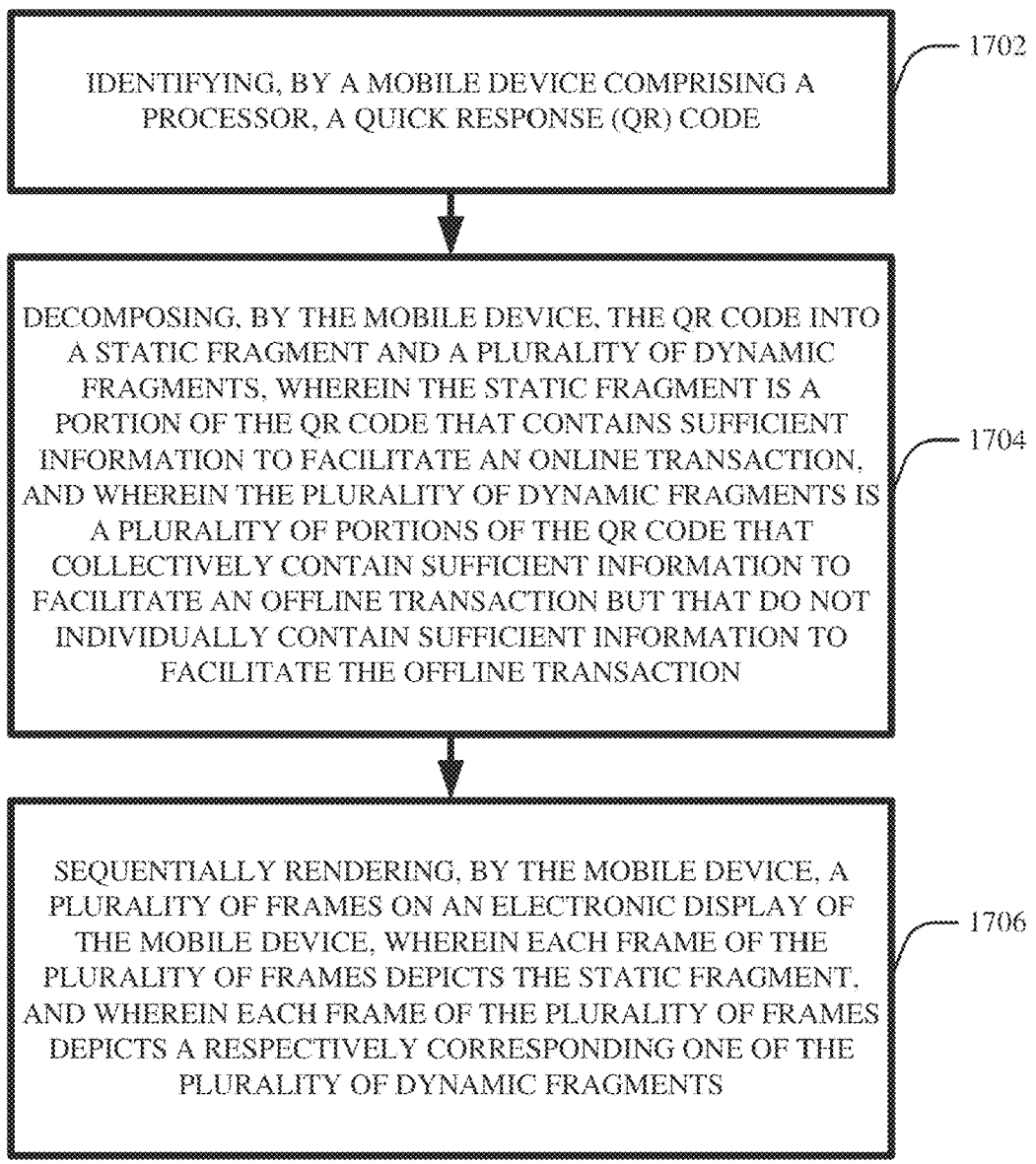
FIG. 17 illustrates a high-level flow diagram of an example, non-limiting computer-implemented method that facilitates video/animated QR codes in accordance with one or more embodiments described herein.

FIG. 17 illustrates a high-level flow diagram of an example, non-limiting computer-implemented method 1700 that can facilitate video/animated QR codes in accordance with one or more embodiments described herein. In various cases, the video QR code system 102 can facilitate the computer-implemented method 1700.

In various embodiments, act 1702 can include identifying, by a mobile device (e.g., via 114, where 102 can be installed on 104) comprise a processor, a quick response (QR) code (e.g., 304).

In various aspects, act 1704 can include decomposing, by the mobile device (e.g., via 116), the QR code into a static fragment (e.g., 502) and a plurality of dynamic fragments (e.g., 504). In various cases, the static fragment can be a portion of the QR code (e.g., as shown in FIG. 8) that contains sufficient information to facilitate an online transaction. Furthermore, in various cases, the plurality of dynamic fragments can be a plurality of portions of the QR code (e.g., as shown in FIGS. 9-10) that collectively contain sufficient information to facilitate an offline transaction, but that do not individually contain sufficient information to facilitate the offline transaction.

In various instances, act 1706 can include sequentially rendering, by the mobile device (e.g., via 118), a plurality of frames (e.g., 506) on an electronic display of the mobile device (e.g., 104). In various cases, each frame of the plurality of frames can depict the static fragment (e.g., as shown in FIGS. 11-16). Moreover, each frame of the plurality of frames can depict a respectively corresponding one of the plurality of dynamic fragments (e.g., as shown in FIGS. 11-16).

Various alternative embodiments will now be described with respect to FIGS. 18-23.

Figure 18:
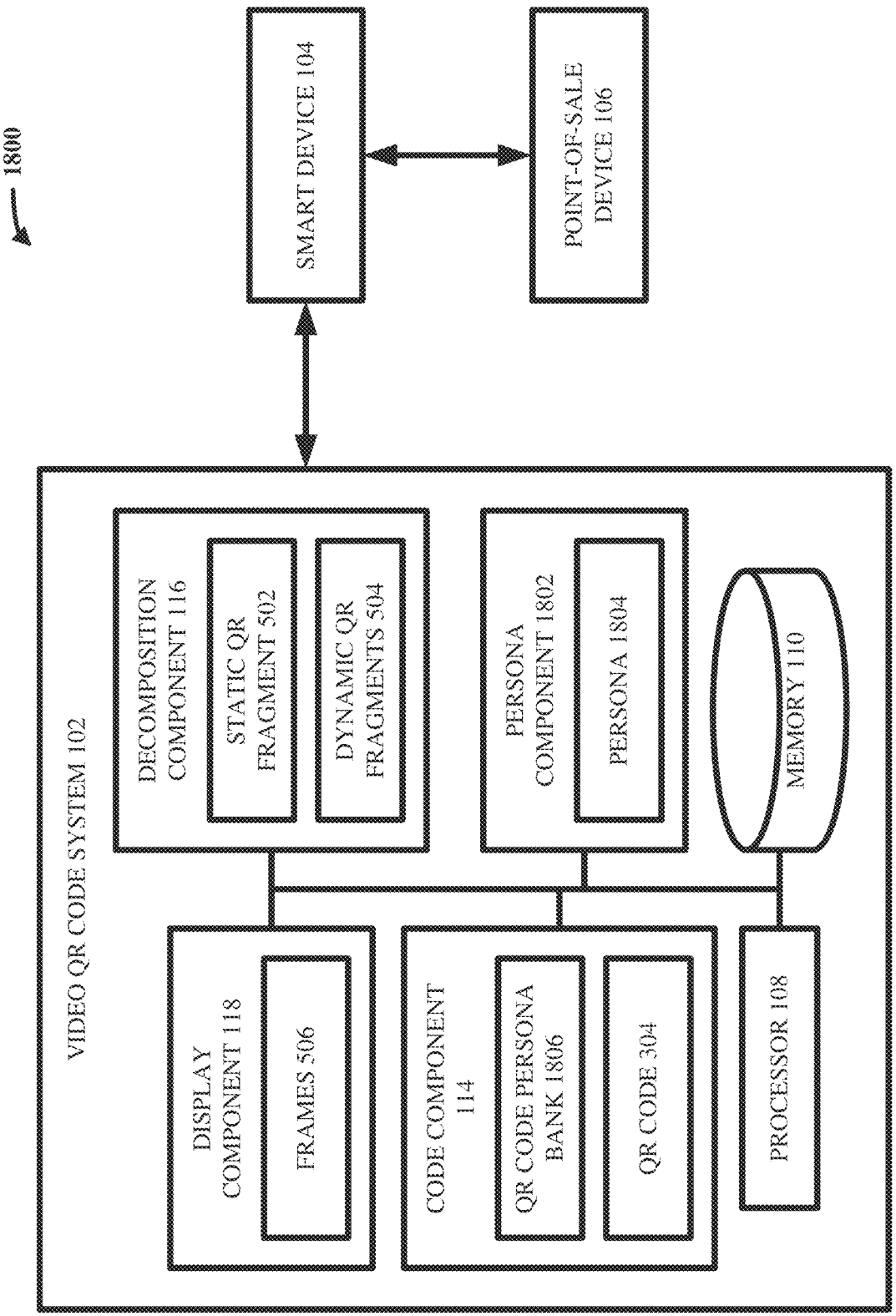
FIG. 18 illustrates a high-level block diagram of an example, non-limiting system including a persona component and a persona bank that facilitates video/animated QR codes in accordance with one or more embodiments described herein.

FIG. 18 illustrates a high-level block diagram of an example, non-limiting system 1800 including a persona component and a persona bank that can facilitate video/animated QR codes in accordance with one or more embodiments described herein. As shown, the system 1800 can, in some cases, comprise the same components as the system 600, can further comprise a persona component 1802 in place of the context component 112, and can further comprise a QR code persona bank 1806 in place of the QR code bank 302.

In various embodiments, the persona component 1802 can electronically store, maintain, control, and/or otherwise access a set of different and/or unique electronic personas, and the persona component 1802 can electronically identify a persona 1804 within the set of electronic personas. In various cases, the persona 1804 (as well as each of the set of electronic personas) can be an electronic profile and/or an electronic account that specifies and/or indicates any suitable information pertaining to a current user of the smart device 104. This is further described with respect to FIG. 19.

Figure 19:
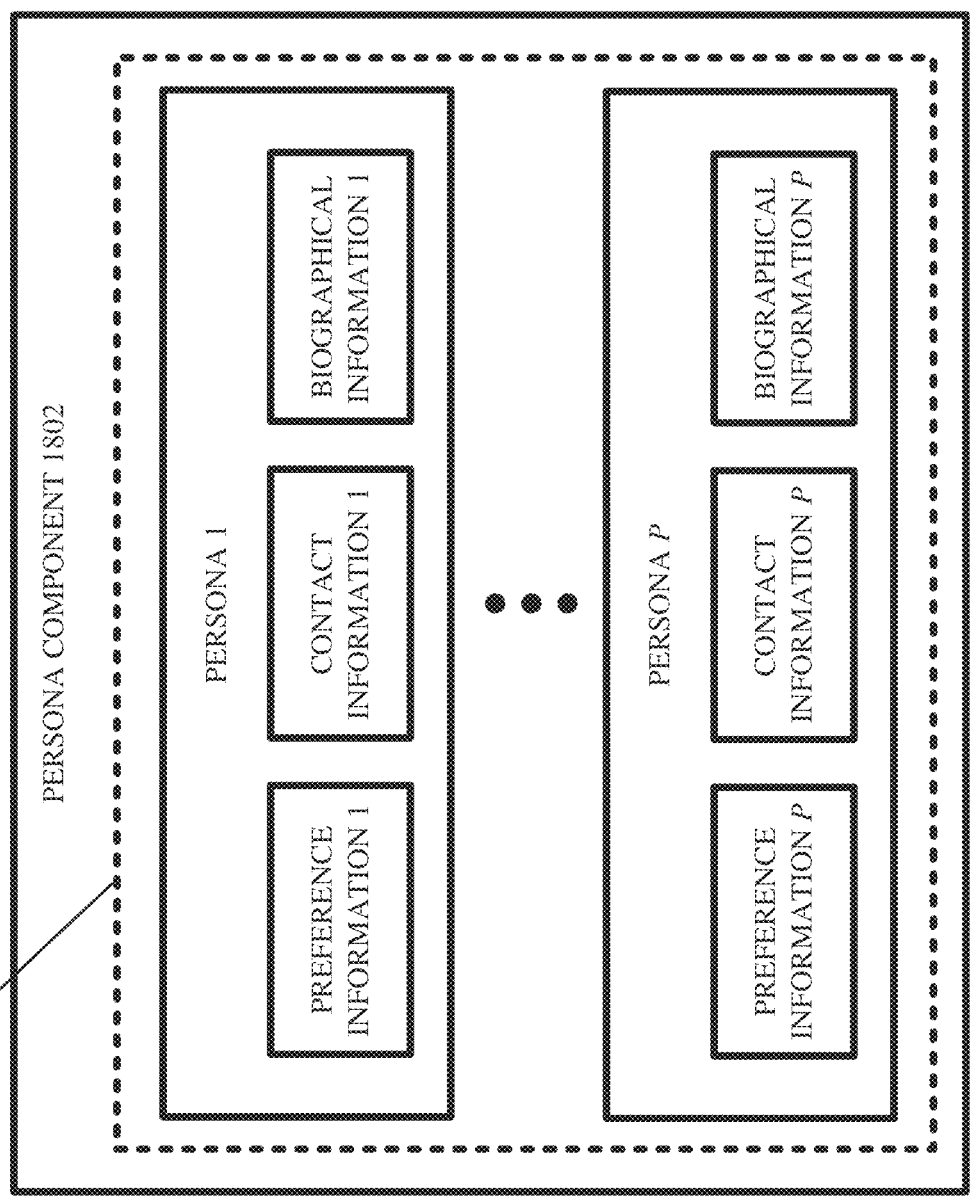
FIG. 19 illustrates a high-level block diagram of an example, non-limiting persona component in accordance with one or more embodiments described herein.

FIG. 19 illustrates a high-level block diagram of an example, non-limiting persona component in accordance with one or more embodiments described herein. In other words, FIG. 19 shows a non-limiting example embodiment of the persona component 1802.

As shown, the persona component 1802 can electronically store a set of personas 1902. In various cases, the set of personas 1902 can include any suitable number of electronic personas. For example, the set of personas 1902 can include p electronic personas, for any suitable positive integer p: a persona 1 to a persona p. In various instances, the persona 1 can be an electronic profile and/or an electronic account that specifies and/or indicates any suitable information regarding a particular user of the smart device 104. For example, the persona 1 can specify/indicate preference information 1, contact information 1, and/or biographical information 1. In various cases, the preference information 1 can represent product/service preferences of the particular user, such as what products/services the particular user likes and/or dislikes, and/or such as a ranking of product/services in order of increasing and/or decreasing priority according to the tastes of the particular user. In various aspects, the contact information 1 can represent any suitable contact information of the particular user, such as phone number, email address, and/or residential address. In various instances, the biographical information 1 can represent any suitable demographic information of the particular user, such as age, gender, ethnicity, height, weight, profession, religion, and/or political affiliation. In various cases, the preference information 1, contact information 1, and/or biographical information 1 can together be considered as defining a privacy level that is associated with the persona 1 (e.g., collectively defining an amount of information about the particular user that can be shared and/or accessed during QR-based transactions).

In like fashion, the persona p can be an electronic profile and/or an electronic account that specifies and/or indicates any suitable information regarding a different user of the smart device 104. For instance, the persona p can specify/indicate preference information p, contact information p, and/or biographical information p. In various cases, the preference information p can represent product/service preferences of the different user, such as what products/services the different user likes and/or dislikes, and/or such as a ranking of product/services in order of increasing and/or decreasing priority according to the tastes of the different user. In various aspects, the contact information p can represent any suitable contact information of the different user, such as phone number, email address, and/or residential address. In various instances, the biographical information p can represent any suitable demographic information of the different user, such as age, gender, ethnicity, height, weight, profession, religion, and/or political affiliation. In various cases, the preference information p, contact information p, and/or biographical information p can together be considered as defining a privacy level that is associated with the persona p (e.g., collectively defining an amount of information about the different user that can be shared and/or accessed during QR-based transactions).

In any case, the persona component 1802 can electronically identify and/or select one persona from the set of personas 1902, and such identified/selected persona can be considered as the persona 1804. In various aspects, the persona component 1802 can identify/select the persona 1804 from the set of personas 1902 in any suitable fashion. For example, in some cases, the persona component 1802 can be electronically integrated with a user interface (e.g., keyboard, touchscreen, voice control) of the smart device 104, and a current user of the smart device 104 can manually select the persona 1804 from the set of personas 1902 via the user interface. As another example, each of the set of personas 1902 can correspond to different and/or unique biometric data. In such case, the persona component 1802 can be electronically integrated with one or more biometric sensors of the smart device 104 (e.g., fingerprint sensor, facial-recognition sensor, vocal-recognition sensor), and the persona component 1802 can automatically identify/select the persona 1804 from the set of personas 1902 based on the one or more biometric sensors.

In various embodiments in which the persona component 1802 is implemented, the code component 114 can electronically maintain, electronically control, and/or otherwise electronically access the QR code persona bank 1806, instead of the QR code bank 302. In various aspects, the QR code persona bank 1806 can be any suitable data structure that correlates, maps, and/or otherwise links a set of QR codes with a set of electronic personas. In various instances, the code component 114 can identify the QR code 304 in the QR code persona bank 1806, based on the persona 1804. More specifically, the code component 114 can electronically iterate and/or query through the set of electronic personas that are stored in the QR code persona bank 1806, in search for the persona 1804. After the code component 114 has found the persona 1804 within the set of personas, the code component 114 can identify which QR code in the set of QR codes that are stored in the QR code persona bank 1806 corresponds to the persona 1804. In such cases, the QR code that corresponds to the persona 1804 can be considered as the QR code 304. This is further described with respect to FIG. 20.

Figure 20:
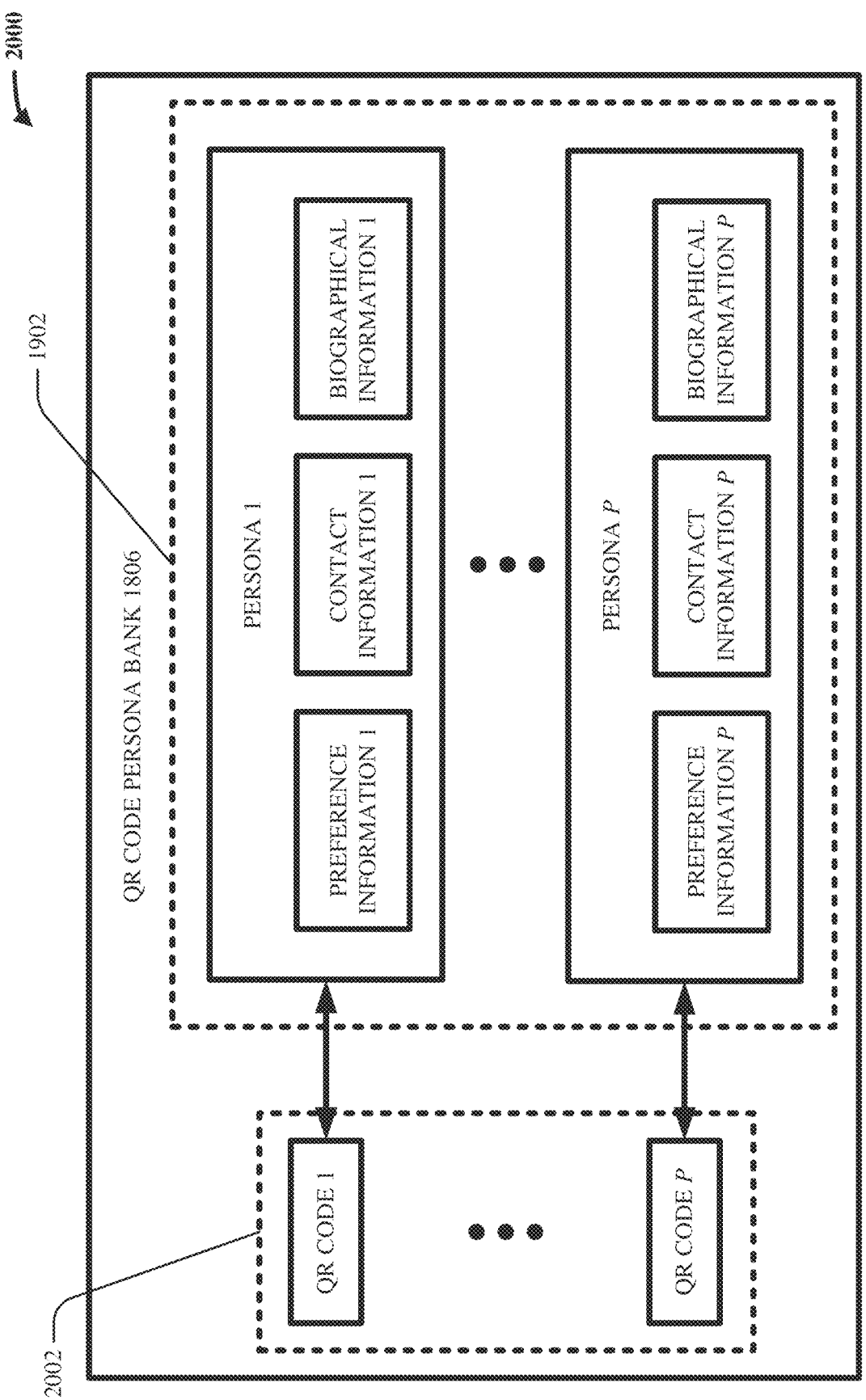
FIG. 20 illustrates a high-level block diagram of an example, non-limiting QR code persona bank in accordance with one or more embodiments described herein.

FIG. 20 illustrates a high-level block diagram 2000 of an example, non-limiting QR code persona bank in accordance with one or more embodiments described herein. In other words, FIG. 20 shows a non-limiting example embodiment of the QR code persona bank 1806.

As shown, in various aspects, the QR code persona bank 1806 can electronically store the set of personas 1902 and can also electronically store a set of QR codes 2002. In various instances, the set of QR codes 2002 can respectively correspond to the set of personas 1902. That is, since the set of personas 1902 can include p different and/or unique personas, the set of QR codes 2002 can include p different and/or unique QR codes: a QR code 1 to a QR code p. In various cases, as shown, the QR code 1 can correspond to the persona 1. In other words, the QR code 1 can be any suitable QR code that is permitted and/or required to be used in a transaction that is taking place between the smart device 104 and the point-of-sale device 106, when the persona 1 has been selected/identified by the persona component 1802. In such cases, the QR code 1 can represent and/or otherwise convey the preference information 1, the contact information 1, and/or the biographical information 1 that are specified/indicated by the persona 1. Similarly, as shown, the QR code p can correspond to the persona p. That is, the QR code p can be any suitable QR code that is permitted and/or required to be used in a transaction that is taking place between the smart device 104 and the point-of-sale device 106, when the persona p has been selected/identified by the persona component 1802. In such cases, the QR code p can represent and/or otherwise convey the preference information p, the contact information p, and/or the biographical information p that are specified/indicated by the persona p.

Although FIG. 20 illustrates the set of QR codes 2002 and the set of personas 1902 as respectively corresponding in a one-to-one fashion, this is a mere non-limiting example. Those having ordinary skill in the art will appreciate that non-one-to-one correspondence can be implemented in various embodiments. For example, in some cases, two or more QR codes in the set of QR codes 2002 can correspond to the same persona in the set of personas 1902, and/or two or more personas in the set of personas 1902 can correspond to the same QR code in the set of QR codes 2002.

In some cases, the code component 114 can electronically store and/or maintain the QR code persona bank 1806. In other cases, however, the QR code persona bank 1806 can be maintained by any suitable third-party computing device (e.g., a payment processor and/or payment server, not shown), and the code component 114 can electronically and/or remotely access the QR code persona bank 1806 by interacting with and/or receiving permission from the third-party computing device.

In various cases, once the persona component 1802 has selected and/or identified the persona 1804, the code component 114 can electronically search for the persona 1804 in the set of personas 1902 that are stored in the QR code persona bank 1806. After finding the persona 1804 in the set of personas 1902 that are stored in the QR code persona bank 1806, the code component 114 can electronically identify which of the set of QR codes 2002 corresponds to the persona 1804. In various cases, such QR code can be considered as the QR code 304.

Accordingly, the decomposition component 116 can generate the static QR fragment 502 and the set of dynamic QR fragments 504 based on the QR code 304 as described above, and the display component 118 can generate the set of frames 506 based on the static QR fragment 502 and the set of dynamic QR fragments 504 as described above.

Figure 21:
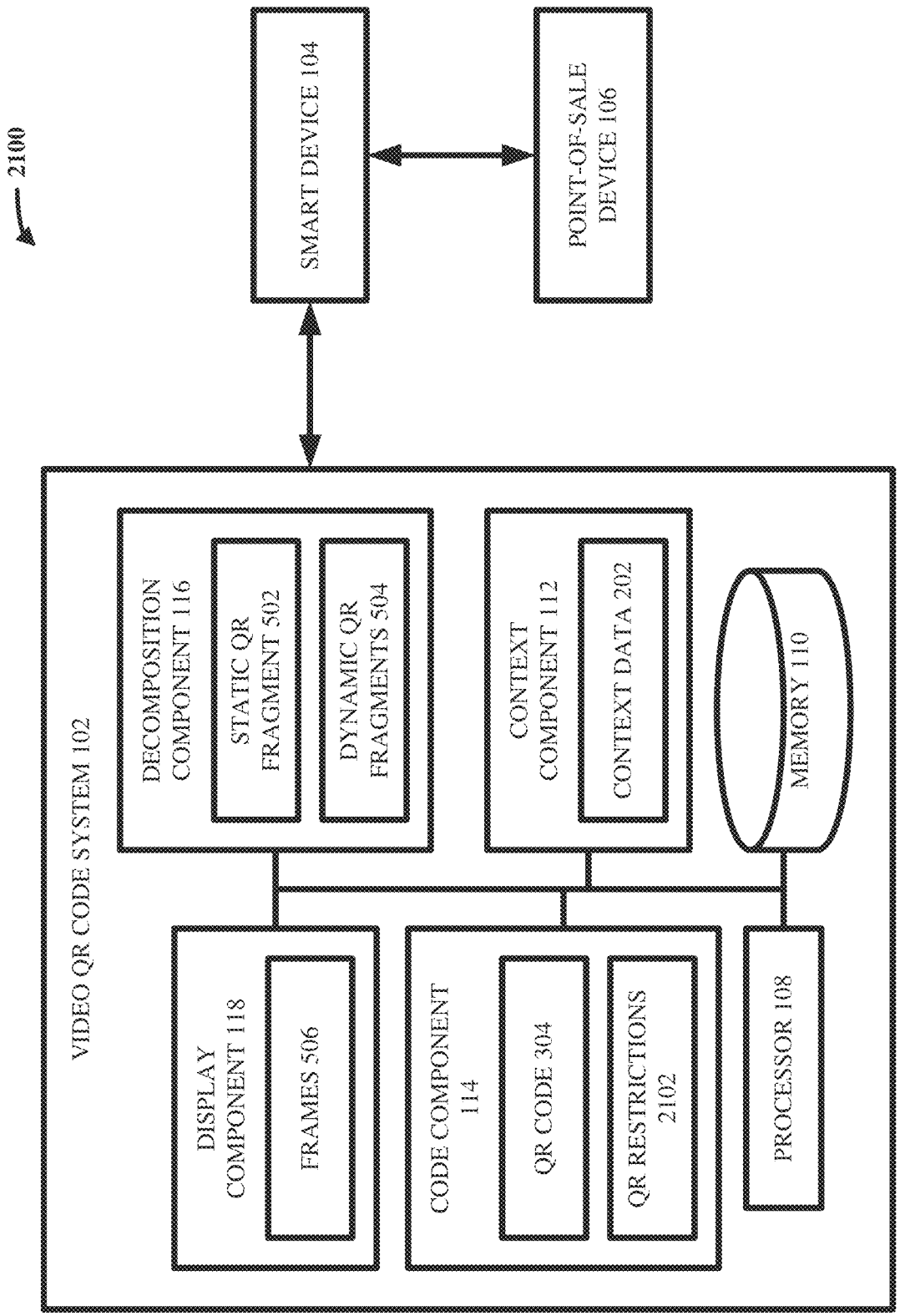
FIG. 21 illustrates a high-level block diagram of an example, non-limiting system including QR code restrictions that facilitates video/animated QR codes in accordance with one or more embodiments described herein.

FIG. 21 illustrates a high-level block diagram of an example, non-limiting system 2100 including QR code restrictions that can facilitate video/animated QR codes in accordance with one or more embodiments described herein. As shown, the system 2100 can, in some cases, comprise the same components as the system 600, and can further comprise a set of QR restrictions 2102 in place of the QR code bank 302.

In various embodiments, the code component 114 can electronically identify, select, generate, and/or otherwise obtain the QR code 304 in any suitable fashion and/or from any suitable source. In various aspects, the QR code 304 can correspond to the set of QR restrictions 2102. In various instances, the set of QR restrictions 2102 can be any suitable collection of data that specifies and/or indicates one or more limitations on the authorized/permitted use of the QR code 304. For example, in some cases, the set of QR restrictions 2102 can specify and/or indicate one or more geolocations at which the QR code 304 is permitted/authorized to be displayed, and/or the set of QR restrictions 2102 can specify and/or indicate one or more other geolocations at which the QR code 304 is not permitted/authorized to be displayed. As another example, the set of QR restrictions 2102 can specify and/or indicate one or more times/dates during which the QR code 304 is permitted/authorized to be displayed, and/or the set of QR restrictions 2102 can specify and/or indicate one or more other times/dates during which the QR code 304 is not permitted/authorized to be displayed. As yet another example, the set of QR restrictions 2102 can specify and/or indicate one or more merchant identities to which the QR code 304 is permitted/authorized to be displayed, and/or the set of QR restrictions 2102 can specify and/or indicate one or more other merchant identities to which the QR code 304 is not permitted/authorized to be displayed. As still another example, the set of QR restrictions 2102 can specify and/or indicate one or more product/service identities for which the QR code 304 is permitted/authorized to be displayed, and/or the set of QR restrictions 2102 can specify and/or indicate one or more other product/service identities for which the QR code 304 is not permitted/authorized to be displayed. As even another example, the set of QR restrictions 2102 can specify and/or indicate one or more monetary/transaction amounts for which the QR code 304 is permitted/authorized to be displayed, and/or the set of QR restrictions 2102 can specify and/or indicate one or more other monetary/transaction amounts for which the QR code 304 is not permitted/authorized to be displayed.

In various aspects, once the context component 112 receives/accesses the context data 202, the code component 114 can electronically compare the context data 202 to the set of QR restrictions 2102. If the context data 202 satisfies and/or is consistent with the set of QR restrictions 2102, the code component 114 can electronically instruct and/or cause the decomposition component 116 to decompose the QR code 304 into the static QR fragment 502 and the set of dynamic QR fragments 504, and/or the code component 114 can electronically instruct and/or cause the display component 118 to generate the set of frames 506. On the other hand, if the context data 202 fails to satisfy and/or is not consistent with the set of QR restrictions 2102, the code component 114 can electronically instruct and/or cause the decomposition component 116 to refrain from decomposing the QR code 304 into the static QR fragment 502 and the set of dynamic QR fragments 504, and/or the code component 114 can electronically instruct and/or cause the display component 118 to refrain from generating the set of frames 506.

Figure 22:
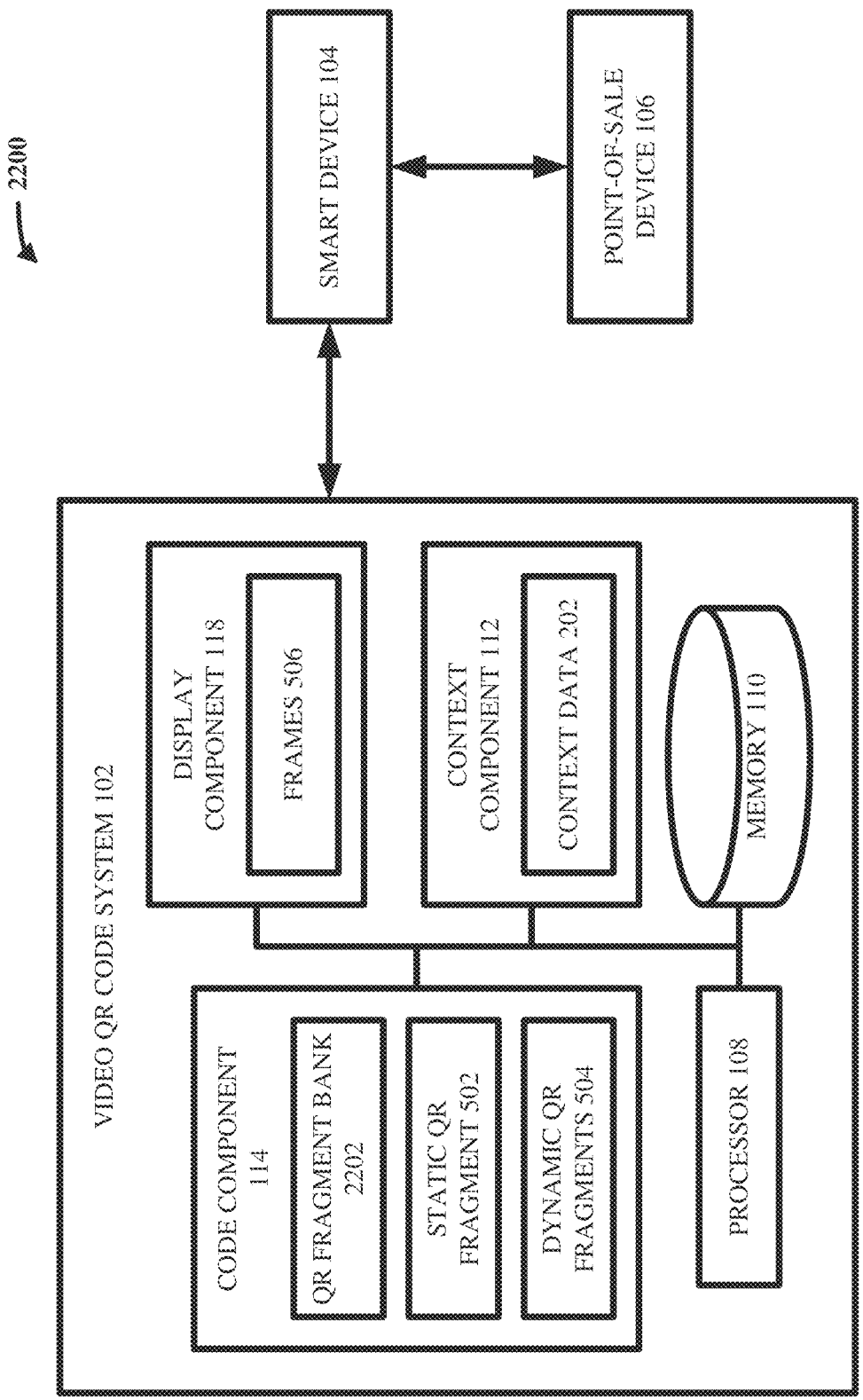
FIG. 22 illustrates a high-level block diagram of an example, non-limiting system including a QR fragment bank that facilitates video/animated QR codes in accordance with one or more embodiments described herein.

FIG. 22 illustrates a high-level block diagram of an example, non-limiting system 2200 including a QR fragment bank that can facilitate video/animated QR codes in accordance with one or more embodiments described herein. As shown, the system 2200 can, in some cases, comprise the same components as the system 600, can further comprise a QR fragment bank 2202 in place of the QR code bank 302, and can lack the decomposition component 116.

In various embodiments, the code component 114 can electronically store, electronically maintain, electronically control, and/or otherwise electronically access the QR fragment bank 2202, instead of the QR code bank 302. In such cases, the QR fragment bank 2202 can be any suitable data structure that correlates, maps, and/or otherwise links a set of different and/or unique static QR fragments with a set of different and/or unique static contexts, and that correlates, maps, and/or otherwise links a set of different and/or unique combinations of dynamic QR fragments to a set of different and/or unique dynamic contexts.

In various instances, the code component 114 can identify the static QR fragment 502 and the set of dynamic QR fragments 504 in the QR fragment bank 2202, based on the context data 202. More specifically, the code component 114 can electronically iterate and/or query through the set of static contexts that are stored in the QR fragment bank 2202, in search for the context data 202. After the code component 114 has found the context data 202 within the set of static contexts, the code component 114 can identify which static QR fragment in the set of static QR fragments that are stored in the QR fragment bank 2202 corresponds to the context data 202. In various cases, the static QR fragment that corresponds to the context data 202 can be considered as the static QR fragment 502. Similarly, the code component 114 can electronically iterate and/or query through the set of dynamic contexts that are stored in the QR fragment bank 2202, in search for the context data 202. After the code component 114 has found the context data 202 within the set of dynamic contexts, the code component 114 can identify which combination of dynamic QR fragments in the set of combinations of dynamic QR fragments that are stored in the QR fragment bank 2202 corresponds to the context data 202. In various cases, the combination of dynamic QR fragments that corresponds to the context data 202 can be considered as the set of dynamic QR fragments 504. This is further described with respect to FIG. 23.

Figure 23:
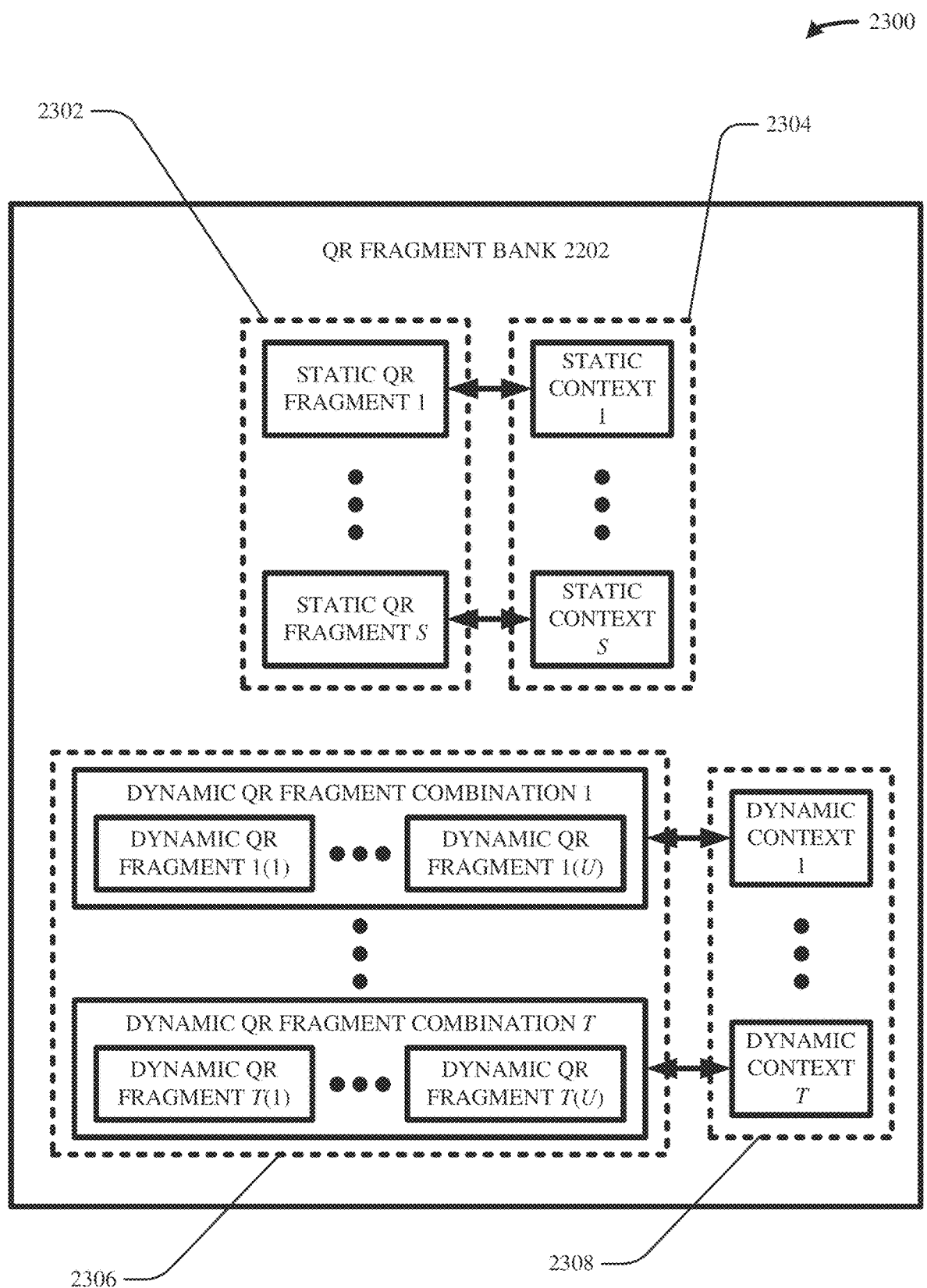
FIG. 23 illustrates a high-level block diagram of an example, non-limiting QR fragment bank in accordance with one or more embodiments described herein.

FIG. 23 illustrates a high-level block diagram 2300 of an example, non-limiting QR fragment bank in accordance with one or more embodiments described herein. In other words, FIG. 23 shows a non-limiting example embodiment of the QR fragment bank 2202.

As shown, in various aspects, the QR fragment bank 2202 can electronically store a set of static QR fragments 2302. In various cases, the set of static QR fragments 2302 can comprise any suitable number of different and/or unique static QR fragments. For example, the set of static QR fragments 2302 can include s different and/or unique static QR fragments, for any suitable positive integer s: a static QR fragment 1 to a static QR fragment s. As also shown, the QR fragment bank 2202 can further electronically store a set of static contexts 2304. In various instances, the set of static contexts 2304 can respectively correspond to the set of static QR fragments 2302. That is, the set of static contexts 2304 can include s different and/or unique contexts: a static context 1 to a static context s. In various cases, as shown, the static QR fragment 1 can correspond to the static context 1. In other words, the static context 1 can represent one or more geolocations, one or more timestamps, one or more merchant identities, one or more product/service identities, and/or one or more monetary amounts, and the static QR fragment can be any suitable collection of barcode characters that is sufficient to perform an online transaction and that is permitted and/or required to be used in a transaction that is taking place at such one or more geolocations, that is taking place during such one or more timestamps, that involves such one or more merchant identities, that involves such one or more product/service identities, and/or that involves such one or more monetary amounts. Similarly, the static QR fragment s can correspond to the static context s. That is, the static context s can represent one or more geolocations, one or more timestamps, one or more merchant identities, one or more product/service identities, and/or one or more monetary amounts, and the static QR fragment s can be any suitable collection of barcode characters that is sufficient to facilitate an online transaction and that is permitted and/or required to be used in a transaction that is taking place at such one or more geolocations, that is taking place during such one or more timestamps, that involves such one or more merchant identities, that involves such one or more product/service identities, and/or that involves such one or more monetary amounts.

As also shown, in various aspects, the QR fragment bank 2202 can electronically store a set of combinations of dynamic QR fragments 2306. In various cases, the set of combinations of dynamic QR fragments 2306 can comprise any suitable number of different and/or unique combinations of dynamic QR fragments. For example, the set of combinations of dynamic QR fragments 2306 can include t different and/or unique combinations of dynamic QR fragments, for any suitable positive integer t: a dynamic QR fragment combination 1 to a dynamic QR fragment combination t. In various cases, the dynamic QR fragment combination 1 can comprise any suitable number of dynamic QR fragments (e.g., a dynamic QR fragment 1(1) to a dynamic QR fragment (1)(u), for any suitable positive integer u). Similarly, in various cases, the dynamic QR fragment combination 1 can comprise any suitable number of dynamic QR fragments (e.g., a dynamic QR fragment t(1) to a dynamic QR fragment (t)(u)).

Moreover, the QR fragment bank 2202 can further electronically store a set of dynamic contexts 2308. In various instances, the set of dynamic contexts 2308 can respectively correspond to the set of combinations of dynamic QR fragments 2306. That is, the set of dynamic contexts 2308 can include t different and/or unique contexts: a dynamic context 1 to a dynamic context t. In various cases, as shown, the dynamic QR fragment combination 1 can correspond to the dynamic context 1. In other words, the dynamic context 1 can represent one or more geolocations, one or more timestamps, one or more merchant identities, one or more product/service identities, and/or one or more monetary amounts, and the dynamic QR fragment combination 1 can be any suitable collection of barcode characters that is sufficient to perform an offline transaction and that is permitted and/or required to be used in a transaction that is taking place at such one or more geolocations, that is taking place during such one or more timestamps, that involves such one or more merchant identities, that involves such one or more product/service identities, and/or that involves such one or more monetary amounts. Likewise, the dynamic QR fragment combination t can correspond to the dynamic context t. That is, the dynamic context t can represent one or more geolocations, one or more timestamps, one or more merchant identities, one or more product/service identities, and/or one or more monetary amounts, and the dynamic QR fragment combination t can be any suitable collection of barcode characters that is sufficient to facilitate an offline transaction and that is permitted and/or required to be used in a transaction that is taking place at such one or more geolocations, that is taking place during such one or more timestamps, that involves such one or more merchant identities, that involves such one or more product/service identities, and/or that involves such one or more monetary amounts.

Although FIG. 23 illustrates the set of static QR fragments 2302 and the set of static contexts 2304 as respectively corresponding in a one-to-one fashion, this is a mere non-limiting example. Those having ordinary skill in the art will appreciate that non-one-to-one correspondence can be implemented in various embodiments. For example, in some cases, two or more static QR fragments in the set of static QR fragments 2302 can correspond to the same context in the set of static contexts 2304, and/or two or more contexts in the set of static contexts 2304 can correspond to the same static QR fragment in the set of static QR fragments 2302.

Likewise, although FIG. 23 illustrates the set of combinations of dynamic QR fragments 2306 and the set of dynamic contexts 2308 as respectively corresponding in a one-to-one fashion, this is a mere non-limiting example. Those having ordinary skill in the art will appreciate that non-one-to-one correspondence can be implemented in various embodiments. For example, in some cases, two or more dynamic QR fragment combinations in the set of combinations of dynamic QR fragments 2306 can correspond to the same context in the set of dynamic contexts 2308, and/or two or more contexts in the set of dynamic contexts 2308 can correspond to the same dynamic QR fragment combination in the set of combinations of dynamic QR fragments 2306.

In some cases, the code component 114 can electronically store and/or maintain the QR fragment bank 2202. In other cases, however, the QR fragment bank 2202 can be maintained by any suitable third-party computing device (e.g., a payment processor and/or payment server, not shown), and the code component 114 can electronically and/or remotely access the QR fragment bank 2202 by interacting with and/or receiving permission from the third-party computing device.

In various cases, once the context component 112 has received and/or accessed the context data 202, the code component 114 can electronically search for the context data 202 in the set of static contexts 2304. After finding the context data 202 in the set of static contexts 2304, the code component 114 can electronically identify which of the set of static QR fragments 2302 corresponds to the context data 202. In various cases, such static QR fragment can be considered as the static QR fragment 502. In like fashion, once the context component 112 has received and/or accessed the context data 202, the code component 114 can electronically search for the context data 202 in the set of dynamic contexts 2308. After finding the context data 202 in the set of dynamic contexts 2308, the code component 114 can electronically identify which of the set of combinations of dynamic QR fragments 2306 corresponds to the context data 202. In various cases, such dynamic QR fragment combination can be considered as the set of dynamic QR fragments 504.

Accordingly, the display component 118 can electronically generate the set of frames 506 based on the static QR fragment 502 and the set of dynamic QR fragments 504, as described above. In other words, some embodiments of the subject innovation can involve identifying a premade QR code (e.g., 304 in 302), decomposing the premade QR code into fragments (e.g., 502 and 504), and generating a video/animated QR code based on such fragments. On the other hand, other embodiments of the subject innovation can involve identifying premade QR fragments (e.g., 502 and 504 in 2202) and generating a video/animated QR code based on such premade fragments.

Although FIGS. 22-23 explicitly show the QR fragment bank 2202 being implemented when the context component 112 is also implemented, this is a mere non-limiting example. Those having ordinary skill in the art will appreciate that, in some cases, the QR fragment bank 2202 can be implemented when the persona component 1802 is implemented instead of the context component 112. In such embodiments, those having ordinary skill in the art will appreciate that the QR fragment bank 2202 can correlate the set of static QR fragments 2302 to a set of personas (e.g., 1902) rather than to the set of static contexts 2304. Similarly, in such embodiments, those having ordinary skill in the art will appreciate that the QR fragment bank 2202 can correlate the set of combinations of dynamic QR fragments 2306 to a set of personas (e.g., 1902) rather than to the set of dynamic contexts 2308.

FIGS. 24-27 illustrate high-level block diagrams of example, non-limiting computer-implemented methods 2400-2700 that can facilitate video/animated QR codes in accordance with one or more embodiments described herein. In various cases, the video QR code system 102 can facilitate the computer-implemented methods 2400-2700.

Figure 24:
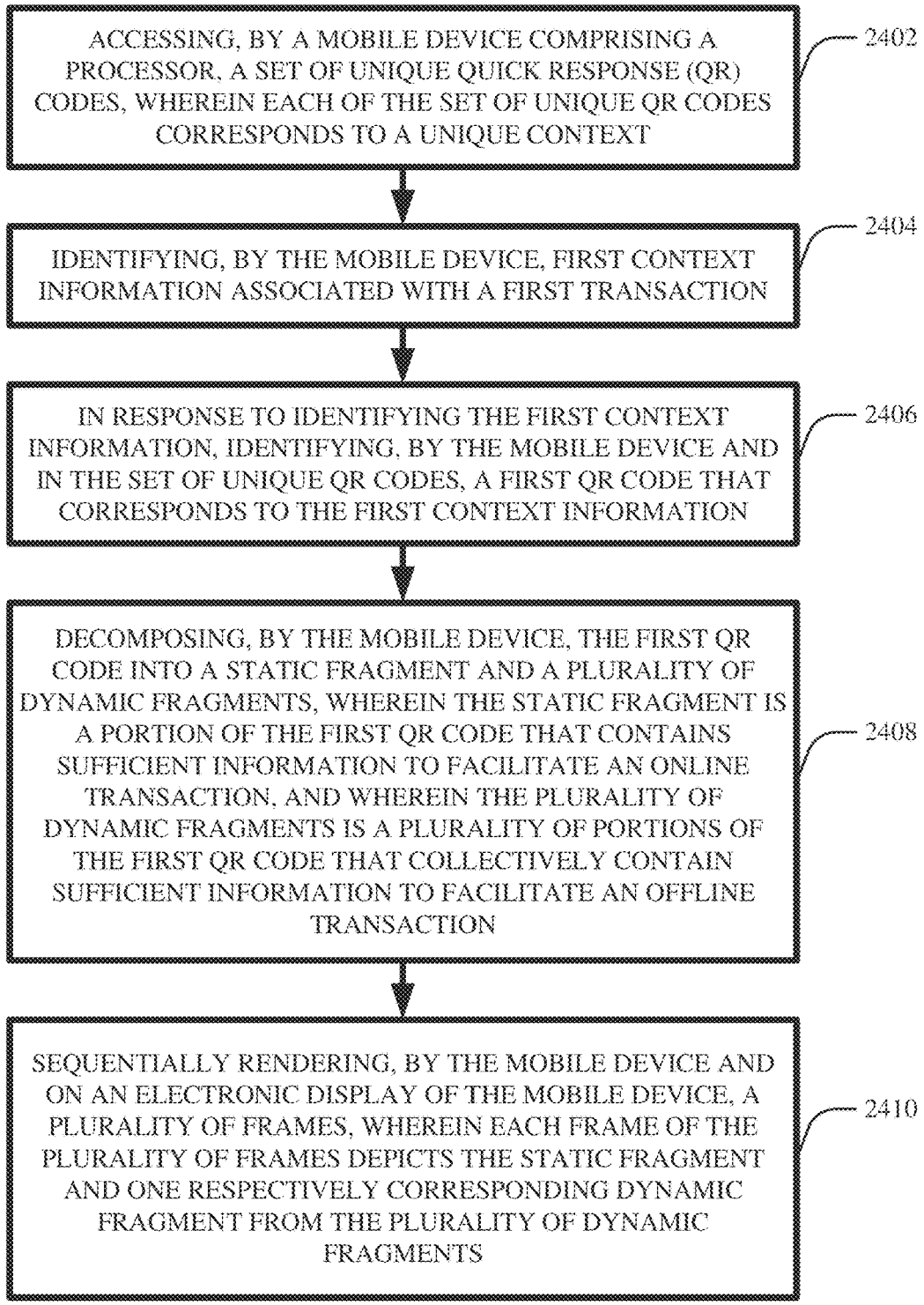
FIGS. 24-27 illustrate high-level block diagrams of example, non-limiting computer-implemented methods that facilitate video/animated QR codes in accordance with one or more embodiments described herein.

First, consider FIG. 24. In various embodiments, act 2402 can include accessing, by a mobile device (e.g., via 114, where 102 can be installed on 104) comprising a processor, a set of unique quick response (QR) codes (e.g., 402), wherein each of the set of unique quick response codes corresponds to a unique context (e.g., one of 404).

In various aspects, act 2404 can include identifying, by the mobile device (e.g., via 112), first context information (e.g., 202) associated with a first transaction (e.g., the transaction between 104 and 106).

In various instances, act 2406 can include, in response to identifying the first context information, identifying, by the mobile device (e.g., via 114) and in the set of unique QR codes, a first QR code (e.g., 304) that corresponds to the first context information.

In various cases, act 2408 can include decomposing, by the mobile device (e.g., via 116), the first QR code into a static fragment (e.g., 502) and a plurality of dynamic fragments (e.g., 504). In various cases, the static fragment can be a portion of the first QR code that contains sufficient information to facilitate an online transaction. In various cases, the plurality of dynamic fragments can be a plurality of portions of the first QR code that collectively contain sufficient information to facilitate an offline transaction.

In various aspects, act 2410 can include sequentially rendering, by the mobile device (e.g., via 118) and on an electronic display of the mobile device, a plurality of frames (e.g., 506). In various cases, each frame of the plurality of frames can depict the static fragment and one respectively corresponding dynamic fragment from the set of dynamic fragments.

Although not explicitly shown in FIG. 24, the first transaction can be an online transaction. Moreover, a point-of-sale device (e.g., 106) can capture one of the plurality of frames by scanning the electronic display of the mobile device, the point-of-sale device can identify the static fragment depicted in the one of the plurality of frames, and the point-of-sale device can facilitate the first transaction based on the static fragment.

Although not explicitly shown in FIG. 24, the first transaction can be an offline transaction. Moreover, a point-of-sale device (e.g., 106) can capture all of the plurality of frames by scanning the electronic display of the mobile device, the point-of-sale device can identity all of the plurality of dynamic fragments collectively depicted in the plurality of frames, the point-of-sale device can reconstruct the first QR code based on the plurality of dynamic fragments, and the point-of-sale device can facilitate the first transaction based on the first QR code. In various cases, the point-of-sale device can reconstruct the first QR code by superimposing the plurality of frames on top of each other.

Figure 25:
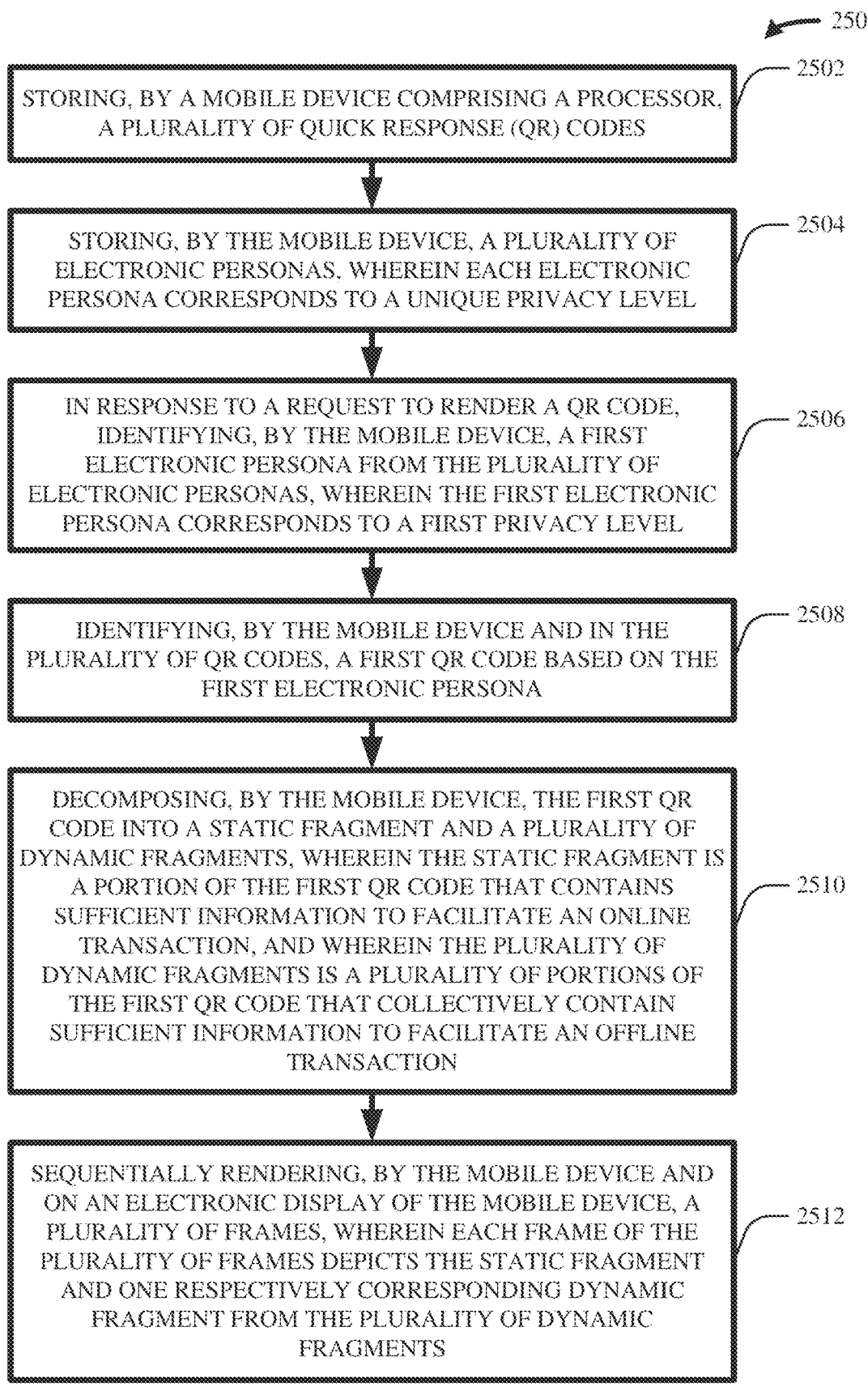

Next, consider FIG. 25. In various embodiments, act 2500 can include storing, by a mobile device (e.g., via 114, where 102 can be installed on 104) comprising a processor, a plurality of quick response (QR) codes (e.g., 2002).

In various aspects, act 2504 can include storing, by the mobile device (e.g., via 1802), a plurality of electronic personas (e.g., 1902), where each electronic persona can correspond to a unique privacy level (e.g., in FIG. 19, the persona 1 corresponds to a privacy level defined by the preference information 1, the contact information 1, and/or the biographical information 1).

In various instances, act 2506 can include, in response to a request to render a QR code, identifying, by the mobile device (e.g., via 1802), a first electronic persona (e.g., 1804) from the plurality of electronic personas, where the first electronic persona can correspond to a first privacy level.

In various cases, act 2508 can include identifying, by the mobile device (e.g., via 114) and in the plurality of QR codes, a first QR code (e.g., 304) based on the first electronic persona.

In various aspects, act 2510 can include decomposing, by the mobile device (e.g., via 116), the first QR code into a static fragment and a plurality of dynamic fragments. In various cases, the static fragment can be a portion of the first QR code that contains sufficient information to facilitate an online transaction. In various cases, the plurality of dynamic fragments can be a plurality of portions of the first QR code that collectively contain sufficient information to facilitate an offline transaction.

In various instances, act 2512 can include sequentially rendering, by the mobile device (e.g., via 118) and on an electronic display of the mobile device, a plurality of frames (e.g., 506), where each frame of the plurality of frames can depict the static fragment and a respectively corresponding dynamic fragment from the plurality of dynamic fragments.

Although not explicitly shown in FIG. 25, a point-of-sale device can facilitate an online transaction by capturing one of the plurality of frames rendered on the electronic display of the mobile device and identifying the static fragment depicted in the one of the plurality of frames.

Although not explicitly shown in FIG. 25, a point-of-sale device can facilitate an offline transaction by capturing all of the plurality of frames rendered on the electronic display of the mobile device, identifying the plurality of dynamic fragments collectively depicted in the plurality of frames, and reconstructing the first QR code based on the plurality of dynamic fragments.

Figure 26:
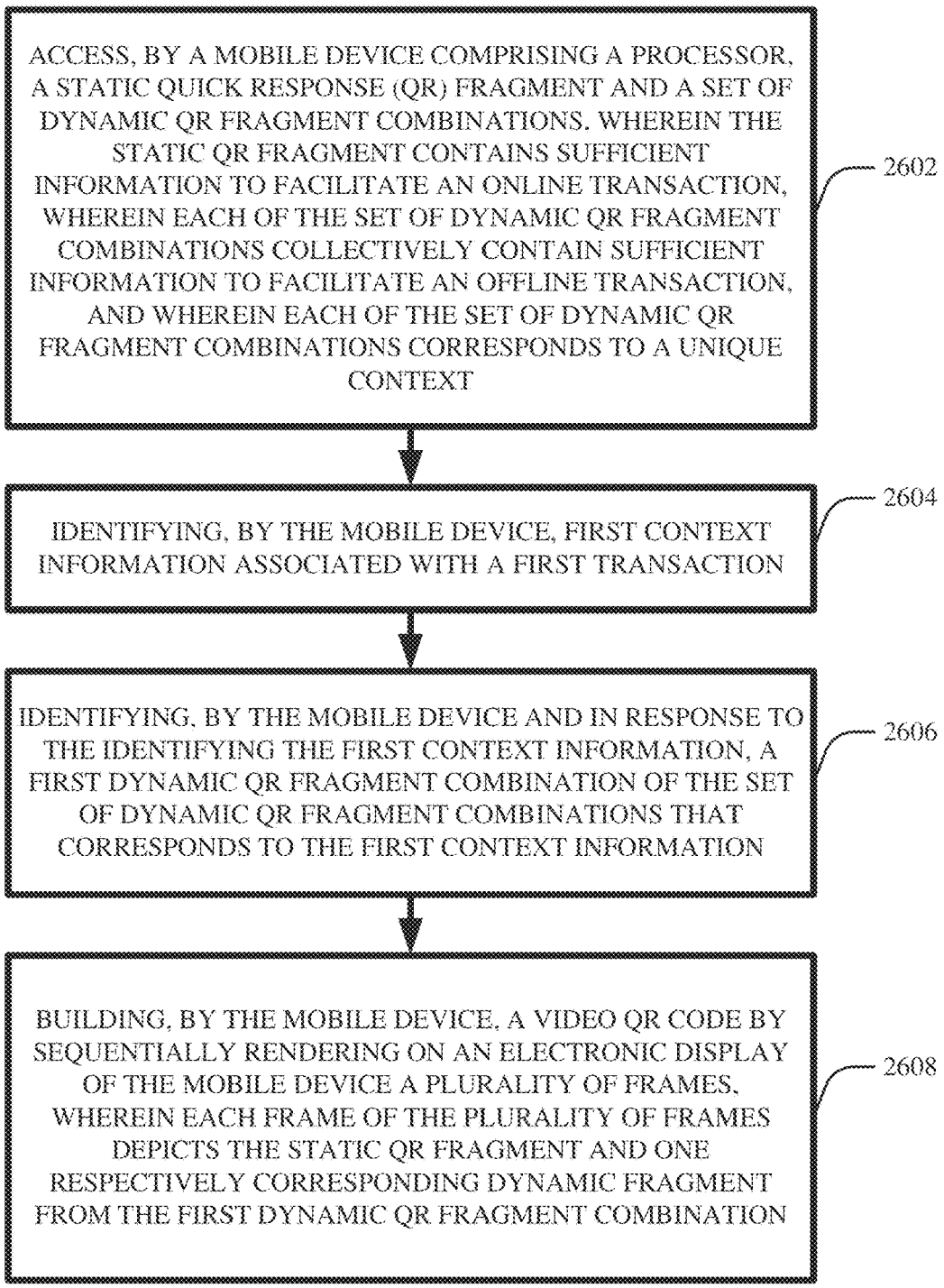

Next, consider FIG. 26. In various embodiments, act 2602 can include accessing, by a mobile device (e.g., via 114, where 102 can be installed on 104) comprising a processor, a static quick response (QR) fragment (e.g., 502) and a set of dynamic QR fragment combinations (e.g., 2306). In various cases, the static QR fragment can contain sufficient information to facilitate an online transaction. In various cases, each of the set of dynamic QR fragment combinations can collectively contain sufficient information to facilitate an offline transaction. Moreover, in various cases, each of the set of dynamic QR fragment combinations can correspond to a unique context (e.g., one of 2308).

In various aspects, act 2604 can include identifying, by the mobile device (e.g., via 112), first context information (e.g., 202) associated with a first transaction (e.g., the transaction between 104 and 106).

In various instances, act 2606 can include identifying, by the mobile device (e.g., via 114) and in response to the identifying the first context information, a first dynamic QR fragment combination (e.g., 504) of the set of dynamic QR fragment combinations that corresponds to the first context information (e.g., in FIG. 23, the dynamic QR fragment combination 1 corresponds to the dynamic context 1).

In various cases, act 2608 can include building, by the mobile device (e.g., via 118), a video QR code by sequentially rendering on an electronic display of the mobile device a plurality of frames (e.g., 506). In various cases, each frame of the plurality of frames can depict the static QR fragment and one respectively corresponding dynamic fragment from the first dynamic QR fragment combination.

Although not explicitly shown in FIG. 26, the first transaction can be an online transaction, and a point-of-sale device (e.g., 106) can facilitate the first transaction by scanning one of the plurality of frames rendered on the electronic display and identifying the static QR fragment depicted in the captured one of the plurality of frames.

Although not explicitly shown in FIG. 26, the first transaction can be an offline transaction, and a point-of-sale device (e.g., 106) can facilitate the first transaction by scanning all of the plurality of frames rendered on the electronic display, identifying the first dynamic QR fragment combination collectively depicted in the plurality of frames, and reconstructing a total QR code (e.g., 302) based on the first dynamic QR fragment combination. In various cases, the point-of-sale device can reconstruct the total QR code by superimposing the plurality of frames on top of each other.

Figure 27:
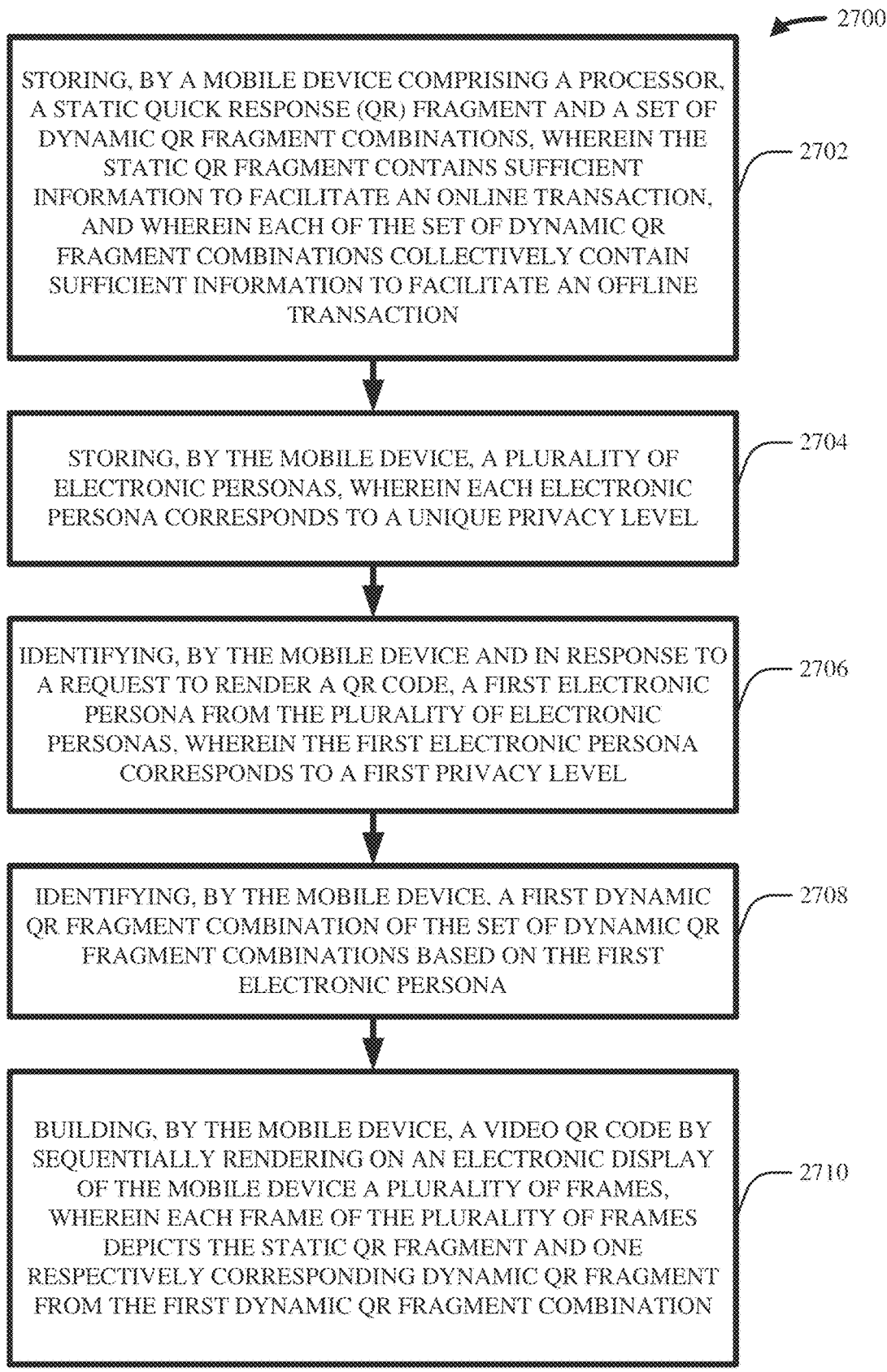

Finally, consider FIG. 27. In various embodiments, act 2702 can include storing, by a mobile device (e.g., via 114, where 102 can be installed on 104) comprising a processor, a static quick response (QR) fragment (e.g., 502) and a set of dynamic QR fragment combinations (e.g., 2306). In various cases, the static QR fragment can contain sufficient information to facilitate an online transaction. In various cases, each of the set of dynamic QR fragment combinations can collectively contain sufficient information to facilitate an offline transaction.

In various aspects, act 2704 can include storing, by the mobile device (e.g., via 1802), a plurality of electronic personas (e.g., 1902), where each electronic persona corresponds to a unique privacy level.

In various instances, act 2706 can include identifying, by the mobile device (e.g., via 1802) and in response to a request to render a QR code, a first electronic persona (e.g., 1804) from the plurality of electronic personas. In various cases, the first electronic persona can correspond to a first privacy level (e.g., in FIG. 19, the persona 1 can correspond to a privacy level defined by the preference information 1, the contact information 1, and/or the biographical information 1).

In various aspects, act 2708 can include identifying, by the mobile device (e.g., via 114), a first dynamic QR fragment combination (e.g., 504) of the set of dynamic QR fragment combinations based on the first electronic persona.

In various instances, act 2710 can include building, by the mobile device (e.g., via 118), a video QR code by sequentially rendering on an electronic display of the mobile device a plurality of frames (e.g., 506), where each frame can depict the static QR fragment and one respectively corresponding dynamic QR fragment from the first dynamic QR fragment combination.

Although not explicitly shown in FIG. 27, a point-of-sale device (e.g., 106) can facilitate an online transaction by capturing one of the plurality of frames rendered on the electronic display of the mobile device and identifying the static QR fragment depicted in the one of the plurality of frames.

Although not explicitly shown in FIG. 27, a point-of-sale device (e.g., 106) can facilitate an offline transaction by capturing all of the plurality of frames rendered on the electronic display of the mobile device, identifying the first dynamic QR fragment combination collectively depicted in the plurality of frames, and reconstructing a total QR code (e.g., 302) based on the first dynamic QR fragment combination.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)$=confidence (class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the subject innovation, and it should be further understood that, in various other embodiments of the subject innovation, it can be the case that such description applies to fewer than "each" of that particular computerized object.

Figure 28:
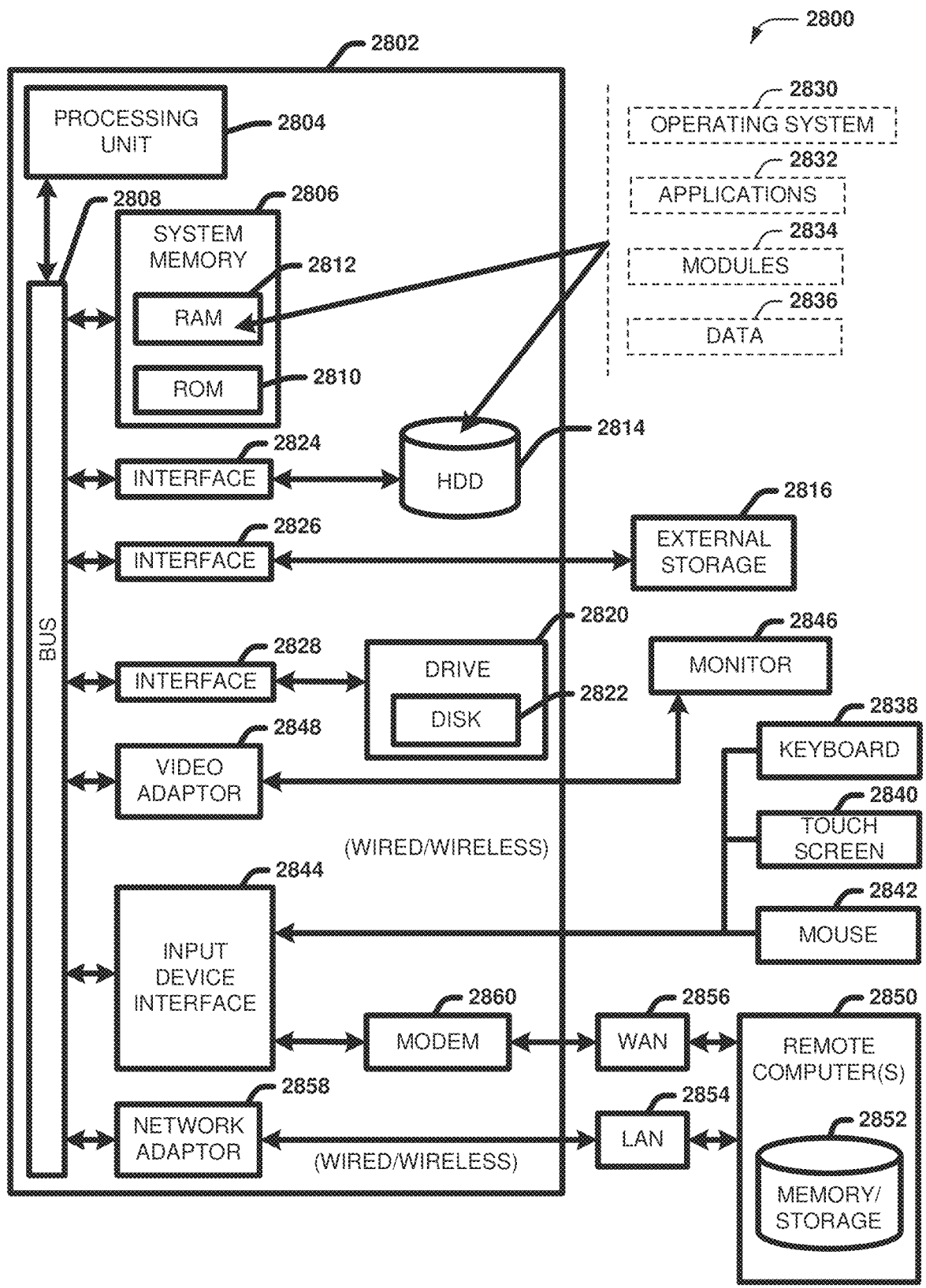
FIG. 28 illustrates a block diagram of an example, non-limiting operating environment in which one or more embodiments described herein can be facilitated.

In order to provide additional context for various embodiments described herein, FIG. 28 and the following discussion are intended to provide a brief, general description of a suitable computing environment 2800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 28, the example environment 2800 for implementing various embodiments of the aspects described herein includes a computer 2802, the computer 2802 including a processing unit 2804, a system memory 2806 and a system bus 2808. The system bus 2808 couples system components including, but not limited to, the system memory 2806 to the processing unit 2804. The processing unit 2804 can be any of various commercially available processors. Dual microprocessors and other multi-processor architectures can also be employed as the processing unit 2804.

The system bus 2808 can be any of several types of bus structure that can further interconnect to a memory bus (with or without a memory controller), a peripheral bus, and a local bus using any of a variety of commercially available bus architectures. The system memory 2806 includes ROM 2810 and RAM 2812. A basic input/output system (BIOS) can be stored in a non-volatile memory such as ROM, erasable programmable read only memory (EPROM), EEPROM, which BIOS contains the basic routines that help to transfer information between elements within the computer 2802, such as during startup. The RAM 2812 can also include a high-speed RAM such as static RAM for caching data.

The computer 2802 further includes an internal hard disk drive (HDD) 2814 (e.g., EIDE, SATA), one or more external storage devices 2816 (e.g., a magnetic floppy disk drive (FDD) 2816, a memory stick or flash drive reader, a memory card reader, etc.) and a drive 2820, e.g., such as a solid state drive, an optical disk drive, which can read or write from a disk 2822, such as a CD-ROM disc, a DVD, a BD, etc. Alternatively, where a solid state drive is involved, disk 2822 would not be included, unless separate. While the internal HDD 2814 is illustrated as located within the computer 2802, the internal HDD 2814 can also be configured for external use in a suitable chassis (not shown). Additionally, while not shown in environment 2800, a solid state drive (SSD) could be used in addition to, or in place of, an HDD 2814. The HDD 2814, external storage device(s) 2816 and drive 2820 can be connected to the system bus 2808 by an HDD interface 2824, an external storage interface 2826 and a drive interface 2828, respectively. The interface 2824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2812, including an operating system 2830, one or more application programs 2832, other program modules 2834 and program data 2836. All or portions of the operating system, applications, modules, and/or data can also be cached in the RAM 2812. The systems and methods described herein can be implemented utilizing various commercially available operating systems or combinations of operating systems.

Computer 2802 can optionally comprise emulation technologies. For example, a hypervisor (not shown) or other intermediary can emulate a hardware environment for operating system 2830, and the emulated hardware can optionally be different from the hardware illustrated in FIG. 28. In such an embodiment, operating system 2830 can comprise one virtual machine (VM) of multiple VMs hosted at computer 2802. Furthermore, operating system 2830 can provide runtime environments, such as the Java runtime environment or the .NET framework, for applications 2832. Runtime environments are consistent execution environments that allow applications 2832 to run on any operating system that includes the runtime environment. Similarly, operating system 2830 can support containers, and applications 2832 can be in the form of containers, which are lightweight, standalone, executable packages of software that include, e.g., code, runtime, system tools, system libraries and settings for an application.

Further, computer 2802 can be enable with a security module, such as a trusted processing module (TPM). For instance with a TPM, boot components hash next in time boot components, and wait for a match of results to secured values, before loading a next boot component. This process can take place at any layer in the code execution stack of computer 2802, e.g., applied at the application execution level or at the operating system (OS) kernel level, thereby enabling security at any level of code execution.

A user can enter commands and information into the computer 2802 through one or more wired/wireless input devices, e.g., a keyboard 2838, a touch screen 2840, and a pointing device, such as a mouse 2842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2804 through an input device interface 2844 that can be coupled to the system bus 2808, but can be connected by other interfaces, such as a parallel port, an IEEE 1394 serial port, a game port, a USB port, an IR interface, a BLUETOOTH® interface, etc.

A monitor 2846 or other type of display device can be also connected to the system bus 2808 via an interface, such as a video adapter 2848. In addition to the monitor 2846, a computer typically includes other peripheral output devices (not shown), such as speakers, printers, etc.

The computer 2802 can operate in a networked environment using logical connections via wired and/or wireless communications to one or more remote computers, such as a remote computer(s) 2850. The remote computer(s) 2850 can be a workstation, a server computer, a router, a personal computer, portable computer, microprocessor-based entertainment appliance, a peer device or other common network node, and typically includes many or all of the elements described relative to the computer 2802, although, for purposes of brevity, only a memory/storage device 2852 is illustrated. The logical connections depicted include wired/wireless connectivity to a local area network (LAN) 2854 and/or larger networks, e.g., a wide area network (WAN) 2856. Such LAN and WAN networking environments are commonplace in offices and companies, and facilitate enterprise-wide computer networks, such as intranets, all of which can connect to a global communications network, e.g., the Internet.

When used in a LAN networking environment, the computer 2802 can be connected to the local network 2854 through a wired and/or wireless communication network interface or adapter 2858. The adapter 2858 can facilitate wired or wireless communication to the LAN 2854, which can also include a wireless access point (AP) disposed thereon for communicating with the adapter 2858 in a wireless mode.

When used in a WAN networking environment, the computer 2802 can include a modem 2860 or can be connected to a communications server on the WAN 2856 via other means for establishing communications over the WAN 2856, such as by way of the Internet. The modem 2860, which can be internal or external and a wired or wireless device, can be connected to the system bus 2808 via the input device interface 2844. In a networked environment, program modules depicted relative to the computer 2802 or portions thereof, can be stored in the remote memory/storage device 2852. It will be appreciated that the network connections shown are example and other means of establishing a communications link between the computers can be used.

When used in either a LAN or WAN networking environment, the computer 2802 can access cloud storage systems or other network-based storage systems in addition to, or in place of, external storage devices 2816 as described above, such as but not limited to a network virtual machine providing one or more aspects of storage or processing of information. Generally, a connection between the computer 2802 and a cloud storage system can be established over a LAN 2854 or WAN 2856 e.g., by the adapter 2858 or modem 2860, respectively. Upon connecting the computer 2802 to an associated cloud storage system, the external storage interface 2826 can, with the aid of the adapter 2858 and/or modem 2860, manage storage provided by the cloud storage system as it would other types of external storage. For instance, the external storage interface 2826 can be configured to provide access to cloud storage sources as if those sources were physically connected to the computer 2802.

The computer 2802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 29:
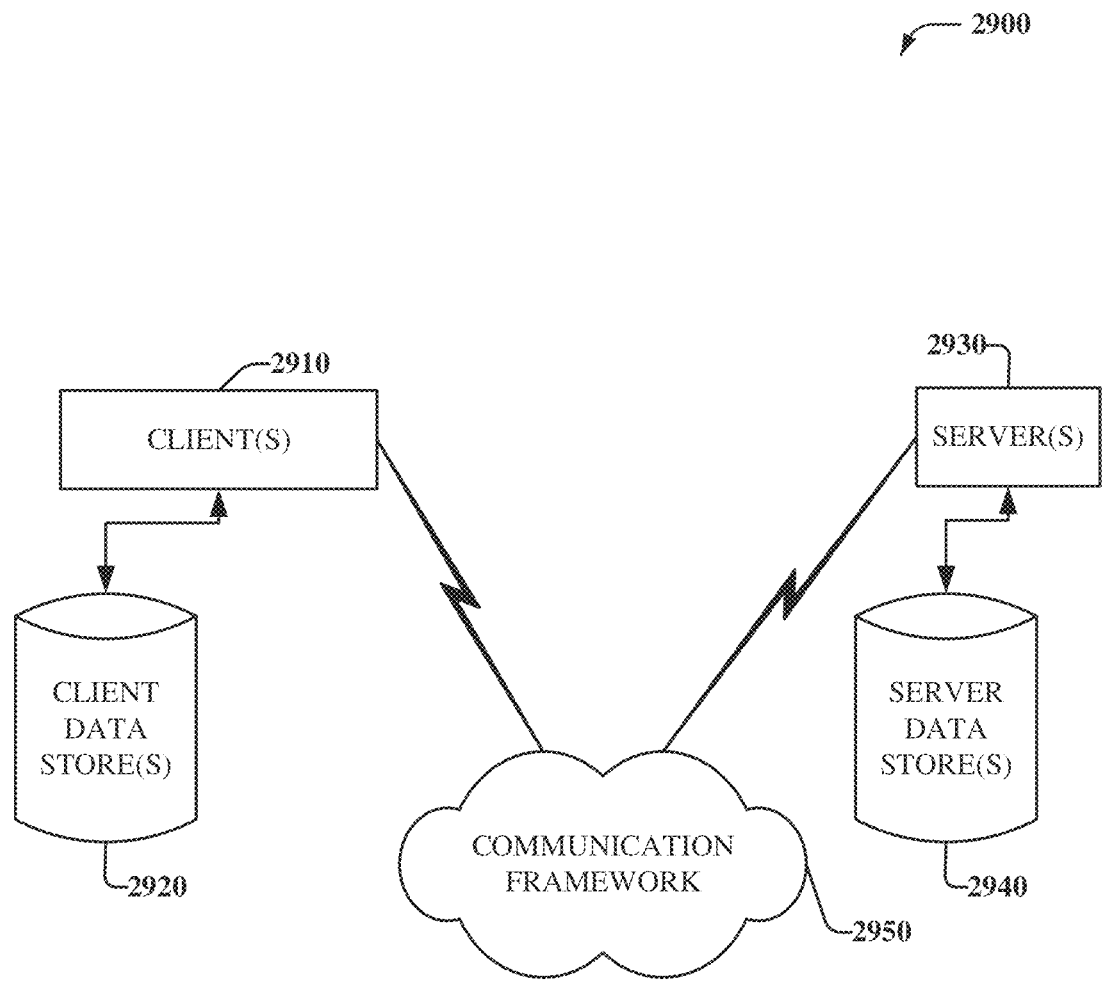
FIG. 29 illustrates an example networking environment operable to execute various implementations described herein.

FIG. 29 is a schematic block diagram of a sample computing environment 2900 with which the disclosed subject matter can interact. The sample computing environment 2900 includes one or more client(s) 2910. The client(s) 2910 can be hardware and/or software (e.g., threads, processes, computing devices). The sample computing environment 2900 also includes one or more server(s) 2930. The server(s) 2930 can also be hardware and/or software (e.g., threads, processes, computing devices). The servers 2930 can house threads to perform transformations by employing one or more embodiments as described herein, for example. One possible communication between a client 2910 and a server 2930 can be in the form of a data packet adapted to be transmitted between two or more computer processes. The sample computing environment 2900 includes a communication framework 2950 that can be employed to facilitate communications between the client(s) 2910 and the server(s) 2930. The client(s) 2910 are operably connected to one or more client data store(s) 2920 that can be employed to store information local to the client(s) 2910. Similarly, the server(s) 2930 are operably connected to one or more server data store(s) 2940 that can be employed to store information local to the servers 2930.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile device, comprising:
a processor that executes computer-executable instructions stored in a computer-readable memory, which causes the processor to:
store a plurality of quick response (QR) codes;
store a plurality of electronic personas, wherein each electronic persona corresponds to a unique privacy level;
in response to a request to render a QR code, identify a first electronic persona from the plurality of electronic personas, wherein the first electronic persona corresponds to a first privacy level;
identify, in the plurality of QR codes, a first QR code based on the first electronic persona;
decompose the first QR code into a static fragment and a plurality of dynamic fragments, wherein the static fragment is a portion of the first QR code that contains sufficient information to facilitate an online transaction, and wherein the plurality of dynamic fragments is a plurality of portions of the first QR code that collectively contain sufficient information to facilitate an offline transaction; and
sequentially render on an electronic display of the mobile device a plurality of frames, wherein each frame of the plurality of frames depicts the static fragment and one respectively corresponding dynamic fragment from the plurality of dynamic fragments.

2. The mobile device of claim 1, wherein the first electronic persona corresponds to first preference data, contact data, or demographic data that corresponds to the first privacy level, wherein the first preference data, contact data, or demographic data is represented by the first QR code.

3. The mobile device of claim 1, wherein the processor identifies the first electronic persona by detecting a selection of the first electronic persona by a user via a user interface of the mobile device.

4. The mobile device of claim 1, wherein the processor identifies the first electronic persona by detecting information associated with a transaction, wherein the information is a geo-location of the transaction or a time of the transaction.

5. The mobile device of claim 1, wherein the processor identifies the first electronic persona by detecting information associated with a transaction, wherein the information is a product or service involved in the transaction, an amount of the transaction, or an identity of a merchant associated with the transaction.

6. The mobile device of claim 1, wherein the processor identifies the first electronic persona by biometrically identifying a user of the mobile device.

7. The mobile device of claim 1, wherein a point-of-sale device facilitates an online transaction by capturing one of the plurality of frames rendered on the electronic display of the mobile device and identifying the static fragment depicted in the one of the plurality of frames.

8. The mobile device of claim 1, wherein a point-of-sale device facilitates an offline transaction by capturing all of the plurality of frames rendered on the electronic display of the mobile device, identifying the plurality of dynamic fragments collectively depicted in the plurality of frames, and reconstructing the first QR code based on the plurality of dynamic fragments.

9. A computer-implemented method, comprising:
storing, by a mobile device comprising a processor, a static quick response (QR) fragment and a set of dynamic QR fragments, wherein the static QR fragment contains sufficient information to facilitate an online transaction, and wherein each of one or more unique combinations of the set of dynamic QR fragments collectively contain sufficient information to facilitate an offline transaction;
storing, by the mobile device, a plurality of electronic personas, wherein each electronic persona corresponds to a unique privacy level;
identifying, by the mobile device and in response to a request to render a QR code, a first electronic persona from the plurality of electronic personas, wherein the first electronic persona corresponds to a first privacy level;
identifying, by the mobile device, a first combination of the set of dynamic QR fragments based on the first electronic persona; and
building, by the mobile device, a video QR code by sequentially rendering on an electronic display of the mobile device a plurality of frames, wherein each frame of the plurality of frames depicts the static QR fragment and one respectively corresponding dynamic QR fragment from the first combination of dynamic QR fragments.

10. The computer-implemented method of claim 9, wherein the first electronic persona corresponds to first preference data, contact data, or demographic data that corresponds to the first privacy level, wherein the first preference data, contact data, or demographic data is represented by the video QR code.

11. The computer-implemented method of claim 9, wherein the identifying the first electronic persona is based on detecting a selection of the first electronic persona by a user via a user interface of the mobile device.

12. The computer-implemented method of claim 9, wherein the identifying the first electronic persona is based on detecting information associated with a transaction, wherein the information is a geo-location of the transaction or a time of the transaction.

13. The computer-implemented method of claim 9, wherein the identifying the first electronic persona is based on detecting information associated with a transaction, wherein the information is a product or service involved in the transaction, an amount of the transaction, or an identity of a merchant associated with the transaction.

14. The computer-implemented method of claim 9, wherein the identifying the first electronic persona is based on biometrically identifying a user of the mobile device.

15. The computer-implemented method of claim 9, wherein a point-of-sale device facilitates an online transaction by capturing one of the plurality of frames rendered on the electronic display of the mobile device and identifying the static QR fragment depicted in the one of the plurality of frames.

16. The computer-implemented method of claim 9, wherein a point-of-sale device facilitates an offline transaction by capturing all of the plurality of frames rendered on the electronic display of the mobile device, identifying the first combination of dynamic QR fragments collectively depicted in the plurality of frames, and reconstructing a total QR code based on the first combination of dynamic QR fragments.

17. A computer program product for facilitating video quick response (QR) codes, the computer program product comprising a computer-readable medium having program instructions embodied therewith, the program instructions executable by a processor of a mobile device to cause the mobile device to perform operations comprising:

identifying, by the mobile device, an electronic persona;

identifying, by the mobile device, a QR code based on the electronic persona;

decomposing, by the mobile device, the QR code into a static fragment and a plurality of dynamic fragments, wherein the static fragment is a portion of the QR code that contains sufficient information to facilitate an online transaction, and wherein the plurality of dynamic fragments are a plurality of portions of the QR code that collectively contain sufficient information to facilitate an offline transaction but that individually do not contain sufficient information to facilitate the offline transaction; and sequentially rendering, by the mobile device, a plurality of frames on an electronic display of the mobile device, wherein each frame of the plurality of frames depicts the static fragment, and wherein each frame of the plurality of frames depicts a respectively corresponding one of the plurality of dynamic fragments.

18. The computer program product of claim 17, wherein the identifying the electronic persona is based on identifying a current geo-location of the mobile device, a current time, a merchant that is prompting the mobile device to display the QR code, or a product or service being provided by the merchant.

19. The computer program product of claim 17, wherein the identifying the electronic persona is based on receiving manual input from a user of the mobile device or biometrically verifying the user of the mobile device.

20. The computer program product of claim 17, wherein the QR code represents preference information of a user of the mobile device, contact information of the user of the mobile device, or demographic information of the user of the mobile device.

* * * * *